US007493107B2

(12) United States Patent
Constabileo et al.

(10) Patent No.: US 7,493,107 B2
(45) Date of Patent: Feb. 17, 2009

(54) RETURN AND REPAIR MANAGEMENT SYSTEM AND METHOD

(75) Inventors: Joseph Jordan Constabileo, Gumee, IL (US); Andrea Bradshaw, Cary, IL (US); Yeng L. Young, Miami, FL (US)

(73) Assignee: Brightstar Corporation, Miami, FL (US)

( * ) Notice: Subject to any disclaimer, the term of this patent is extended or adjusted under 35 U.S.C. 154(b) by 590 days.

(21) Appl. No.: 10/858,147

(22) Filed: Jun. 1, 2004

(65) Prior Publication Data

US 2005/0266804 A1 Dec. 1, 2005

(51) Int. Cl.

*H04L 29/06* (2006.01)
*H04Q 7/22* (2006.01)
*H04Q 7/38* (2006.01)

(52) U.S. Cl. ................ 455/414.3; 455/414.1; 455/423; 455/424; 705/1; 705/26

(58) Field of Classification Search ............. 455/414.1, 455/3, 406–409, 414.3, 423–425; 705/1, 705/26–28, 73–75, 78

See application file for complete search history.

(56) References Cited

U.S. PATENT DOCUMENTS

| | | | | |
|---|---|---|---|---|
| 6,975,937 | B1 * | 12/2005 | Kantarjiev et al. | 701/117 |
| 2002/0010689 | A1 * | 1/2002 | Tibbs et al. | 705/408 |
| 2004/0172260 | A1 * | 9/2004 | Junger et al. | 705/1 |
| 2005/0114221 | A1 * | 5/2005 | Walters et al. | 705/26 |
| 2005/0222911 | A1 * | 10/2005 | Kerker et al. | 705/26 |

* cited by examiner

*Primary Examiner*—Tuan A Tran

(57) ABSTRACT

A return and repair management system enables transactions between multiple end-users, customers, repair centers, and return for credit destinations. The return and repair management system may be affiliated with an administrator that facilitates processes between system entities. The transactions may involve the return and repair of telecommunications equipment, such as telephone handsets and accessories. The return and repair management system may provide an interactive user interface (UI), such as a Web page, for the end-users, customers, repair centers, and administrator. By interfacing with the UI, an end-user or customer may generate a handset request or accessory request.

19 Claims, 80 Drawing Sheets

232

235

236

237

240

244

247

312

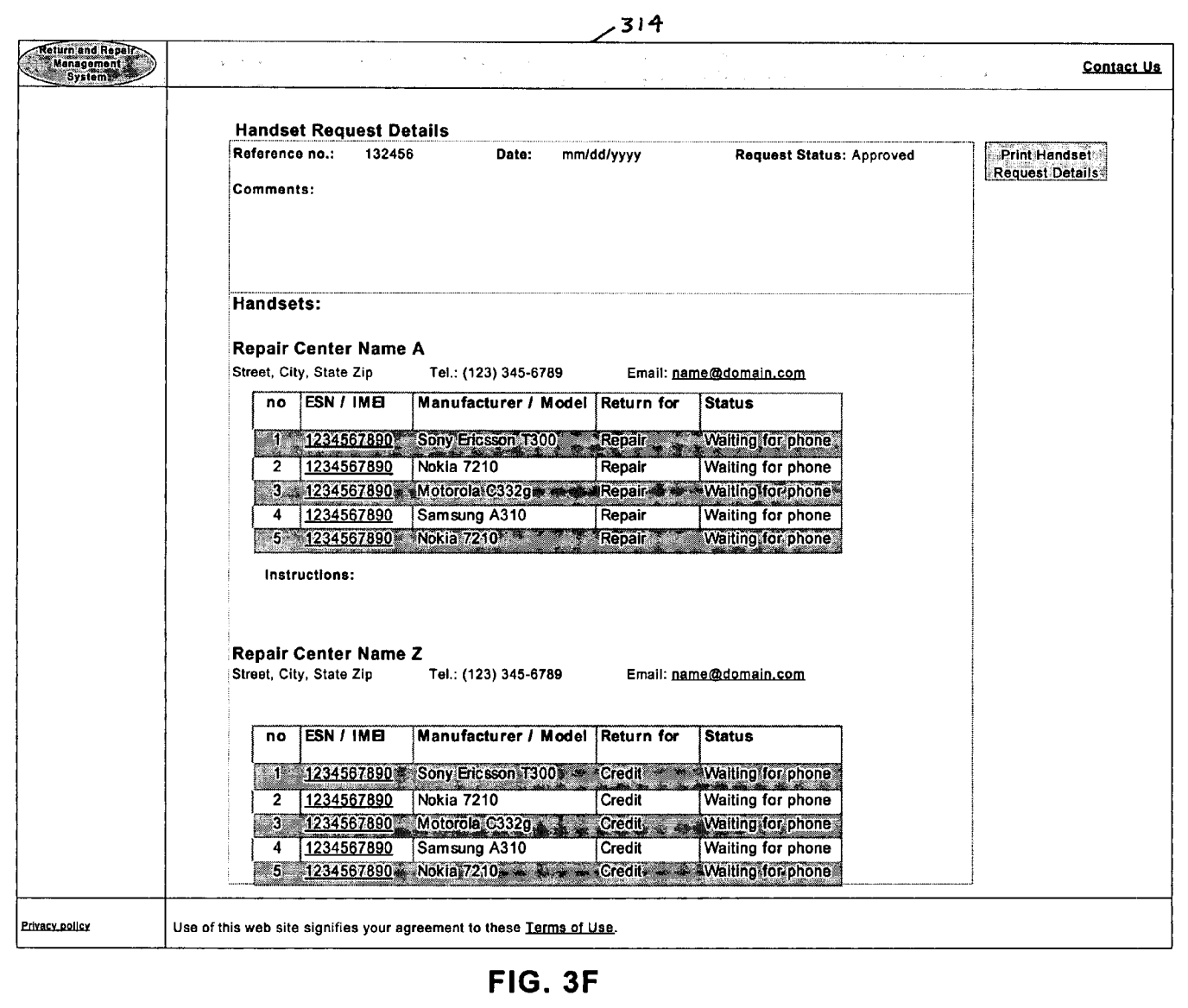

314

Return and Repair Management System

Contact Us

Handset Request Details

Reference no.: 132456 Date: mm/dd/yyyy Request Status: Approved

Print Handset Request Details

Comments:

Handsets:

Repair Center Name A

Street, City, State Zip Tel.: (123) 345-6789 Email: name@domain.com

| no | ESN / IMEI | Manufacturer / Model | Return for | Status |
|---|---|---|---|---|
| 1 | 1234567890 | Sony Ericsson T300 | Repair | Waiting for phone |
| 2 | 1234567890 | Nokia 7210 | Repair | Waiting for phone |
| 3 | 1234567890 | Motorola C332g | Repair | Waiting for phone |
| 4 | 1234567890 | Samsung A310 | Repair | Waiting for phone |
| 5 | 1234567890 | Nokia 7210 | Repair | Waiting for phone |

Instructions:

Repair Center Name Z

Street, City, State Zip Tel.: (123) 345-6789 Email: name@domain.com

| no | ESN / IMEI | Manufacturer / Model | Return for | Status |
|---|---|---|---|---|
| 1 | 1234567890 | Sony Ericsson T300 | Credit | Waiting for phone |
| 2 | 1234567890 | Nokia 7210 | Credit | Waiting for phone |
| 3 | 1234567890 | Motorola C332g | Credit | Waiting for phone |
| 4 | 1234567890 | Samsung A310 | Credit | Waiting for phone |
| 5 | 1234567890 | Nokia 7210 | Credit | Waiting for phone |

Privacy policy

Use of this web site signifies your agreement to these Terms of Use.

FIG. 3F

| Brightstar Account No. | Customer ID | Company Name | Status | ESN Valid. |
|---|---|---|---|---|
| 123456789 | 123456789 | Name A | Enabled | YES |
| 123456789 | 123456789 | Name A | Disabled | YES |
| 123456789 | 123456789 | Name A | Disabled | YES |
| 123456789 | 123456789 | Name A | Disabled | YES |
| 123456789 | 123456789 | Name A | Enabled | YES |
| 123456789 | 123456789 | Name A | Enabled | YES |
| 123456789 | 123456789 | Name A | Enabled | YES |
| 123456789 | 123456789 | Name A | Enabled | YES |
| 123456789 | 123456789 | Name A | Enabled | YES |
| 123456789 | 123456789 | Name A | Enabled | YES |
| 123456789 | 123456789 | Name A | Enabled | YES |
| 123456789 | 123456789 | Name A | Enabled | NO |
| 123456789 | 123456789 | Name A | Enabled | NO |

644

645

646

656

658

662

RETURN AND REPAIR MANAGEMENT SYSTEM AND METHOD

TECHNICAL FIELD

The present invention relates generally to systems and techniques for managing the return and/or repair of products and, more particularly, to a system and method for managing the return and/or repair of telecommunications equipment.

BACKGROUND

In the telecommunications industry, a vast amount of information is associated with the distribution of subscriber equipment such as telephone handsets and other accessories. For example, a wireless telephone handset may be associated with serialized information such as an Electronic Serial Number (ESN)—i.e. a unique identification number embedded on a microchip in the handset the manufacturer. Typically, the ESN is transmitted when a call is placed and electronically checked in order to prevent fraudulent use of the handset. Other serialized information such as, for example, an International Mobile Equipment Identification (IMEI), a mobile identification number (MIN), one or more unlocking codes for the handset, one or more Subscriber Information Module (SIM) card codes, also may be associated with the handset. Moreover, a finished handset assembly may be made up of various basic components (e.g., speakers, microphones, keypads, displays, ringers, processors, chipsets, memories, displays, batteries) and add-on components (e.g., communication devices, cameras, location technologies, multimedia players), each associated with its own serialized information.

In the telecommunications industry, there is no adequate system for efficiently handling the return and/or repair of equipment. For example, there exists the need for a system and method for handling the return and/or repair of various types of products from a single source by tracking information associated with telecommunications equipment.

SUMMARY

In one general aspect, a return and repair management system enables transactions between multiple end-users, customers, repair centers, and return for credit destinations. In one embodiment, the return and repair management system may be affiliated with an administrator that facilitates transactions between system entities. The transactions may involve the return and repair of telecommunications equipment, such as telephone handsets and accessories. For example, an end-user may a handset purchaser, a customer may be a handset seller, and the repair center may be a handset manufacturer.

In one implementation, a user (e.g., end-user, customer) desires to return a product (e.g., handset, accessory) for repair, refurbishing, or credit. In general, credit transactions involve returning the product to the administrator and receiving account credit. Repair transactions involve sending a defective product to a repair center and receiving the product after the product has been repaired.

The return and repair management system generally provides an interactive user interface (UI), such as a Web page, for the end-users, customers, repair centers, and administrator. By interfacing with the UI, an end-user or customer may generate a handset request or an accessory request. In general, the UI may be accessed from the home location of an end-user as well as a business location of a customer, repair center, or administrator.

Aspects of the present invention may be implemented by an apparatus and/or by a computer program stored on a computer readable medium. The computer readable medium may comprise a disk, a client device, a network device, a host device, and/or a propagated signal.

Other features and advantages will be apparent from the following description, including the drawings, and from the claims.

DESCRIPTION OF THE FIGURES

FIGS. 3C-3J illustrate user interfaces for a customer process according to one embodiment the present invention.

DETAILED DESCRIPTION

Figure 1:
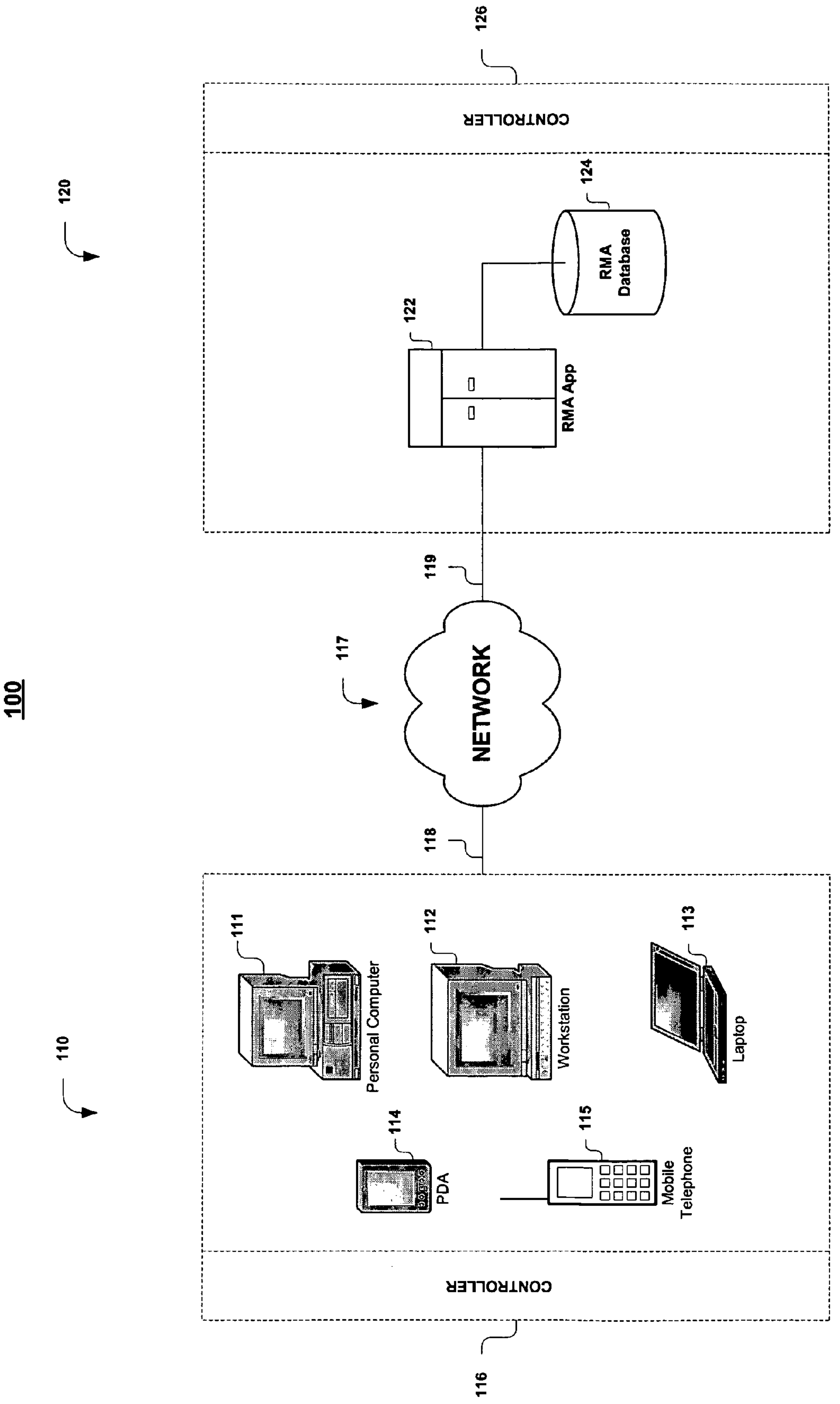
FIG. 1 illustrates a communications system according to one embodiment the present invention.

In one aspect, a return and repair management system enables transactions between multiple end-users, customers, repair centers, and return for credit destinations. The return and repair management system may be affiliated with an administrator and facilitates processes between system entities. The transactions may involve the return and repair of telecommunications equipment, such as telephone handsets and accessories. For example, an end-user may a handset purchaser, a customer may be a handset seller, and the repair center may be a handset manufacturer.

In one implementation, a user (e.g., end-user, customer) desires to return a product (e.g., handset, accessory) for repair, refurbishing or for credit. In general, credit transactions involve returning the product to the administrator and receiving account credit. Repair transactions involve sending a defective product to a repair center and receiving the product after the product has been repaired.

The return and repair management system generally provides an interactive user interface (UI), such as a Web page, for the end-users, customers, repair centers, and administrator. By interfacing with the UI, an end-user or customer may generate a handset request or an accessory request. In general, the UI may be accessed from the home location of an end-user as well as the business location of a customer, repair center, or administrator.

In one implementation, a user (e.g., end-user, customer) may access the return and repair management system and generate a handset request and/or an accessory request. For a handset request, the user may be prompted to enter the manufacturer, model and serialized information, such as an Electronic Serial Number (ESN) or International Mobile Equipment Identification (IMEI) for each handset, Warranty Code and or POP, alternate routing/contact information. Multiple handsets may be included in an individual handset request. For an accessory request, the user may be prompted to enter the manufacturer, the model number, the quantity, and a request ID (e.g., automatically generated reference number) identifier for the accessory. Multiple accessories can be entered for an individual request. Each request indicates whether each handset or accessory being returned is for repair, refurbishment, or for credit. While accessories typically will be returned for credit, repair can be requested in some implementations.

The user may select a problem description from a pull-down menu of common problems. The user also may enter necessary comments and may provide contact information. After confirming that all handsets and/or accessories have been entered, the user submits the handset and/or accessory requests.

If a handset is being returned for credit, the system validates that the product was purchased from the entity issuing the credit. If a handset is being returned for repair, the system validates the manufacturers warranty code. If the handset is our of warranty, the user is prompted to enter POP (Proof of Purchase). If POP criteria is not met, the user is informed that the handset may be out of warranty. The system references the model+manufacture combination and routes the handset to a particular repair center based on the combination. In general, the administrator sets up the matrix for the model+manufacturer combinations that determine routing. The system is able to route to multiple repair centers. In some cases, if there are multiple designated repair centers for a manufacturer+model combination, the final repair center destination may be based on factors such as proximity, capacity, and turnaround time.

The system may provide users with a confirmation page giving a reference (return) number, date, status of the request, and the current or final destination location for each handset. The system may display a list by repair center including each individual item destined for that repair center. The confirmation may list shipping instructions for returning the product and any other material needed by the repair center.

The handset request is sent to a repair center interface that is user ID and password protected. The handset requests are visible by repair center personnel and updated as products are repaired. For example, as each product is repaired, the status of the transaction progresses from approved, to in-process (repair center is working on a product in the request), and then to complete (all of the items in that request have been repaired). At each stage in the process, the repair center makes a repair, charges additional costs if needed, provides comments, and updates the status. When the repair center ships an item, shipping information (e.g., ENS, shipping method, tracking number, date shipped) is provided.

The users (e.g., end-user, customer) can review their requests including the updated status for each product and may view individual handset details based on the entered information. For example, the serial number and/or repair center list may be hyperlinked to additional information providing more details for each handset or repair center. From the end-user or customer interface, a request history may be viewed. Searches may be performed by product, date, request number, and ESN, for example. Accessories may be listed in batch format.

The system may include a return for credit destination interface for approving a return and crediting an account. Generally, credit approval may be granted based on the purchase date and warranty associated with a product or accessory. Rules may be set up for each product to determine whether the product is within a warranty period. The determination may be made, for example, by performing a warranty look-up based on make, model, and purchase date. If the handset or accessory is out of its warranty period, a message may be displayed informing the user that additional charges may be incurred.

The system also may include an administrator interface capable of handling the entire process. Namely, the administrator interface may be designed to include all functionality provided to end-users, customers, and repair centers as well as some over-riding functions (e.g., stop credit, extend terms of a credit). The administrator interface may have the ability to set up all user accounts (e.g., end-user accounts, customer accounts, repair center accounts, credit destination accounts). The administrator also may have broad search capabilities, for example, search by reference number, by the customer, by end-user, by repair center, by date, and by individual handset.

The system may be designed with logic to integrate the interfaces with a customer's existing website. For example, the interfaces can be linked to and branded with a particular customer to give the interface the look and feel of a specified website (e.g., logo, special features).

FIG. 1 illustrates one embodiment of an exemplary system 100 for automatically managing the return and repair of telecommunications equipment, such as telephone handsets and other accessories. For simplicity, only the basic components of the described systems and methods are provided. One of ordinary skill in the art, however, would understand that the described systems and methods may include various other structures and/or processes in implementation. Additionally, the methods may be implemented by any suitable type of hardware (e.g., device, computer, computer system, equipment, component); software (e.g., program, application, instruction set, code); storage medium (e.g., disk, device, propagated signal); or combination thereof.

As shown, the communications system 100 includes a client system 110 for presenting information to and receiving information from a user. In general, the user may be one or more of an end user, a customer (e.g., direct carrier, indirect agent, retailer, carrier), and/or a repair center (e.g., direct carrier, indirect agent, retailer).

The client system 110 may include one or more client devices such as, for example, a personal computer (PC) 111, a workstation 112, a laptop computer 113, a network-enabled personal digital assistant (PDA) 114, and a network-enabled telephone 115. Other examples of a client device include, but are not limited to a server, a microprocessor, an integrated circuit, or any other component, machine, tool, equipment, or some combination thereof capable of responding to and executing instructions.

In one implementation, the client system 110 operates under the command of a client controller 116. The broken lines are intended to indicate that in some implementations, the client controller 116, or portions thereof considered collectively, may instruct one or more elements of the client system 10 to operate as described. Examples of a client controller 116 include, but are not limited to a computer program, a software application, computer code, set of instructions, plug-in, applet, microprocessor, virtual machine, device, or combination thereof, for independently or collectively instructing one or more computing devices to interact and operate as programmed.

The client controller 116 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 116 (e.g., software application, computer program) may be stored on a computer-readable medium (e.g., disk, device, and/or propagated signal) such that when a computer reads the medium, the functions described herein are performed.

In general, the client system 110 may be connected through a network 117 having wired or wireless data pathways 118, 119 to host system 120. The network 117 may include any type of delivery system including, but not limited to a local area network (e.g., Ethernet), a wide area network (e.g. the Internet and/or World Wide Web), a telephone network (e.g., analog, digital, wired, wireless, GSM, PSTN, ISDN, and/or XDSL), a packet-switched network, a radio network, a television network, a cable network, a satellite network, and/or any other wired or wireless communications network configured to carry data. The network 117 may include elements, such as, for example, intermediate nodes, proxy servers, routers, switches, and adapters configured to direct and/or deliver data.

In general, the client system 110 and the host system 120 each include hardware and/or software components for communicating with the network 117 and with each other. The client system 110 and host system 120 may be structured and arranged to communicate through the network 117 using various communication protocols (e.g., HTTP, TCP/IP, UDP, WAP, WiFi, Bluetooth) and/or to operate within or in concert with one or more other communications systems.

The host system 120 generally provides a set of resources for a group of users. As shown, the host system 120 may include one or more servers 122 (e.g., Intel based servers, IBM® operating system servers, Linux operating system-based servers, Windows NT™ servers, Sybase) and one or more databases 124 for operating as described herein.

In one implementation, the host system 120 operates under the command of a host controller 126. The broken lines are intended to indicate that in some implementations, the host controller 126, or portions thereof considered collectively, may instruct one or more elements of host system 120 to operate as described. Examples of a host controller 126 include, but are not limited to a computer program, a software application, computer code, set of instructions, plug-in, microprocessor, virtual machine, device, or combination thereof, for independently or collectively instructing one or more computing devices to interact and operate as programmed.

In general, host controller 126 may utilize any suitable algorithms, computing language (e.g., C, C++, Java, JavaScript, Visual Basic, VBScript, Delphi), and/or object-oriented techniques and may be embodied permanently or temporarily in any type of computer, computer system, device, machine, component, physical or virtual equipment, storage medium, or propagated signal capable of delivering instructions. The host controller 126 when implemented as software or a computer program, for example, may be stored on a computer-readable medium (e.g., device, disk, or propagated signal) such that when a computer reads the medium, the functions described herein are performed.

Referring to FIG. 2, the system 100 operates according to a customer process 20. While particular embodiments and examples are described and illustrated, the process 20 may be implemented by any suitable type of hardware (e.g., device, computer, computer system, equipment, component), software (e.g., program, application, instruction set, code), storage medium (e.g., disk, device, propagated signal), or combination thereof.

At step 201, customer login may include entering an email address and a password into a user interface (UI). In one implementation, the design of the UI may support customer-branded or co-branding options. At step 202, if the login is performed incorrectly, the system may request registration (step 203). Registration information may include: company, name, address, city, state, zip code, telephone number, fax number, email address, and password. In response to receiving the registration information the system may create an account (step 204) and notify the customer that an account has been created (step 205). At step 206, the system may send a forgotten password to a valid email address associated with a customer.

At step 202, if login is performed correctly, the system may direct the customer to a home page (step 207). From the home page, the system may enable the customer to edit information (step 208). Such information may include: company, name, address, city, state, zip code, telephone number, fax number, email address, and password.

At step 209, the system may enable the customer to generate a new handset request. To create a new handset request, the system receives entered or edited information (step 210). In one implementation, the handset request information may include manufacturer, model, ESN/IMEI number (input), repair/refurbish/for credit, problem description, comments, end-user information, and end-user email address.

At step 211, the syntax of the information is validated. In one implementation, the system validates the ESN number against one of three hard coded validation rules. If validation fails, an error message is displayed at (step 212).

If validation is successful, the system determines whether the handset is being returned for credit at (step 213). If so, the system performs a customer validation at (step 214). In one implementation, a customer ESN validation flag is controlled from an administrator interface.

Once the customer has been validated, the system validates the ESN of the handset at (step 215). If the ESN is invalid, an error message is displayed (step 216). If the ESN is valid, the system adds the ESN, manufacturer, model, and the first 40 characters of the problem to a handset list and clears the form except for manufacturer+model pre-populated with previous values. To delete handsets from the list, the customer may check one or more "select" boxes and click on a "delete handset" button. To edit a handset, the user clicks on the ESN number.

At step 217, the system asks whether to add another handset. If there are additional handsets, information is entered or edited (step 210). If there are no additional handsets, the system requests confirmation (step 218). In one implementation, comment text may be confirmed. At step 219, identification, date, and repair instructions are posted to a handset request history. In one implementation, the reference number is obtained from a proprietary database and the date is assigned by the system. Handsets may be listed with shipping and repair instructions and may be grouped by destination.

At step 220, the system posts individual handset requests to corresponding repair centers. In one implementation, status may be updated to "waiting for handset."

From the customer home page (step 207), the system may enable a customer to display a handset request history (step 221). In one implementation, the handset request history may include reference number, date, and request status. The customer may click on the reference number to see a handset list by repair center, including the status for each handset.

From the customer home page (step 207), the system may enable the customer to generate an accessory request (step 222). Accessory information is entered and/or edited at step 223. In general, accessories are usually only returned for credit and validation is not required. In one implementation, accessory fields include accessory item and quantity requested.

At step 224, another accessory is to be added, the system requests the customer to enter and/or edit information (step 223). If there are no additional accessories, the system requests confirmation (step 225).

At step 226, identification, date, and repair instructions are posted to the accessory request history. At step 227, the system posts the accessory request to the return for credit destination's accessory requests inbox and to an administrator interface. At step 228, the system allows a customer to display an accessory request history.

Figure 2A:
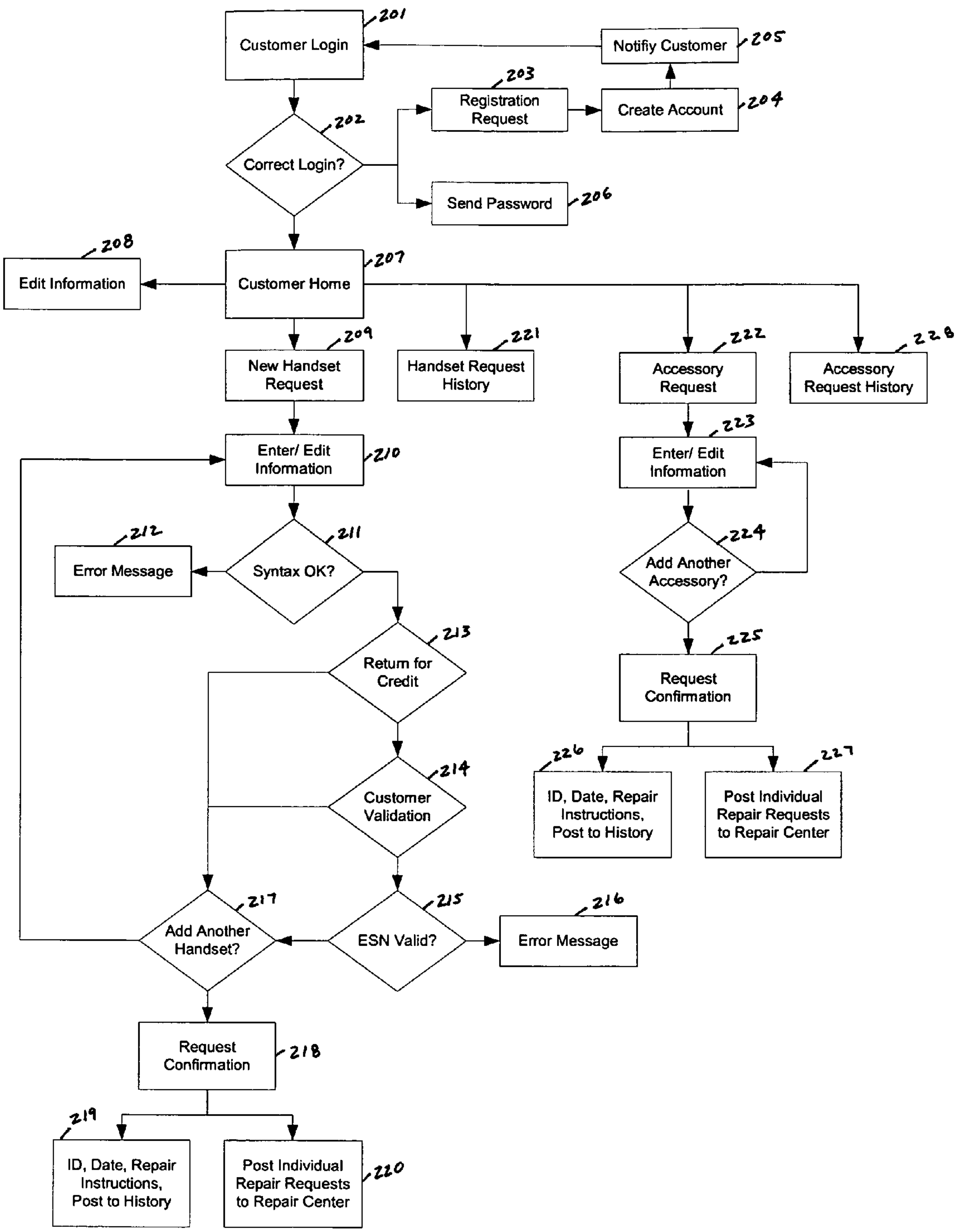
FIG. 2A illustrates a customer process according to one embodiment the present invention.
Figure 2B:
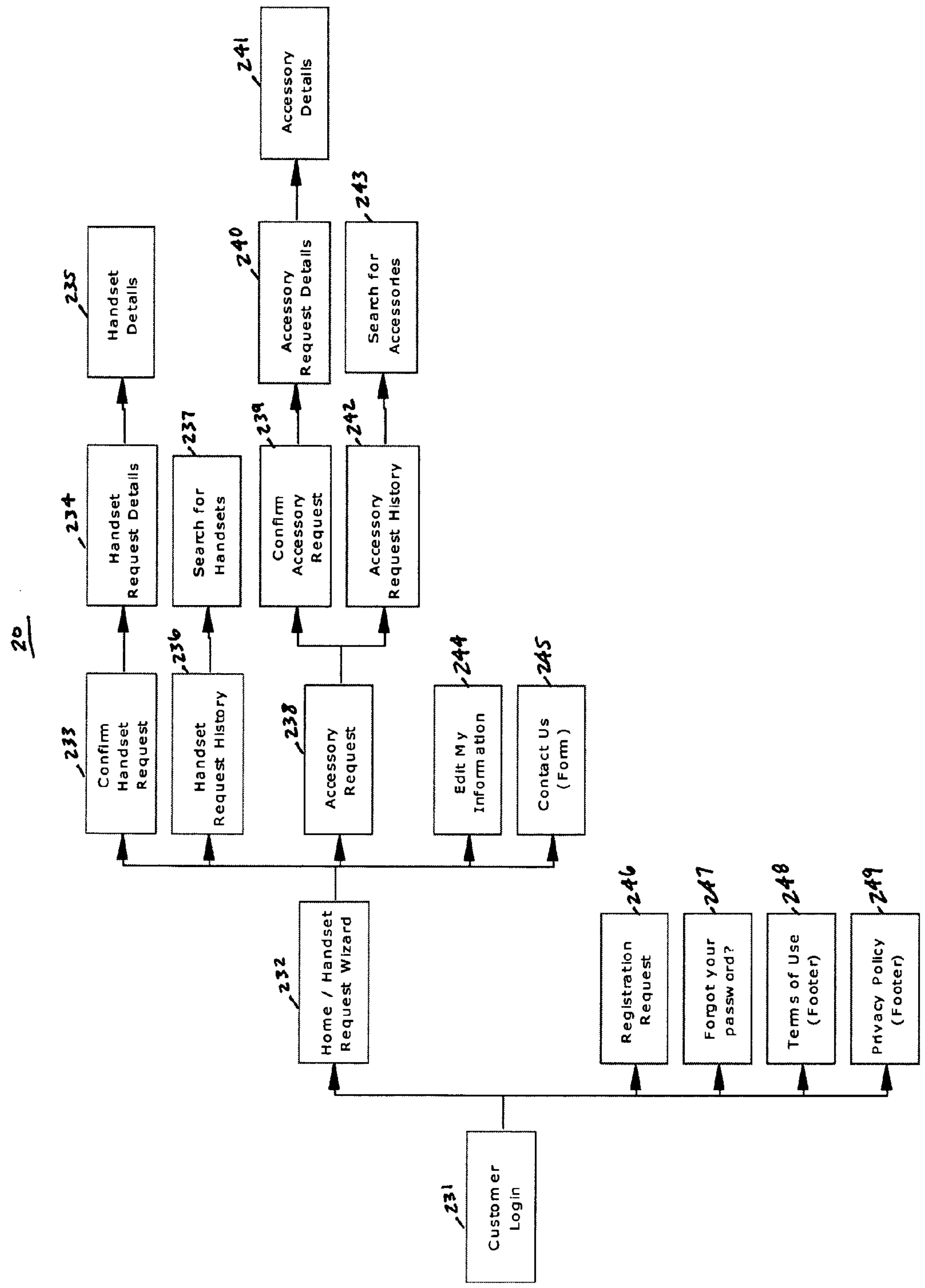
FIG. 2B illustrates a user interface map for a customer process according to one embodiment the present invention.

FIG. 2B illustrates a user interface map 230 according to one embodiment of the present invention. In one implementation, a user interface map 230 includes a set of UIs that may be presented to a user. In general, the UIs may be presented through an interactive computer screen to solicit information from and present information to a user in conjunction with the customer process 220. For example, the UIs may be presented through a client system 110, including a personal computer running a browser application and having various input/output devices (e.g., keyboard, mouse, touch screen, etc.) for receiving user input.

Figure 2C:
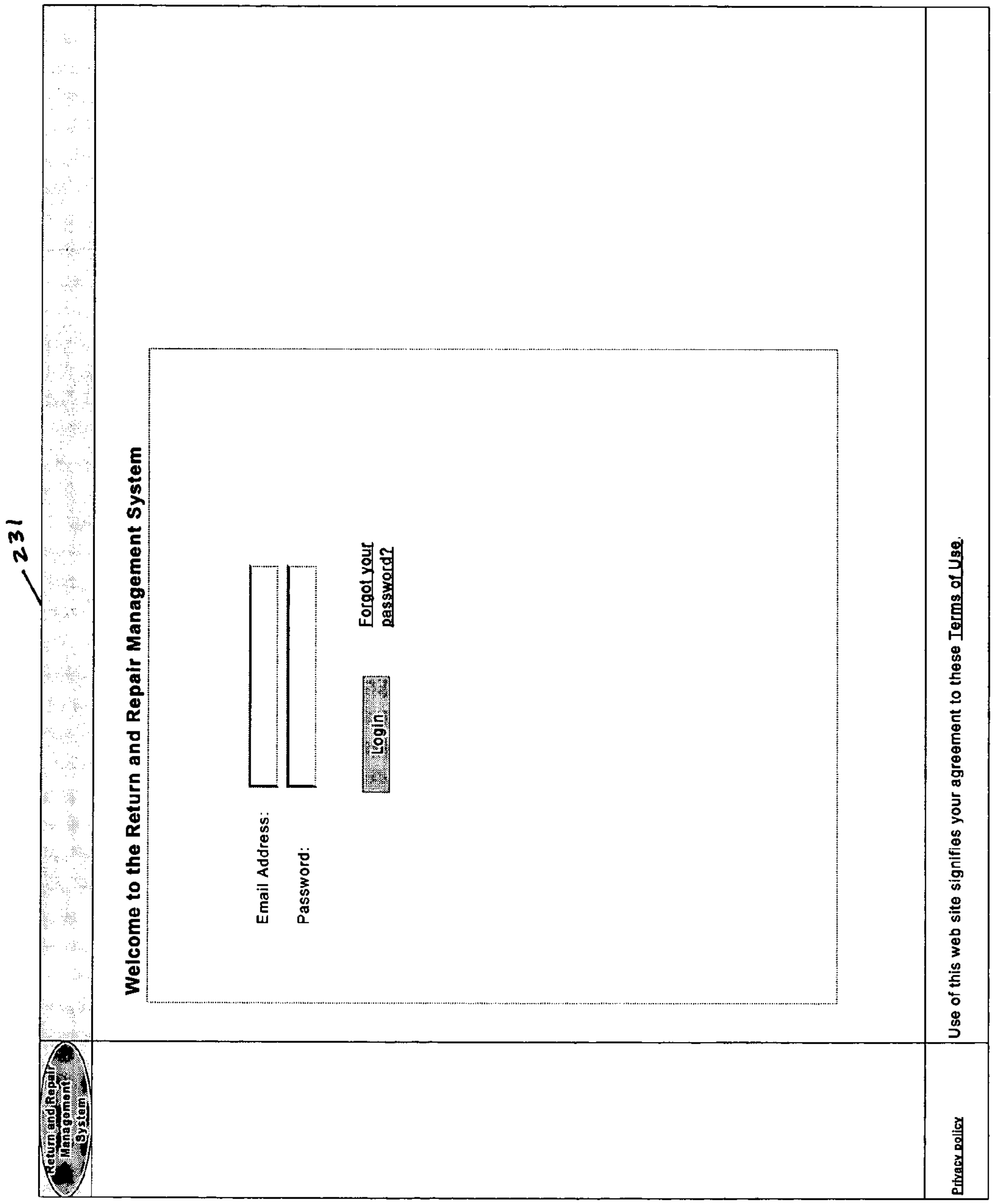
FIGS. 2C-2U illustrate user interfaces for a customer process according to one embodiment the present invention.

As shown, the user interface map 230 includes a customer login UI 231. FIG. 2C illustrates one embodiment of a customer login UI 231 that may be used to enter an email address and a password to access the system. In general, the system maintains email addresses and corresponding passwords entered by users during registration.

Figure 2D:
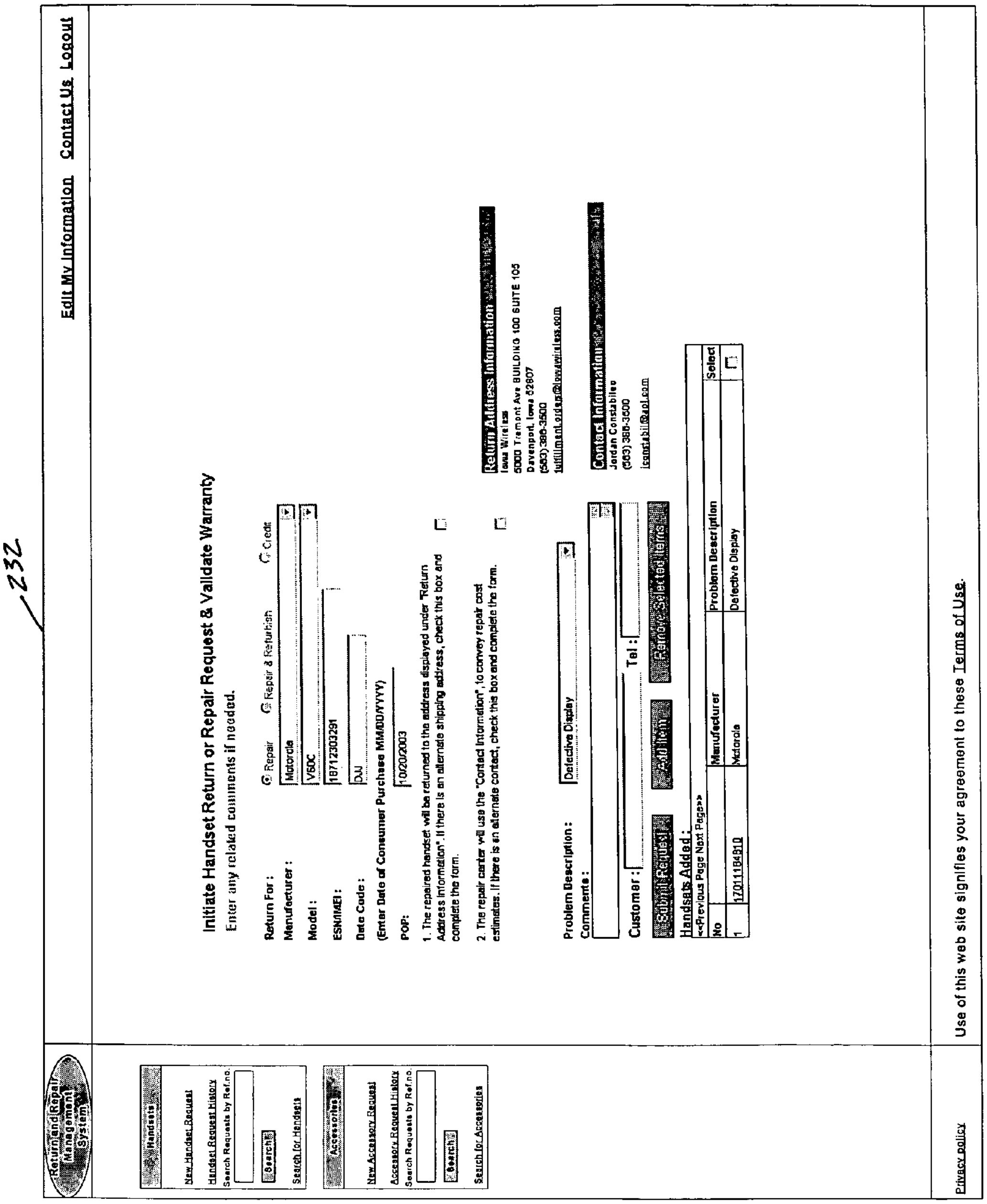

The user interface map 230 includes a new handset request/edit handset UI 232. FIG. 2D illustrates one embodiment of a UI 232 that allows a user to add a new handset and/or to edit existing handsets. When in edit handset mode, the page title may read "edit handset" and the "add a handset" button reads "submit change." If the "credit" radio button is selected and the customer ESN validation flag is YES, the system will validate the ESN number against a proprietary database to ensure that the ESN corresponds to a handset purchased by the customer.

After the "add handset" button is selected, the system validates the ESN number against one of three hard coded syntax rules depending on manufacturer and model option. The system also will perform ESN validation if the return is for credit and the ESN validation flag is set to YES for a particular customer. If the ESN is validated, the system adds the ESN, the manufacturer, the model, and the first 40 characters of the problem to a handset list. The system also clears the form except for manufacturer+model pre-populated with previous values. If the validation fails, the system will not add the handset to the handset list and will display an error message in a message area.

A user may click on hyperlinked ESN numbers to edit a particular handset. When the user clicks on the "submit change" button, the system reapplies all validation rules. To remove handsets from a request, the customer checks one or more "select" boxes and clicks on the "remove selected handsets" button.

Email addresses may be displayed in separate fields to enable mailto links when displayed. Problem description and manufacturer+model pull down menu options may be either hard coded or managed directly in a database.

Figure 2E:
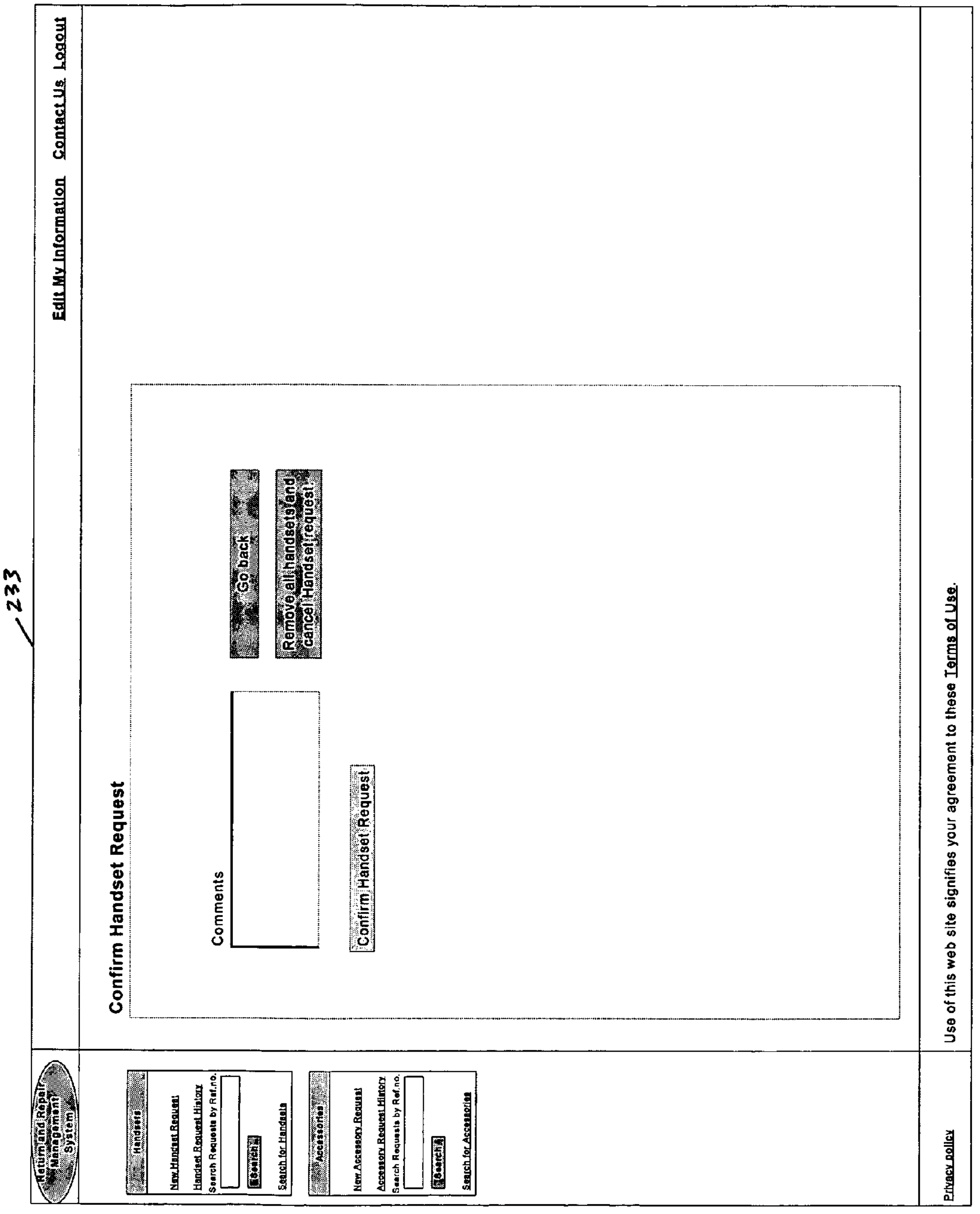

The user interface map 230 includes a confirm handset request UI 233. FIG. 2E illustrates one embodiment of a confirm handset request UI 233 that may be presented to a user. In one implementation, the UI 233 includes a "comments" area for inputting text. The "go back" button allows a user to navigate to the previous screen. The user also may cancel the entire handset request and remove all handsets. When the "confirm handset request" button is selected, a reference number is generated, a handset request details screen is displayed, and the reference number is added to the handset request history.

Figure 2F:
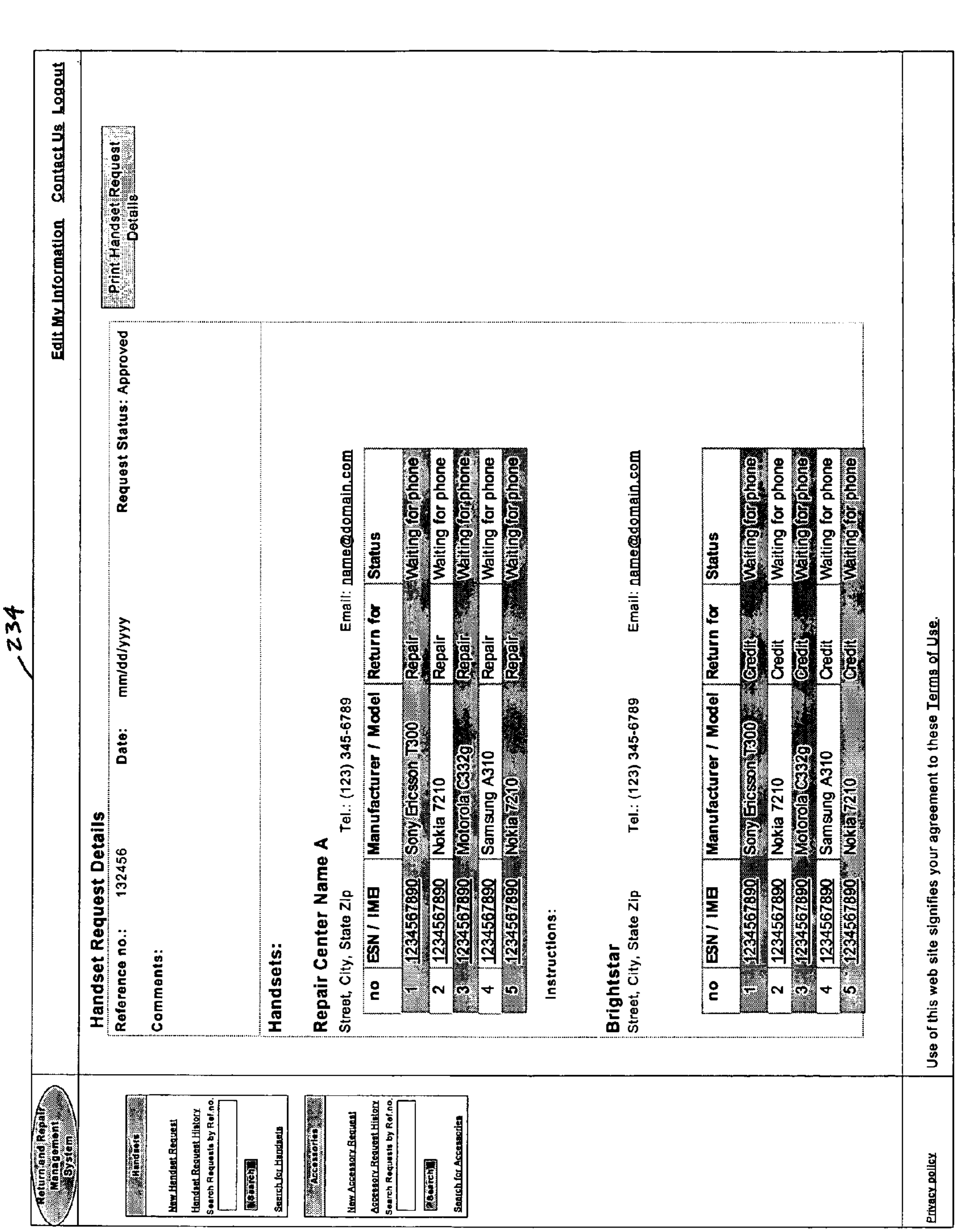

The user interface map 230 includes a handset request details UI 234. FIG. 2F illustrates one embodiment of a handset request details UI 234 that may be presented to a user. In one implementation, the same wireframe may be applied to all handset request details screens in the handset request history. All destinations (each with its corresponding contact information, instructions and list of handsets) may be displayed on this screen.

The request status may be assigned by the system automatically. In one implementation, the possible status values may include: approved (reference number generated), in progress (at least one handset is not complete), and complete (all handsets in request are complete). ESN numbers may be linked to a handset details screen, which includes handset repair status. A "print handset request details" button may be selected to reformat the information in a printer-friendly fashion (e.g., removing navigation) and to print handset request details.

Figure 2G:
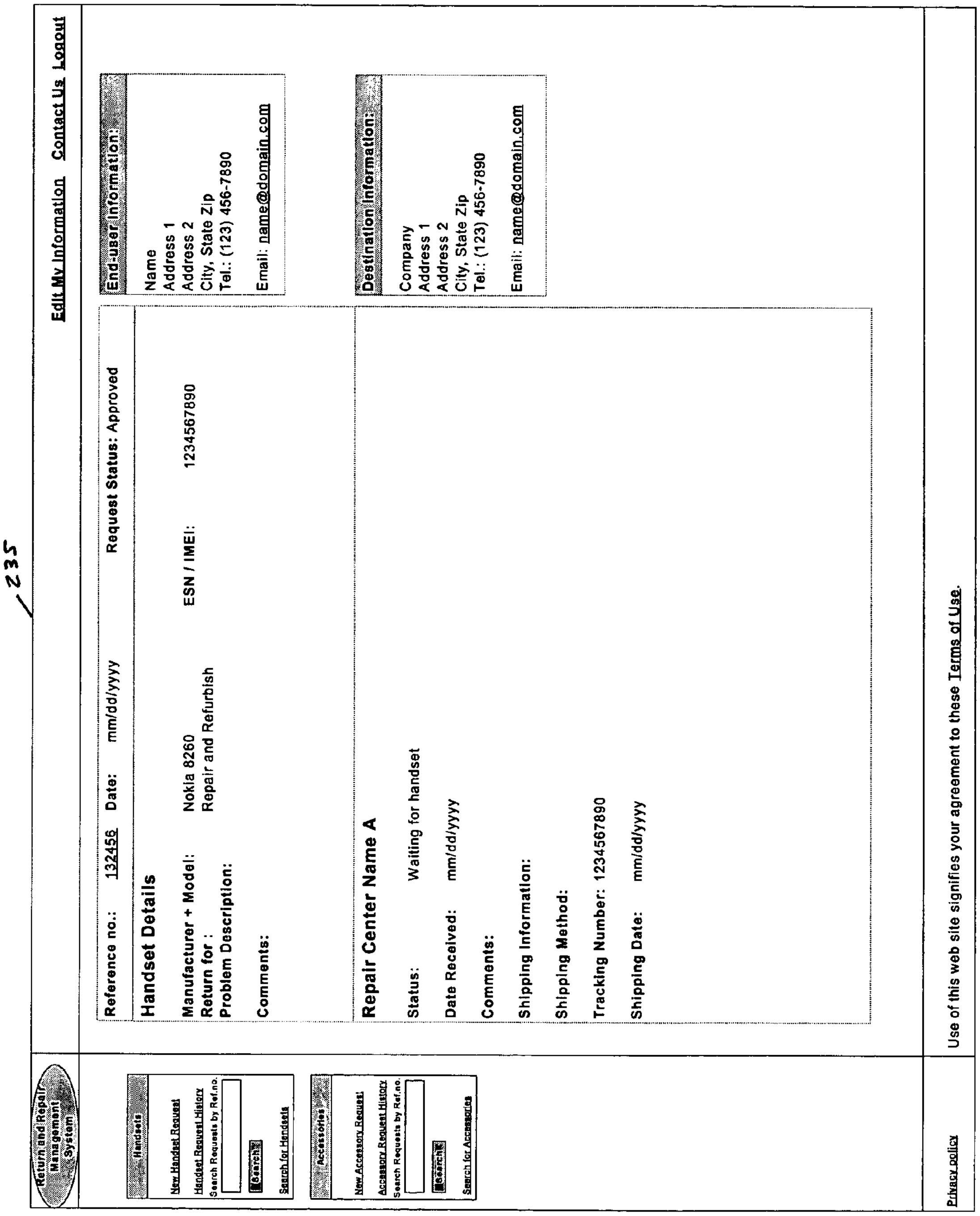

The user interface map 230 includes a handset details UI 235. FIG. 2G illustrates one embodiment of a handset details UI 235 that may be presented to a user. In one implementation, the same wireframe may be applied to handsets returned for credit.

As shown, reference numbers may be hyperlinked to handset request details. Possible handset status values for repair centers may include: waiting for handset, received, in progress, back order, and shipped. Status values for handsets returned for credit may include: waiting for item, received, credit issued, credit rejected, and returned to customer. Handset status controls may be available from a repair center interface or from a for credit destination interface. Shipping information may be displayed when available.

Figure 2H:
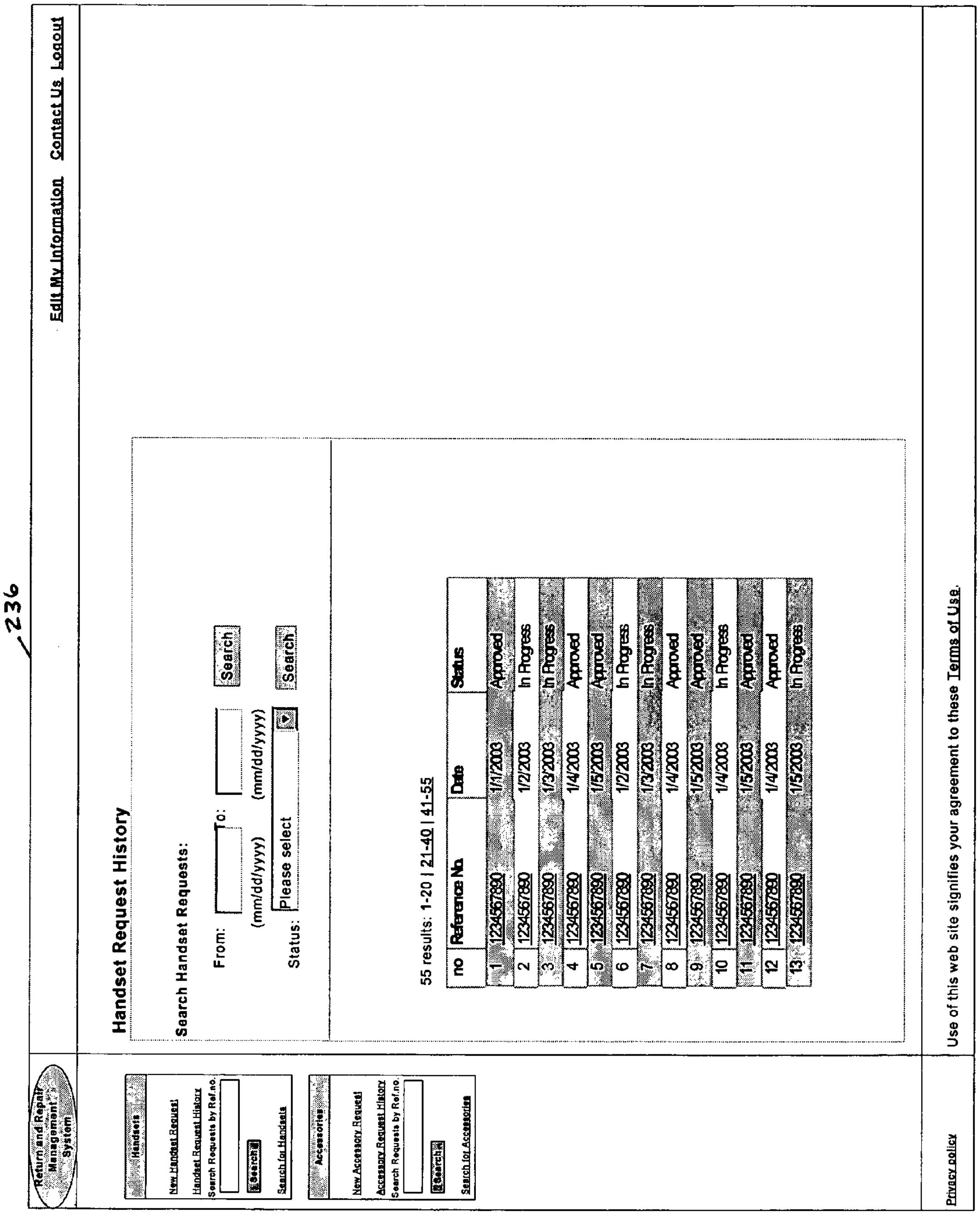

The user interface map 230 may include a handset request history UI 236. FIG. 2H illustrates one embodiment of a handset request history UI 236 that may be presented to a user. In one implementation, only "approved" and "in progress" handset requests are listed by default. The same wireframe may be applied to all handset request search results.

As shown, a message area displays on-screen help and error messages. Reference numbers may be hyperlinked to handset request details. A search by reference number may return corresponding handset request details. The "search for handsets" link may be clicked to display a search screen.

Figure 2I:
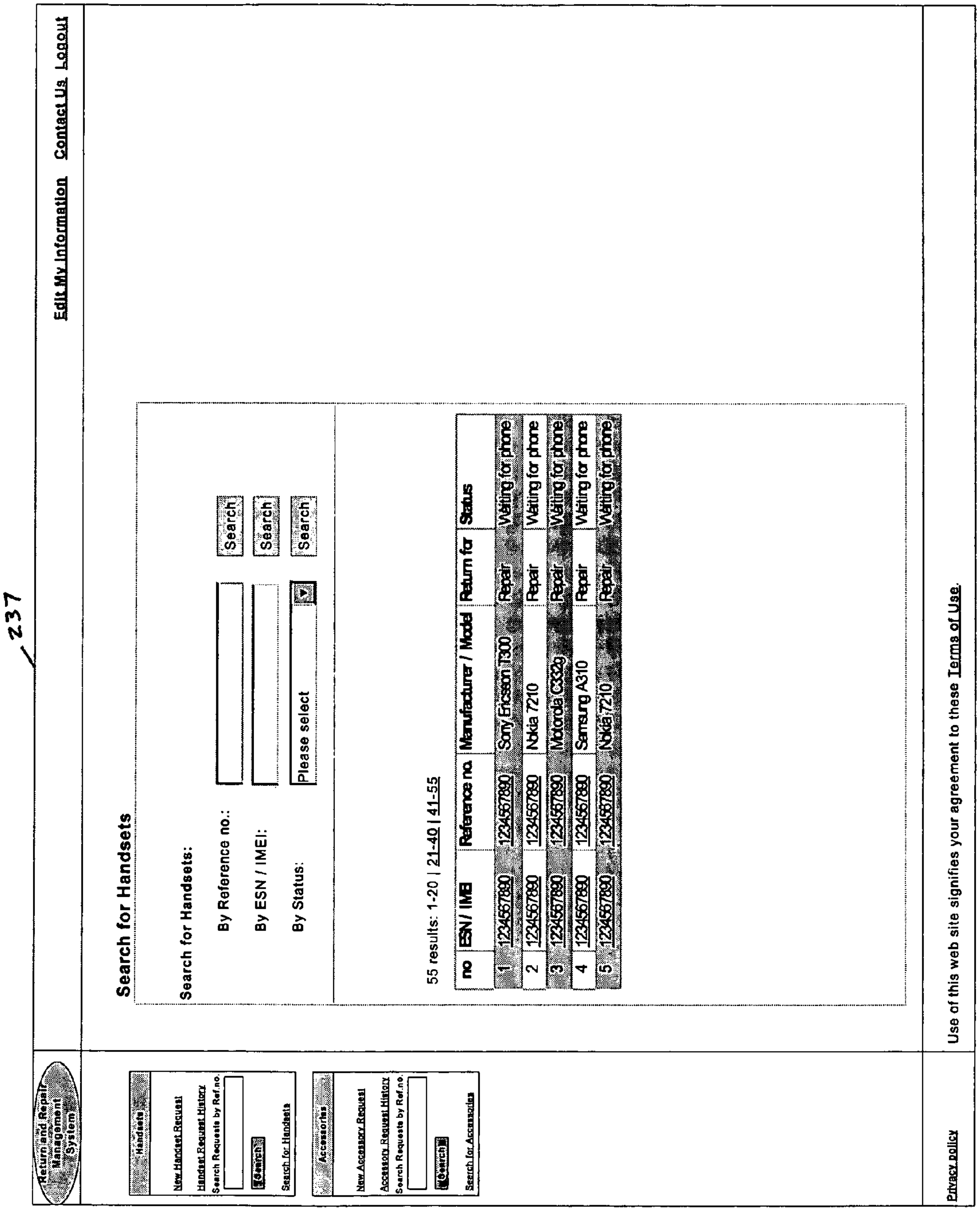

The user interface map 230 includes a search for handsets UI 237. FIG. 2I illustrates one embodiment of a search for handsets UI 237 that may be presented to a user. In one implementation, the same wireframe may be applied to all search for handset search results.

As shown, a message area may display on-screen help and error messages. ESN/IMEI numbers may be hyperlinked to handset details. A search by ESN/IMEI may display corresponding handset details directly. Reference numbers may be hyperlinked to corresponding handset request details.

Figure 2J:
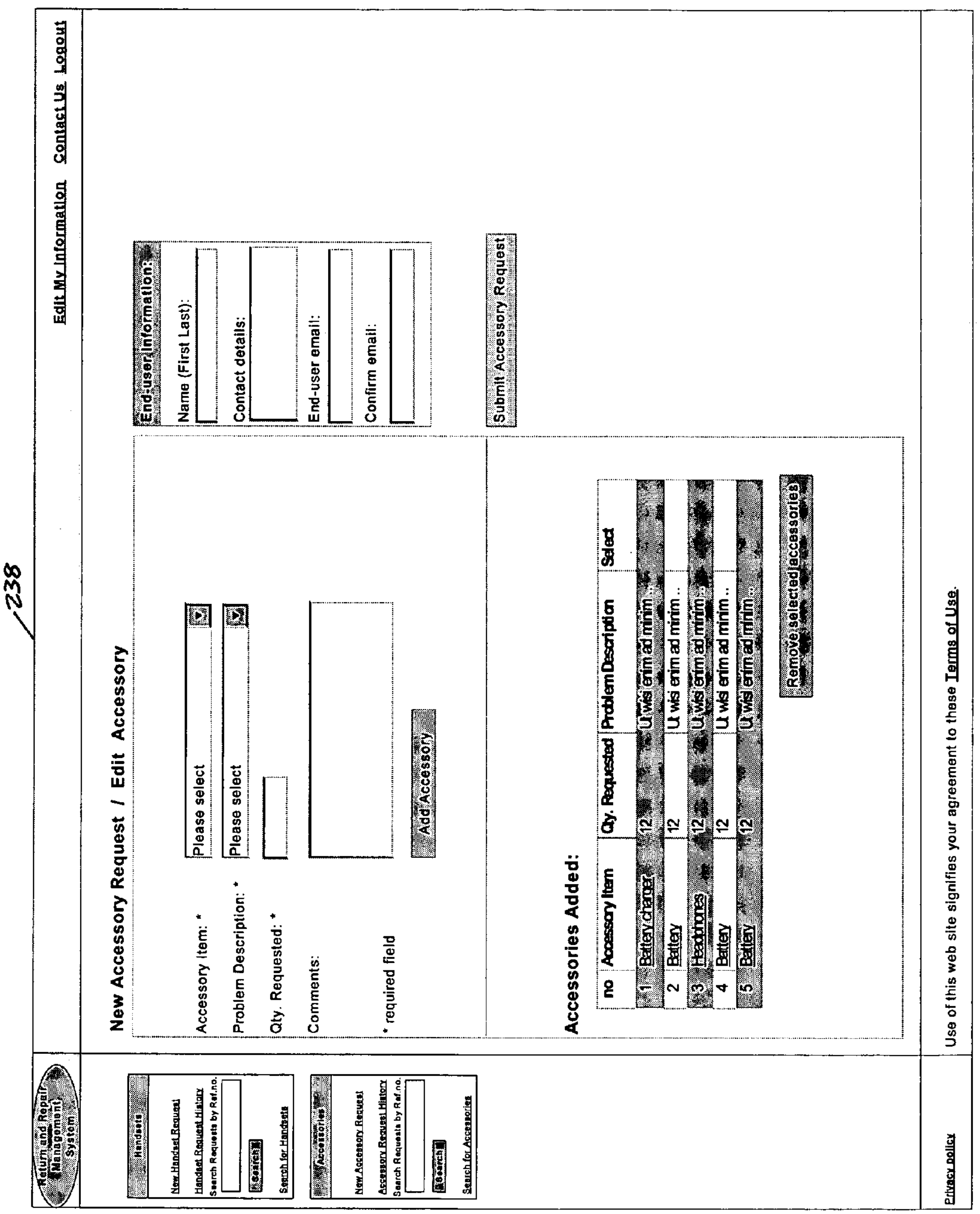

The user interface map 230 includes an accessory request UI 238. FIG. 2J illustrates one embodiment of an accessory request UI 238 that may be presented to a user. In one implementation, the wireframe may be applied to add a new accessory and edit an existing accessory. When in edit accessory mode, the page title reads "edit accessory" and the "add accessory" button reads "submit change."

As shown, accessory item and problem description pull-down menu options are available. In general, all accessories are returned for credit and the system performs no validation except for verifying that there is no information missing when an accessory is added. A message area may display on-screen help and error messages.

A user may click on hyperlinked accessory items to edit a particular accessory. When changes to an accessory item have been made, the user clicks on "submit change" button to make changes. To remove accessories from the accessory request, the customer checks one or more "select" boxes and clicks on the "remove selected accessories" button. Email addresses may be displayed in separate fields to enable a mailto link when displayed.

Figure 2K:
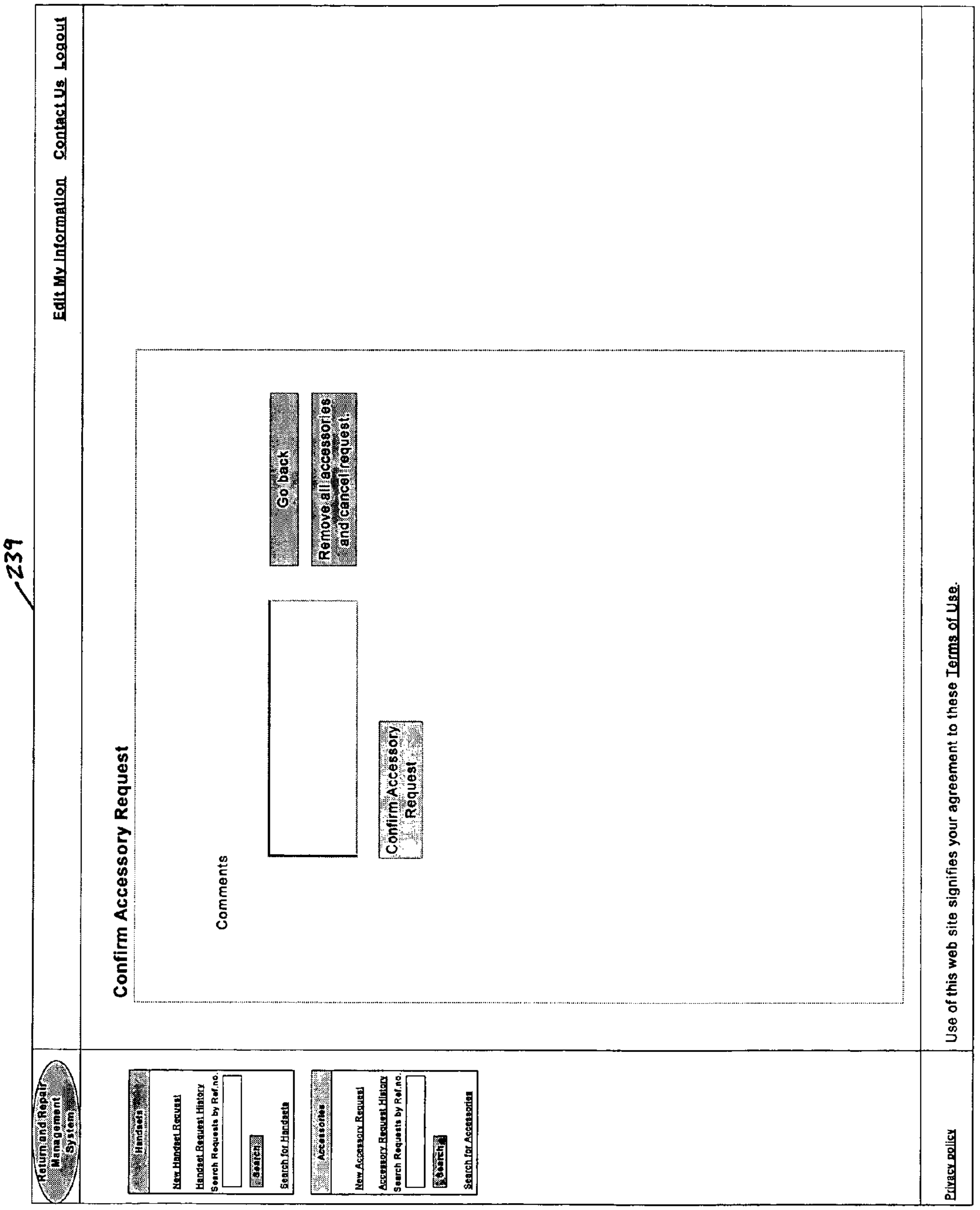

The user interface map 230 includes a confirm accessory request UI 239. FIG. 2K illustrates one embodiment of a confirm accessory request UI 239 that may be presented to a user. As shown, the UI 239 includes a "comments" area for entering text. The "go back" button may be used to navigate back to the accessory request screen. The user may cancel the accessory request and remove all accessories. The "confirm accessory request" button generates a requested ID, displays an accessory request details screen, and adds the accessory request to the accessory request history.

Figure 2L:
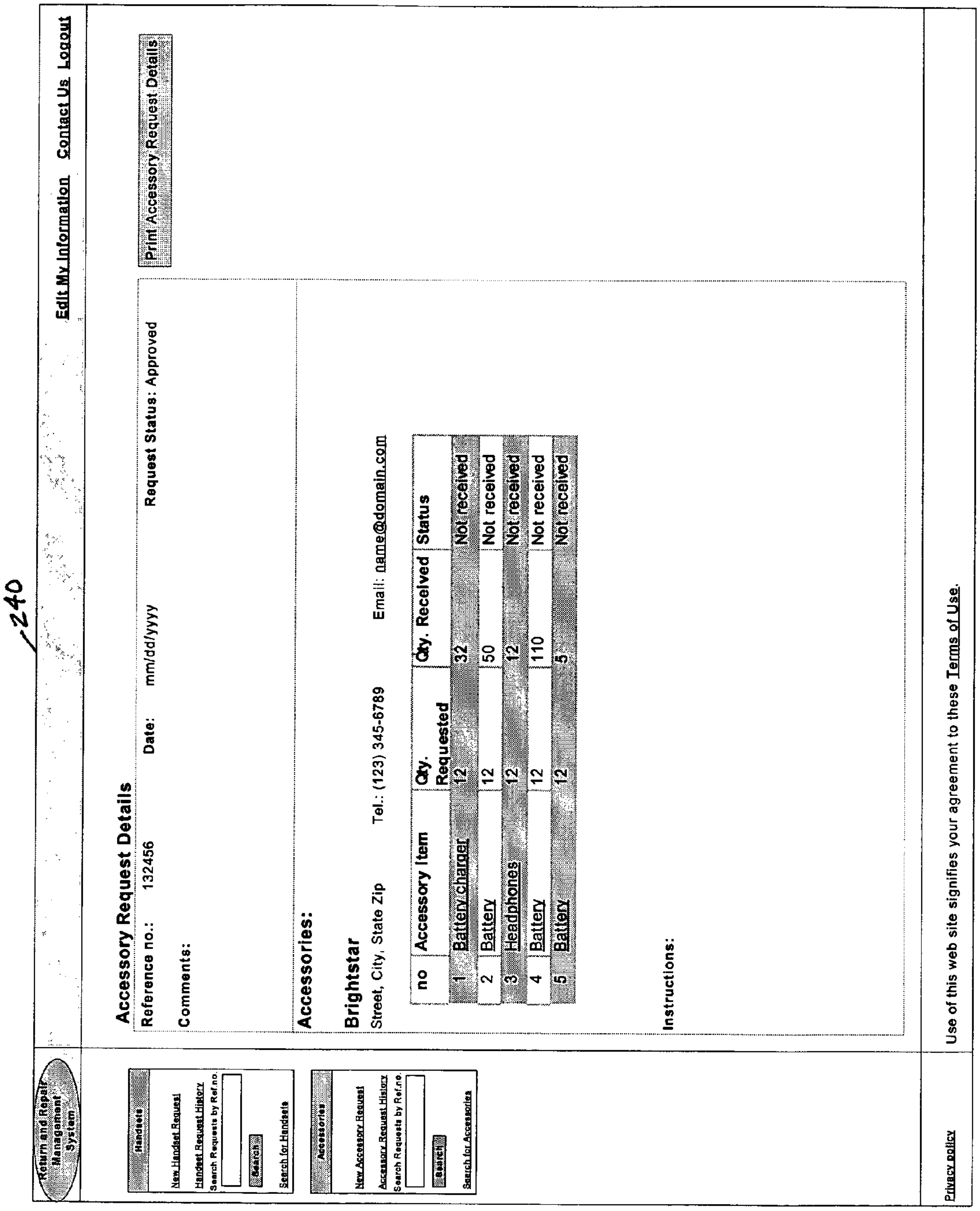

The user interface map 230 includes an accessory request details UI 240. FIG. 2L illustrates one embodiment of an accessory request details UI 240 that may be presented to a user. In one implementation, all accessories are listed on a single page. The same wireframe may apply to all accessory request details screens in the accessory request history.

The request status may be assigned by the system automatically. In one implementation, the possible status values include "approved (accessory return ID generated), in progress (at least one accessory is not complete), and complete (all accessories in accessory request are complete).

Hyperlinked accessory items may be linked to an accessory details screen, which includes accessory status. The "print accessory request details" button reformats information in a printer-friendly fashion (e.g., removing navigation) and prints the accessory request details.

Figure 2M:
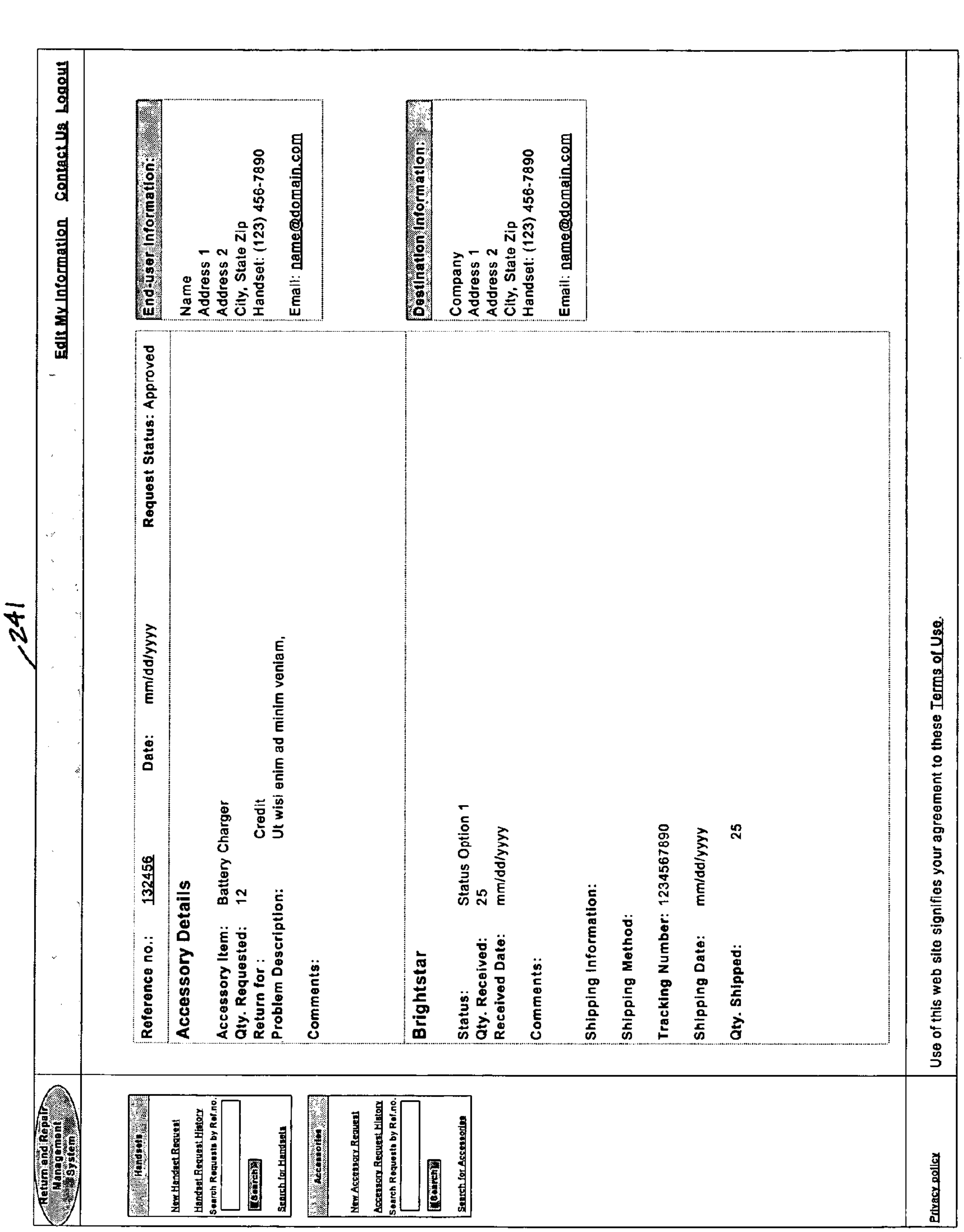

The user interface map 230 includes an accessory details UI 241. FIG. 2M illustrates one embodiment of an accessory details UI 241 that may be presented to a user. In one implementation hyperlinked reference numbers may be linked to accessory request details.

Requested status may be assigned by the system automatically. In one implementation, the possible status values include: approved (accessory return ID generated), in progress (at least one accessory is not complete), and complete (all accessories in accessory request are complete). Accessory status values may include: waiting for item, received, credit issued, credit rejected, and returned to customer. Shipping information may be displayed when available.

Figure 2N:
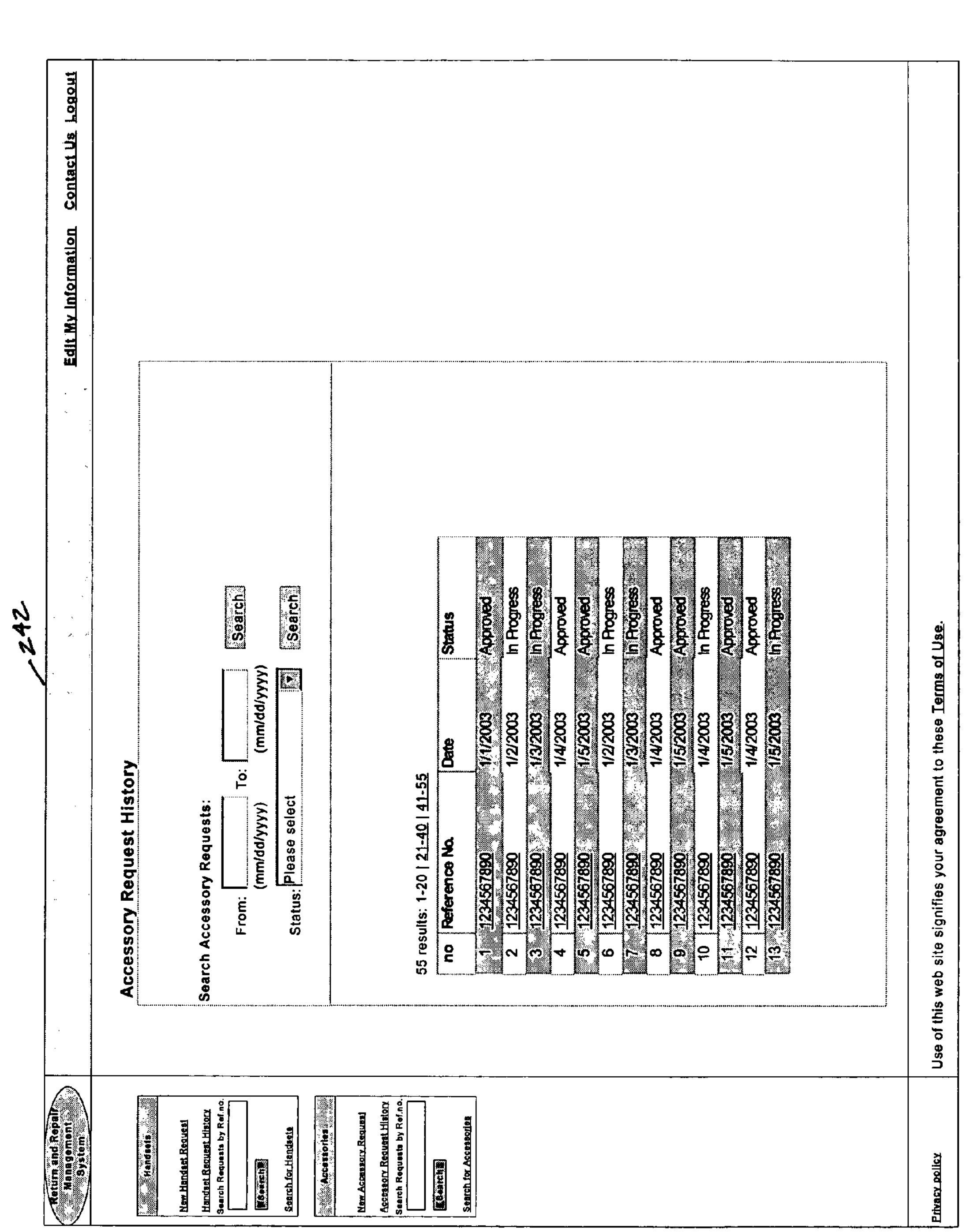

The user interface map 230 includes an accessory request history UI 242. FIG. 2N illustrates one embodiment of an accessory request history UI 242 that may be presented to a user. In one implementation, only "approved" and "in progress" accessory requests are listed by default. The same wireframe applies to all search accessory requests search results screens.

Accessory requests may be searched by reference number to display corresponding accessory request details directly. A message area may display on-screen help and error messages. Reference numbers may be hyperlinked to accessory requests details. A "search for accessories" link may present a search for accessories screen when clicked.

Figure 2O:
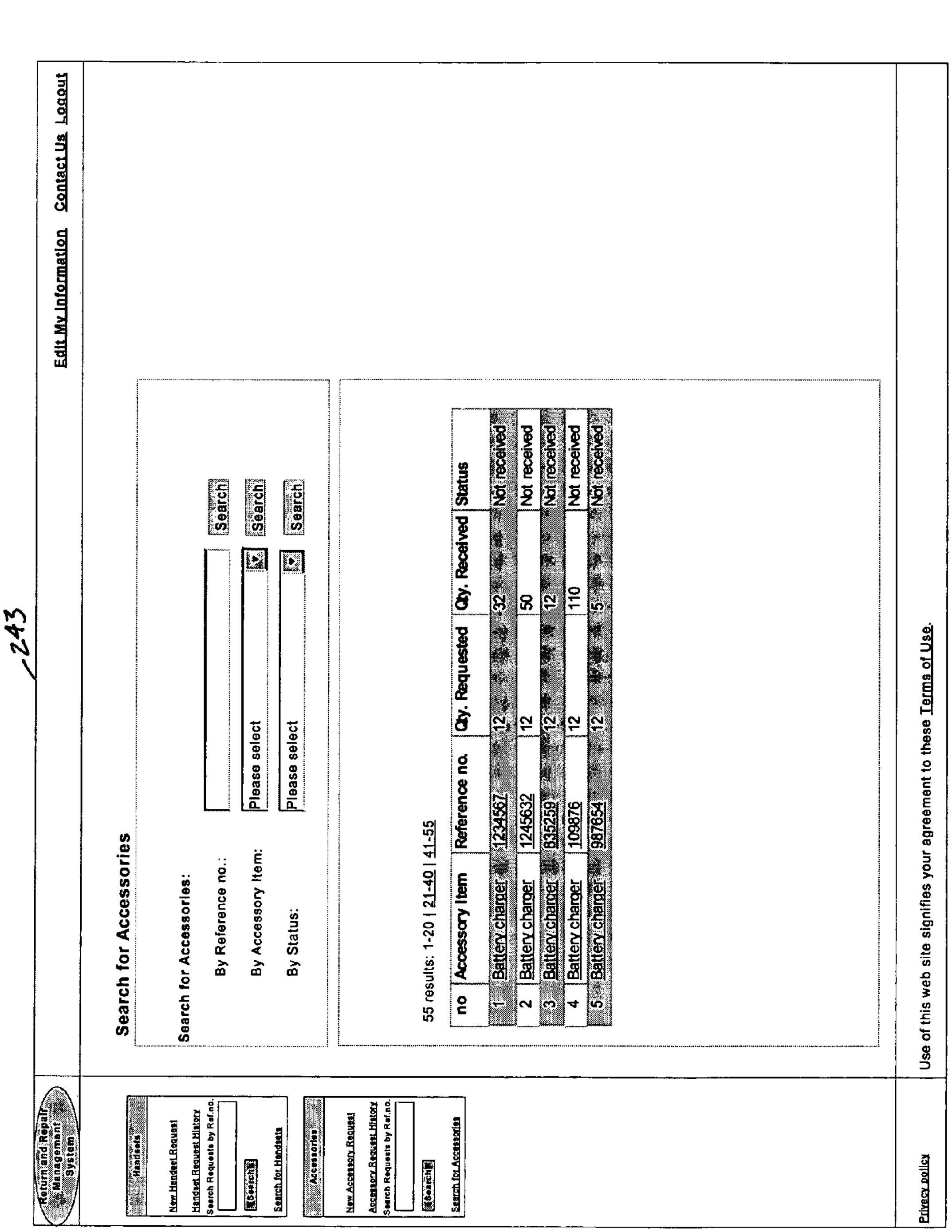

The user interface map 230 includes a search for accessories UI 243. FIG. 2O illustrates one embodiment of a search for accessories UI 243 that may be presented to a user. In one implementation, the same wireframe applies to all search by accessory item search results.

As shown, a message area may display on-screen help and error messages. Accessory items may be hyperlinked to accessory details. Reference numbers may be hyperlinked to accessory request details. In one implementation, all pages in the results list also contain search functionality.

Figure 2P:
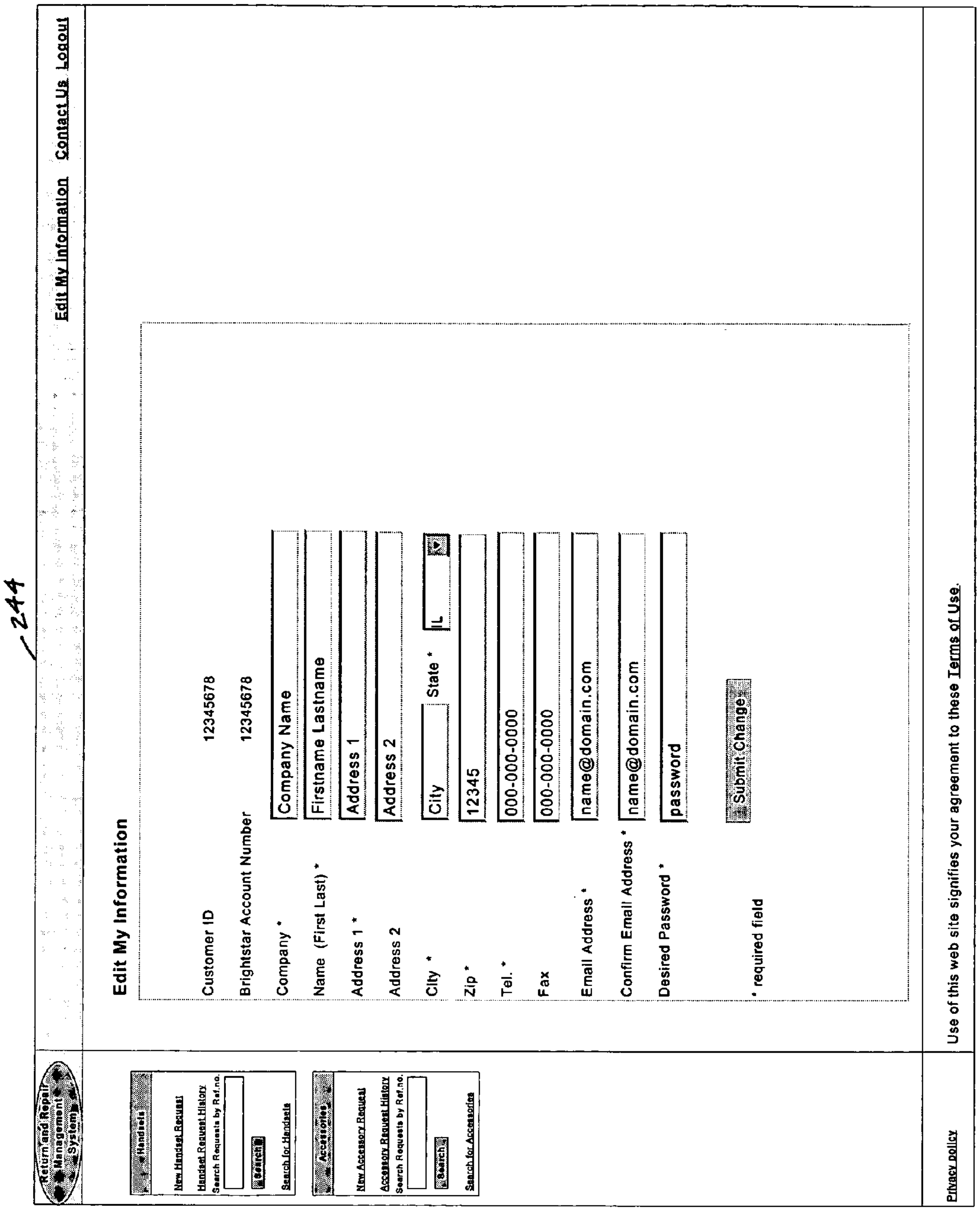

The user interface map 230 includes an edit information UI 244. FIG. 2P illustrates one embodiment of an edit information UI 244 that may be presented to a user. In one implementation, customers may be prevented from editing their account number and their customer identification. In one embodiment, an email address is entered at login.

Figure 2Q:
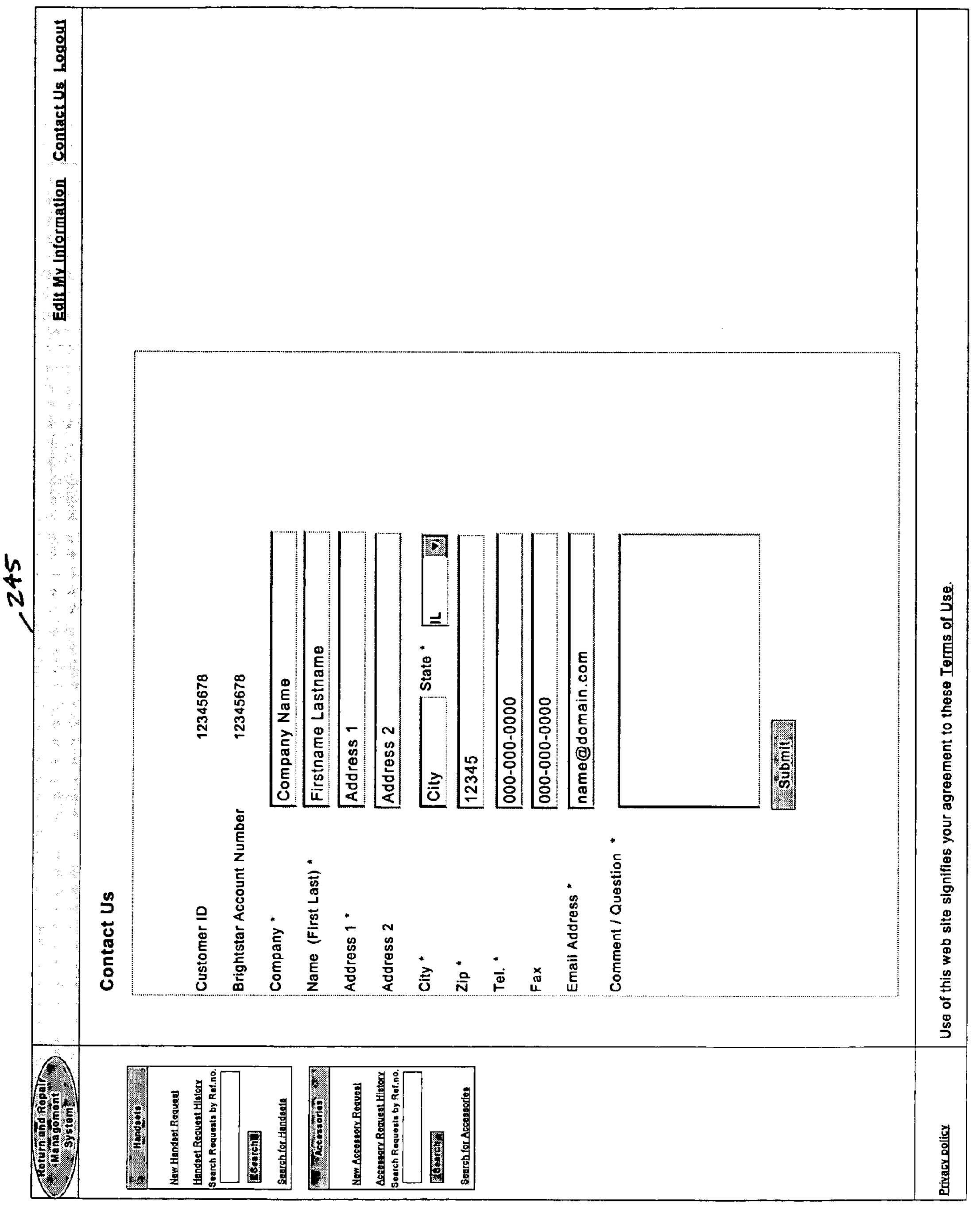

The user interface map 230 includes a contact us UI 245. FIG. 2Q illustrates one embodiment of a contact us UI 245 that may be presented to a user. In one implementation, the customer information is pre-filled with the information on record. In general, the "contact us" forms submitted are emailed to a specified address.

Figure 2R:
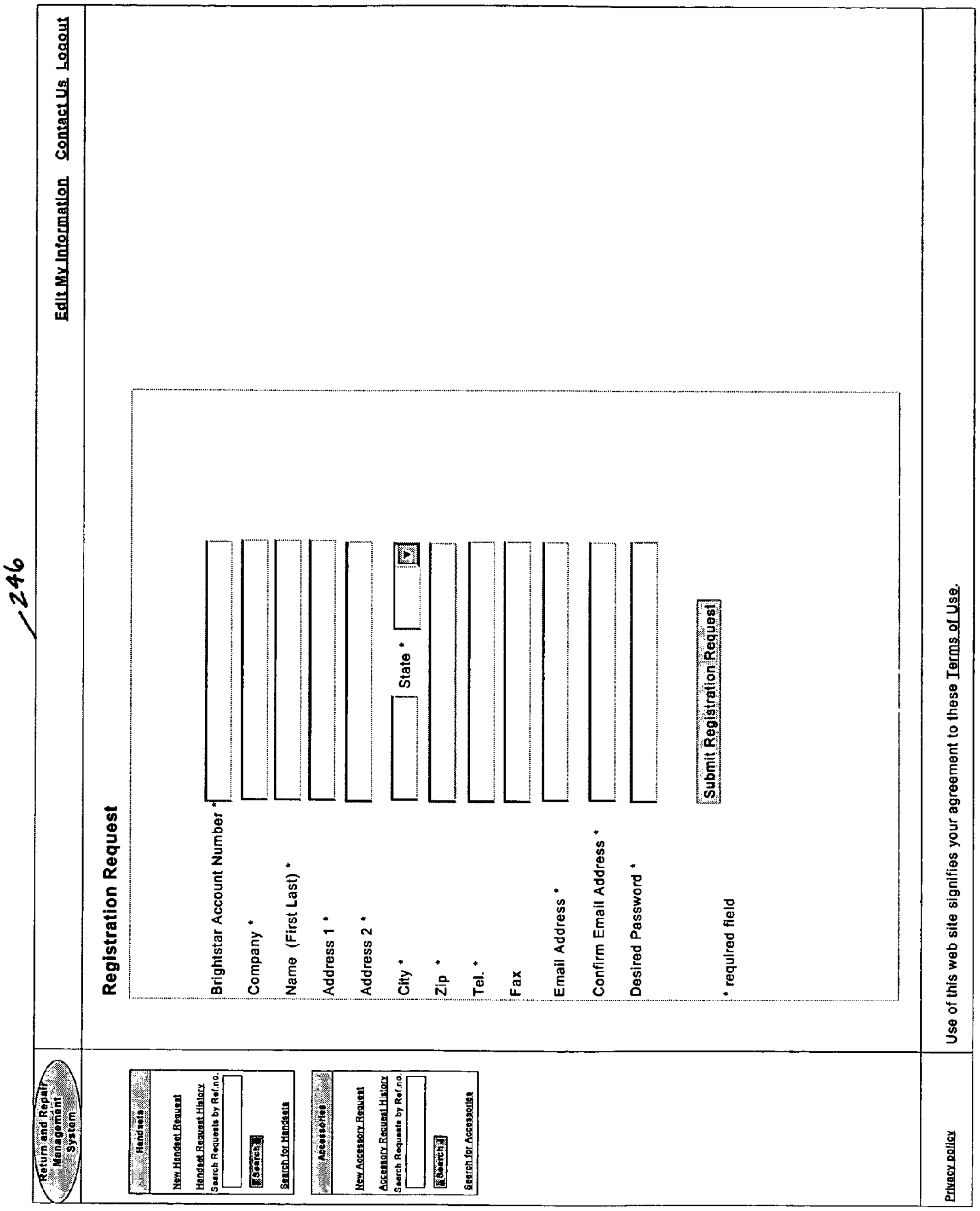

The user interface map 230 includes a registration request UI 246. FIG. 2R illustrates one embodiment of a registration request UI that may be presented to a user. In one implementation when the registration request is submitted, the system adds the request to the corresponding inbox in an administrator interface.

Figure 2S:
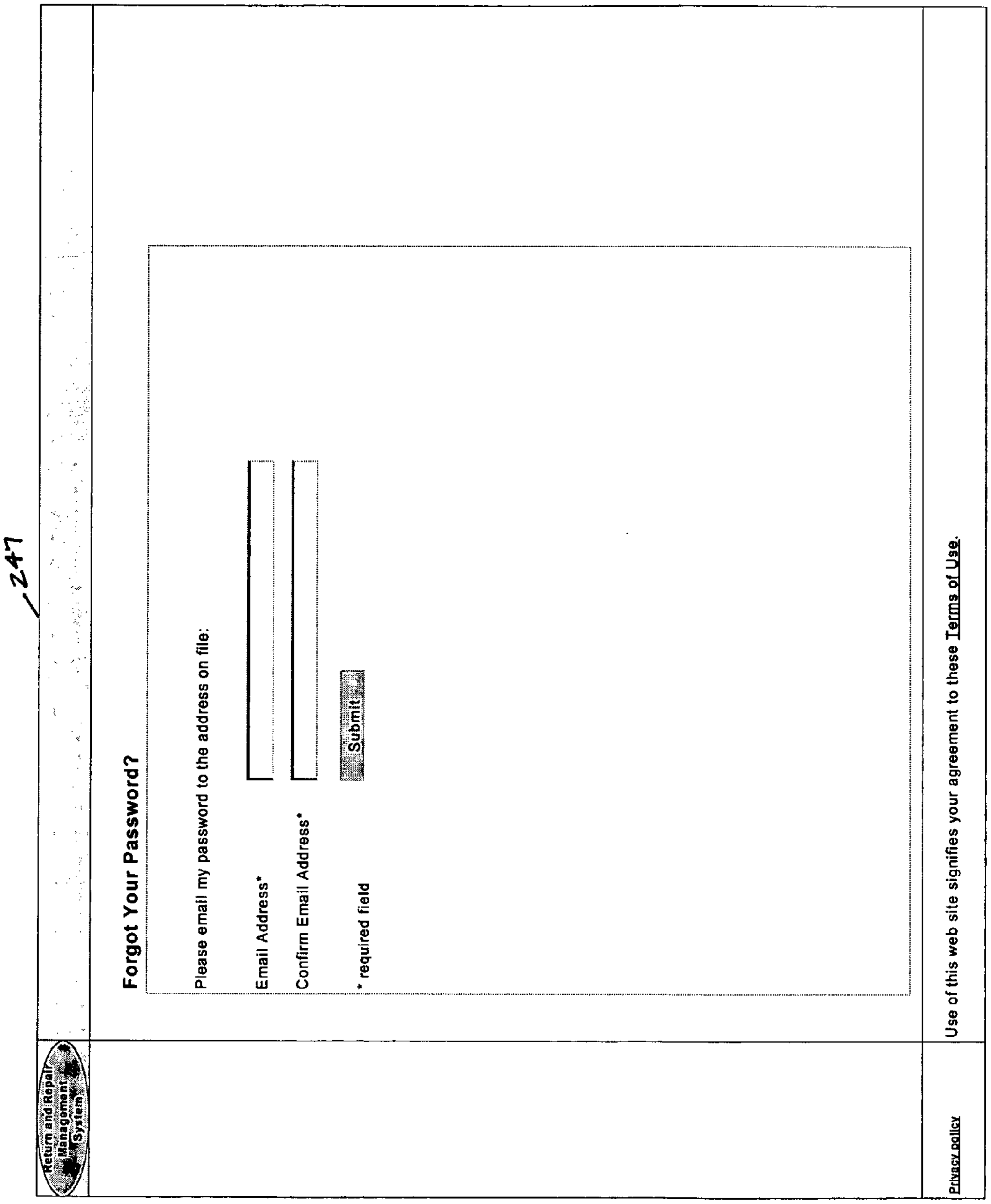

The user interface map 230 includes a forgot password UI 247 FIG. 2S illustrates one embodiment of a forgot password UI 247 that may be presented to a user. In one implementation, only valid accounts will be emailed their access details, and the system may reply with a "thank you" message.

Figure 2T:
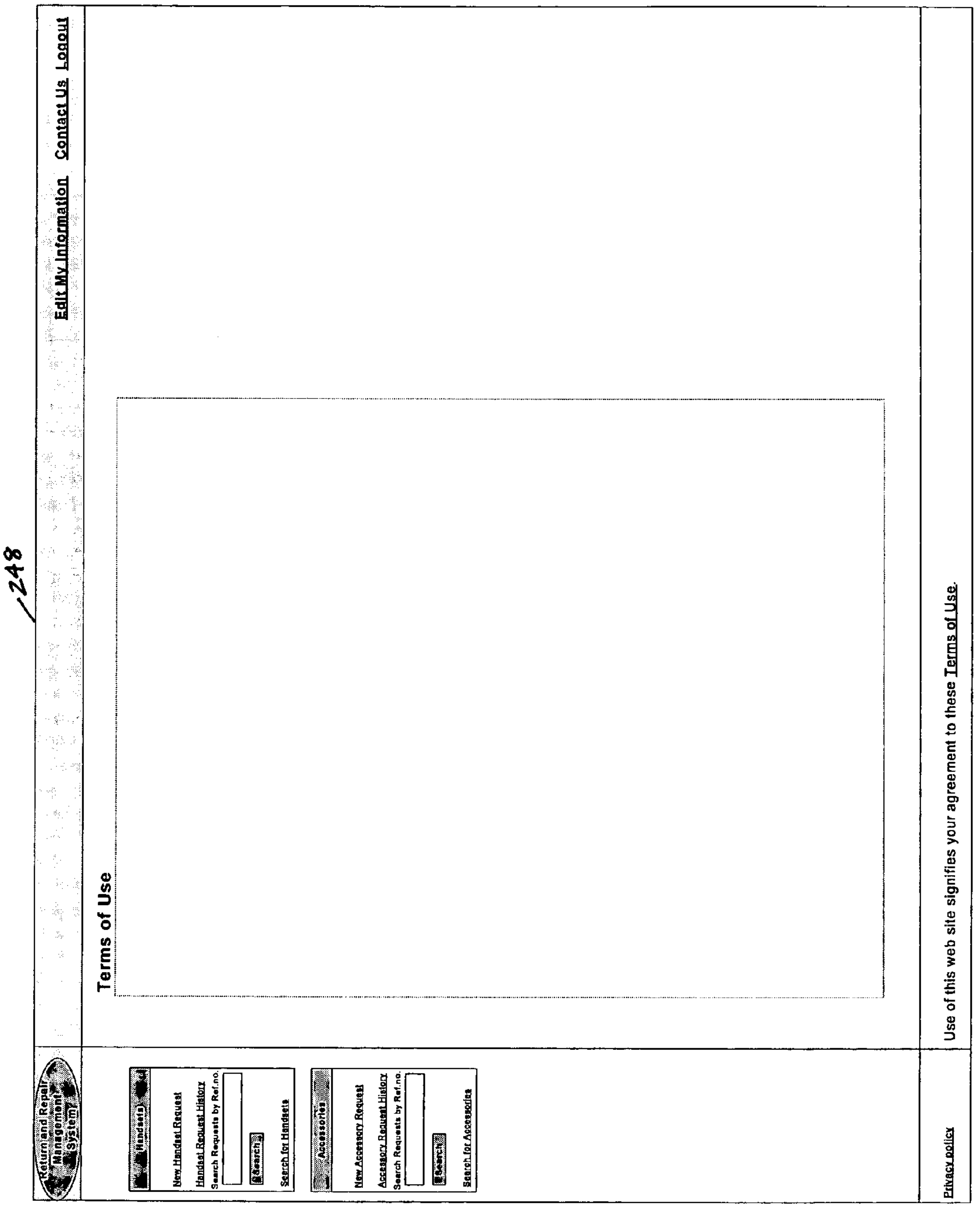
Figure 2U:
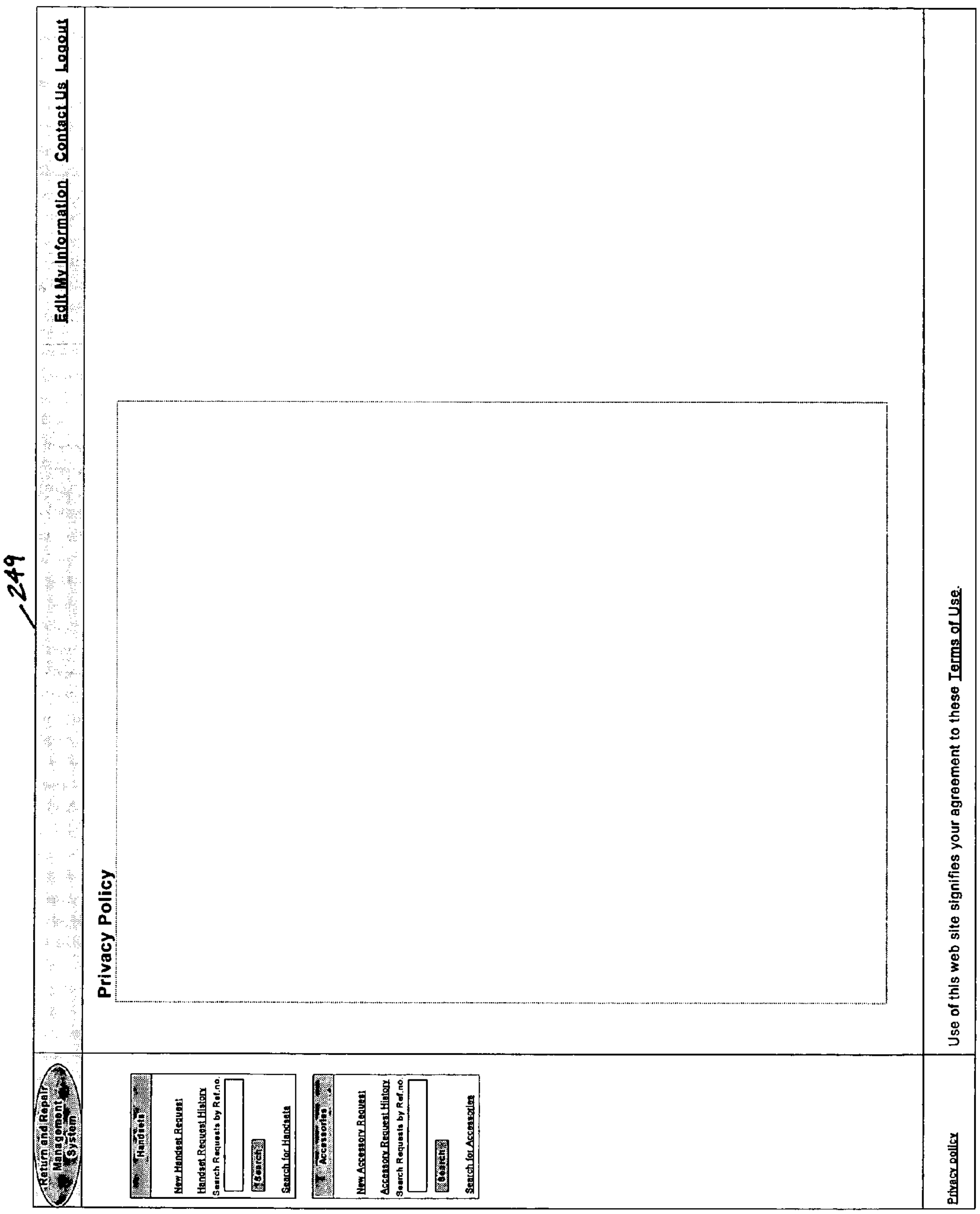

The user interface map 230 includes a terms of use UI 248. FIG. 2T illustrates one embodiment of a terms of use UI 248 that may be presented to a user. The user interface map 230 also includes a privacy policy UI 249. FIG. 2U illustrates one embodiment of a privacy policy UI 249 that may be presented to a user.

Figure 3A:
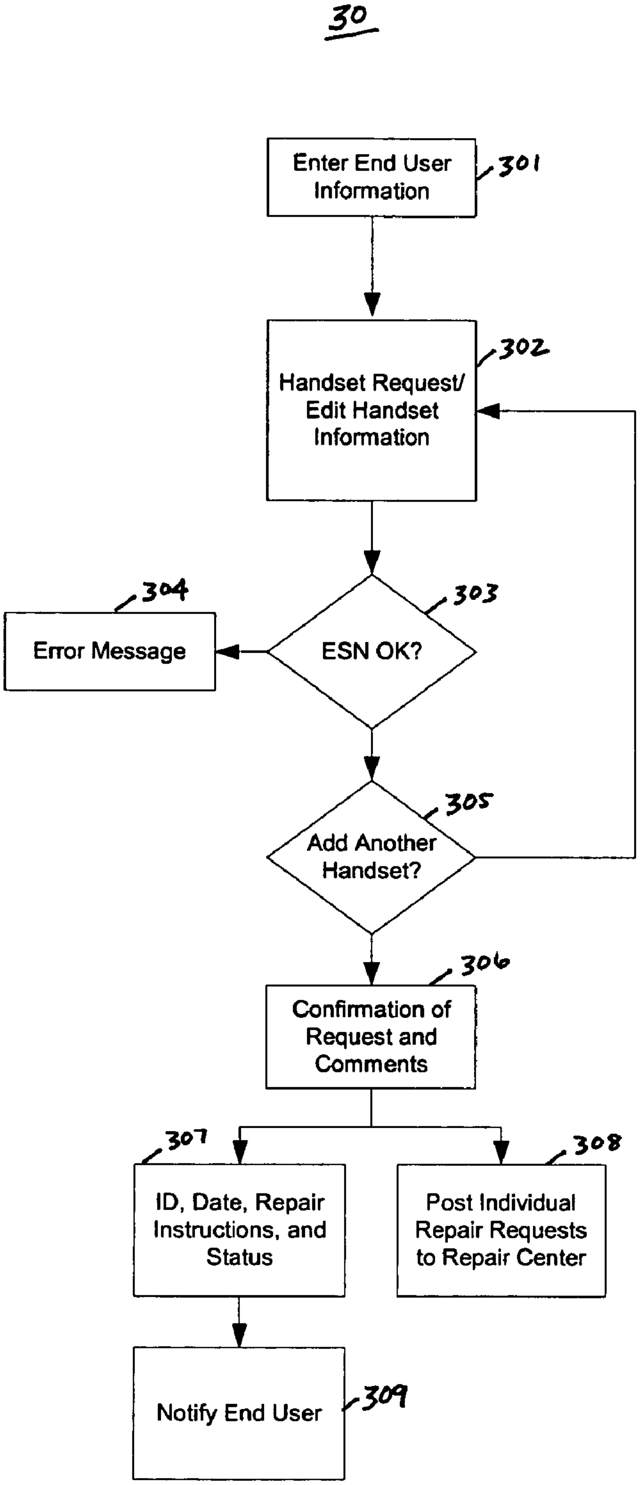
FIG. 3A illustrates an end user process according to one embodiment of a communications system according to the present invention.

Referring to FIG. 3A, the system 100 operates according to an end-user process 30. While particular embodiments and examples are described and illustrated, the process 30 may be implemented by any suitable type of hardware (e.g., device, computer, computer system, equipment, component), software (e.g., program, application, instruction set, code), storage medium (e.g., disk, device, propagated signal), or combination thereof.

At step 301, the system allows an end-user to enter information. In one implementation, information may be entered through a customer web site and/or a proprietary web site. In general, end-users can only return handsets for repair. The design may support customer-branded or co-branding options. In one embodiment, end-user information may include: name, address, city, state, zip code, email address, and telephone number.

At step 302, the system receives new handset request information and/or edited handset information. In one implementation, the handset information may include manufacturer, model, ESN/IMEI number, problem description, and end-user comments.

At step 303, the system validates the ESN number. In one implementation, the system validates the ESN number against one of three hard coded validation rules. If the validation fails, an error message is displayed (step 304).

If the ESN is validated, the system adds the ESN, the manufacturer, the model, the first 40 characters of the problem to a handset list and clears the form except for manufacturer and model pre-populated with previous values. To delete handsets from the list, the customer checks a box and clicks on a "delete handsets" button. A user may click on the ESN to edit a particular handset. At step 305, the system asks whether another handset is to be added. If so, handset information may be received (step 302).

If there are no additional handsets, the system requests confirmation of the handset request (step 306). In one implementation, comments may be added in a text area.

At step 307, identification (ID), date, repair instructions and status are displayed. In one implementation, the reference number is obtained from a proprietary data base, and the request date is assigned by the system. Handsets may be listed with shipping and/or repair instructions and may be grouped by repair center. End-users may receive email confirmation with reference number, date, handset list grouped by repair center, and a link to a handset request status page.

At step 308, individual repair requests are posted to corresponding repair centers. In one implementation, status may be updated to waiting for handset. At step 309, end-users are notified. In general, end-users may save email messages to have access to a status page.

Figure 3B:
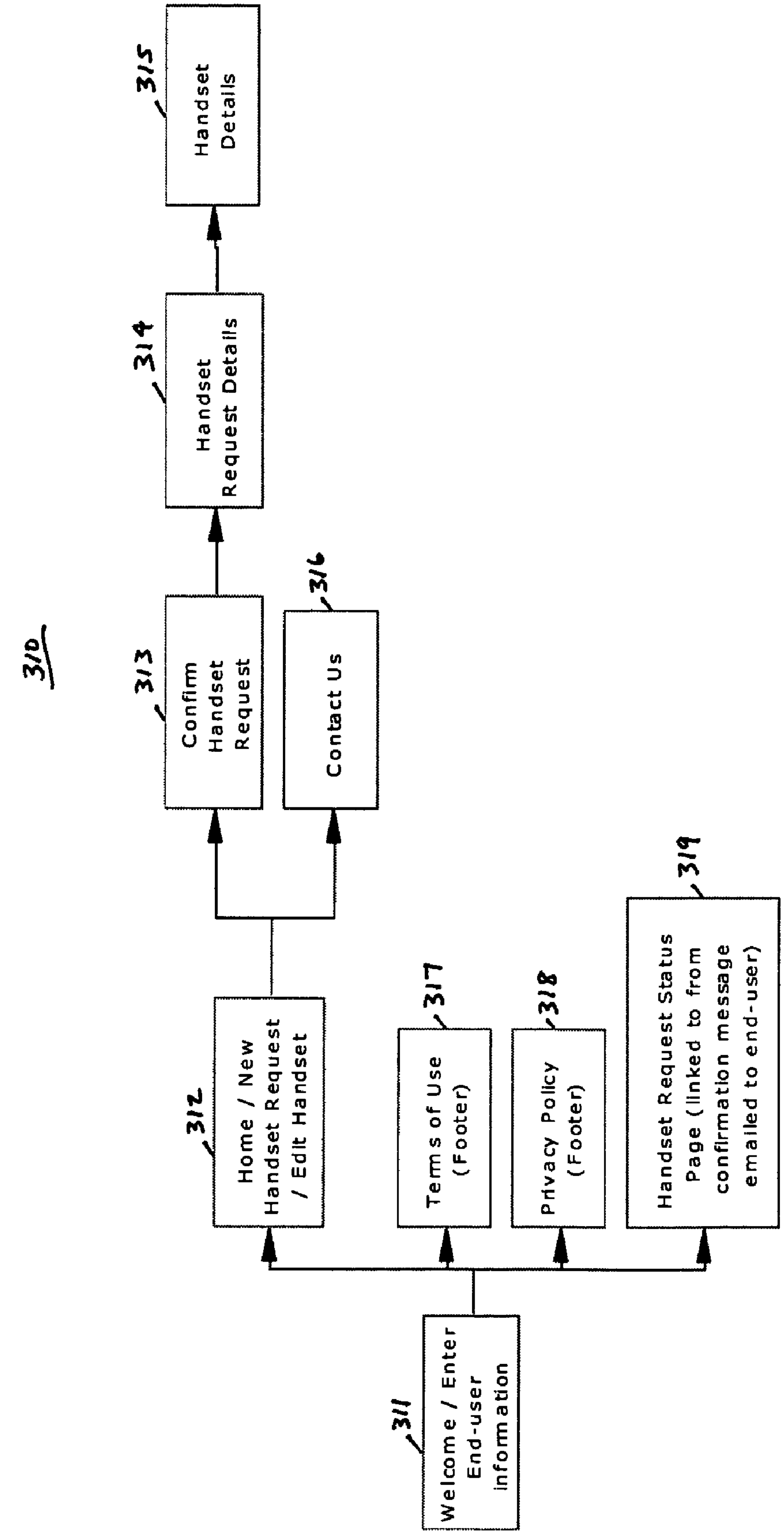
FIG. 3B illustrates a user interface map for an end user process according to one embodiment the present invention.

FIG. 3B illustrates a user interface map 310 according to one embodiment of the present invention. In one implementation, the user interface map 310 includes a set of UIs that may be presented to a user. In general, the UIs may be presented through an interactive computer screen to solicit information from and present information to a user in conjunction with the end-user process 30. For example, the UIs may be presented through a client system 110 including a personal computer running a browser application and having various input/output devices (e.g., keyboard, mouse, touch screen, etc.) for receiving user input.

Figure 3C:
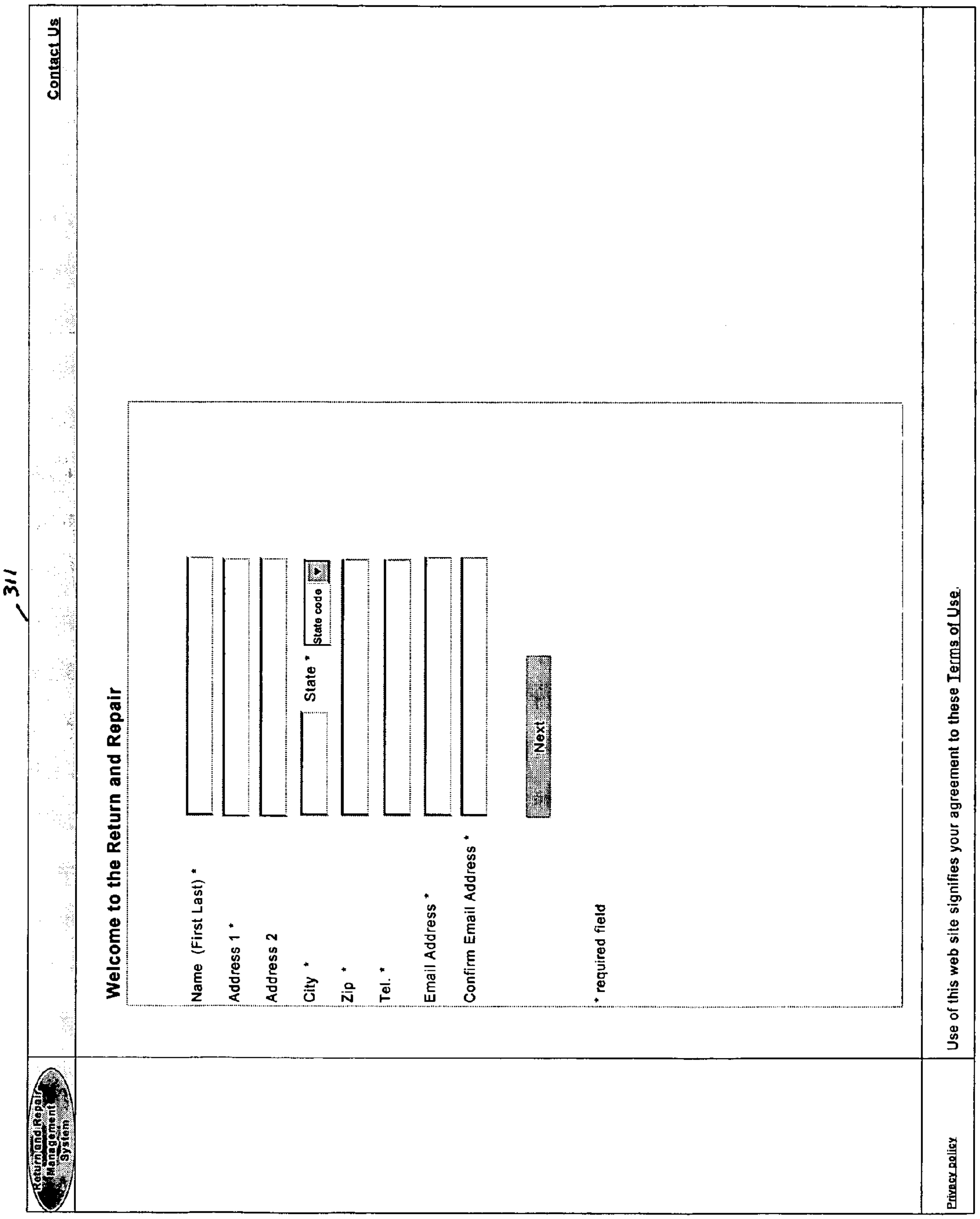

As shown, the user interface map 210 includes a welcome/enter end-user information UI 311. FIG. 3C illustrates one embodiment of a welcome UI 311 that may be presented to a user. In one implementation, the design may support customer-branded or co-branding options.

Figure 3D:
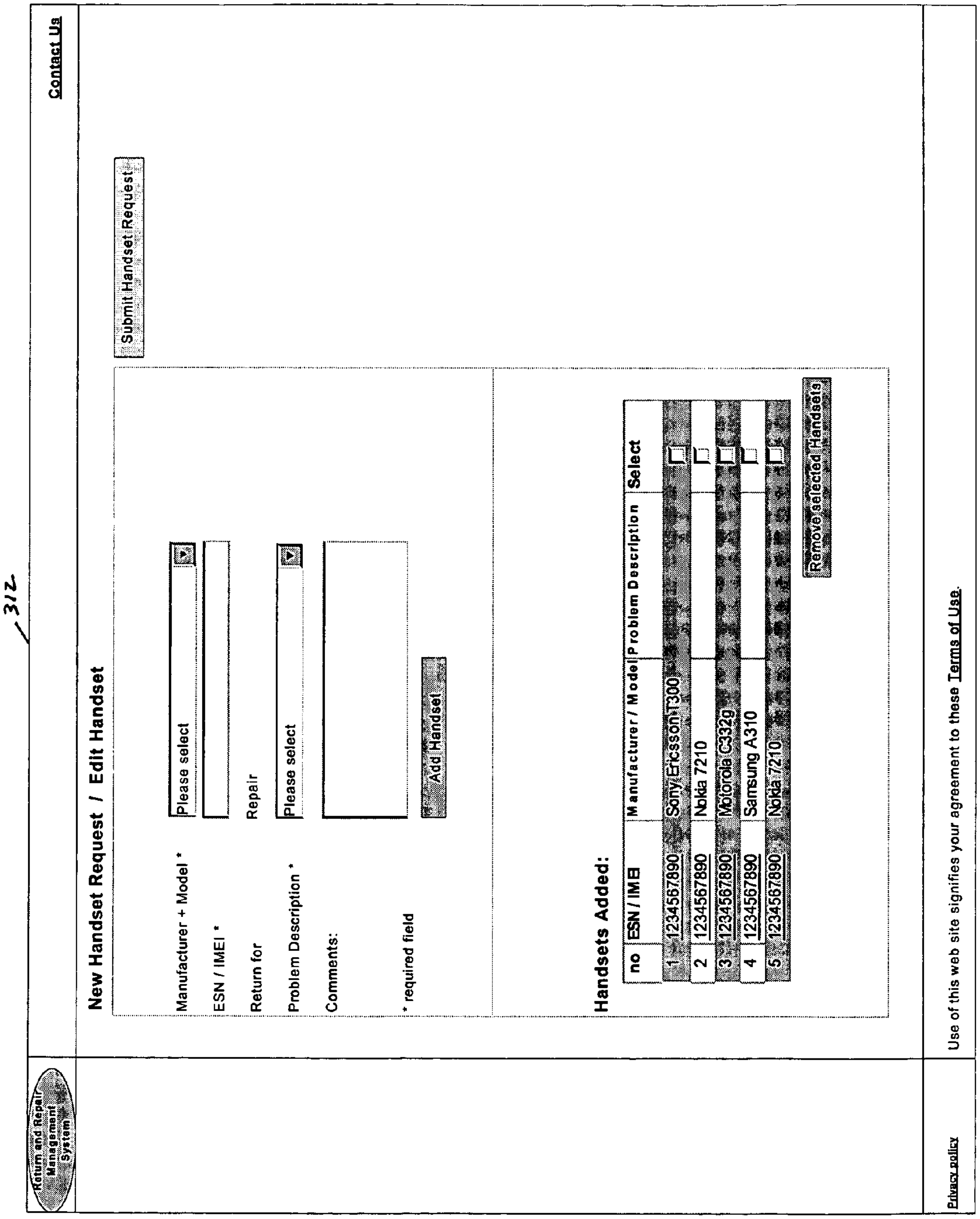

The user interface map 310 includes a new handset request/edit handset UI 312. FIG. 3D illustrates one embodiment of a new handset request/edit handset UI 312 that may be presented to a user. In one implementation, the design supports customer-branded or co-branding options. The wireframe applies to add new handset and edit existing handset screens. When in edit handset mode, the page title may read, "edit handset" and the "add a handset" button may read "submit change."

In general, all end-user handsets may be returned for repair only. Problem description and manufacturer+model pull-down menu options may be managed directly in a proprietary database.

In one embodiment, the system validates ESN numbers against one of three hard coded syntax validation rules. If the ESN is validated, the system adds the ESN, manufacturer+model, and problem description to a handset list. The system also clears the form except for manufacturer+model pre-populated with previous values.

As shown, a message area may display on-screen help and error messages. A user may click on a hyperlinked ESN to edit a handset. When the user clicks on the "submit change" button, the system re-applies the validation rules. To delete handsets from the list, a customer may check one or more "select" boxes and click on the "remove selected handset" button.

Figure 3E:
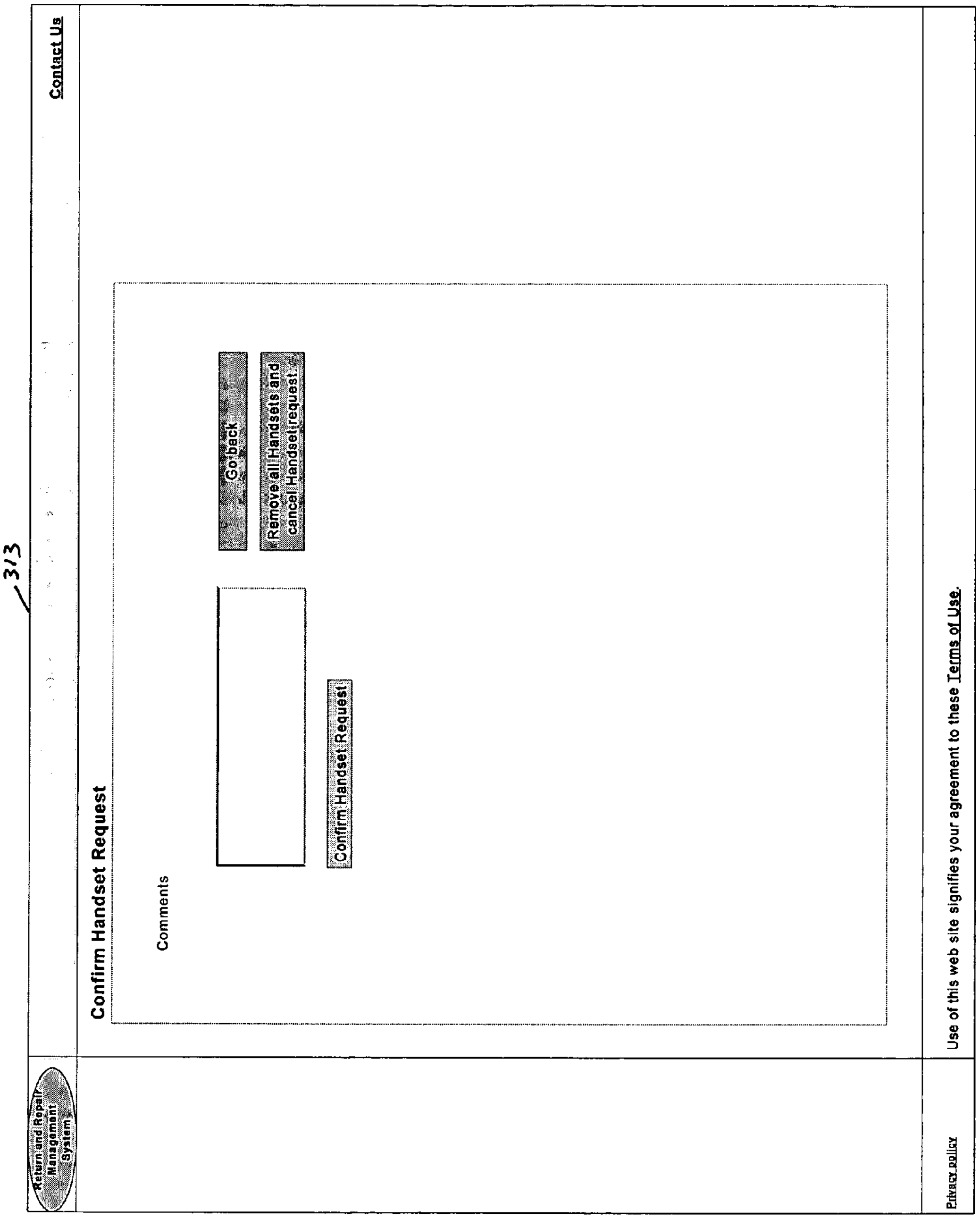

The user interface map 310 includes a confirm handset request UI 313. FIG. 3E illustrates one embodiment of a confirm handset request UI 313 that may be presented to a user. As shown, the UI 313 includes a "comments" area for entering text. The "go back" button may navigate back to the handset request screen including a handset list for this request.

A user may cancel the entire handset request and remove all handsets. When the "confirm handset request" button is clicked, the system generates a reference number, displays handset details screen, creates a page for the end-user to monitor handset request status, and emails a confirmation message to the end-user with a link to the handset request status page.

The user interface map 310 includes a handset request details UI 314. FIG. 3F illustrates one embodiment of a handset request details UI 314 that may be presented to a user. In one implementation, all destinations (each with its corresponding contact information, instructions and list of handsets) are displayed.

In one embodiment, the request status is assigned by the system automatically. Possible request status values may include: approved (reference number generated), in progress (at least one handset is not complete), and complete (all handsets in request are complete).

As shown, ESN numbers may be hyperlinked to a handset details screen, which includes handset repair status. Clicking the "print handset request details" button reformats information in a printer-friendly fashion (e.g., removing navigation) and prints the handset requests details.

Figure 3G:
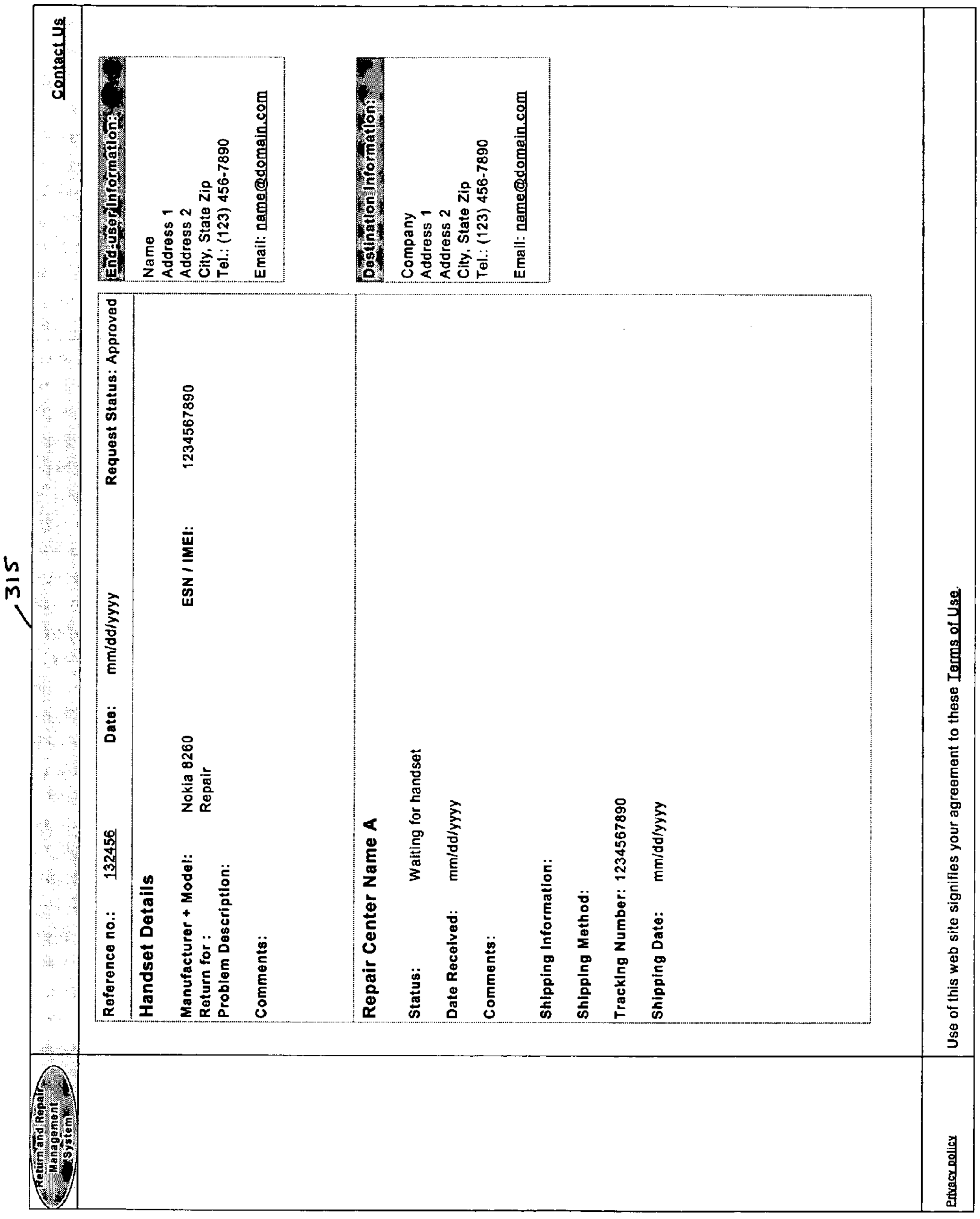

The user interface map 310 includes a handset details UI 315. FIG. 3G illustrates one embodiment of a handset details UI 315 that may be presented to a user. In one implementation, reference numbers may be hyperlinked to handset request details.

The request status may be assigned by the system automatically. In one implementation, possible status values include: approved (reference number generated), in progress (at least one handset is not complete), and complete (all handsets in request are complete). Possible handset status values for repair centers may include: waiting for handset, received, in progress, back order, and shipped. In general, handset status controls are available from a repair center interface. Shipping information may be displayed when available.

Figure 3H:
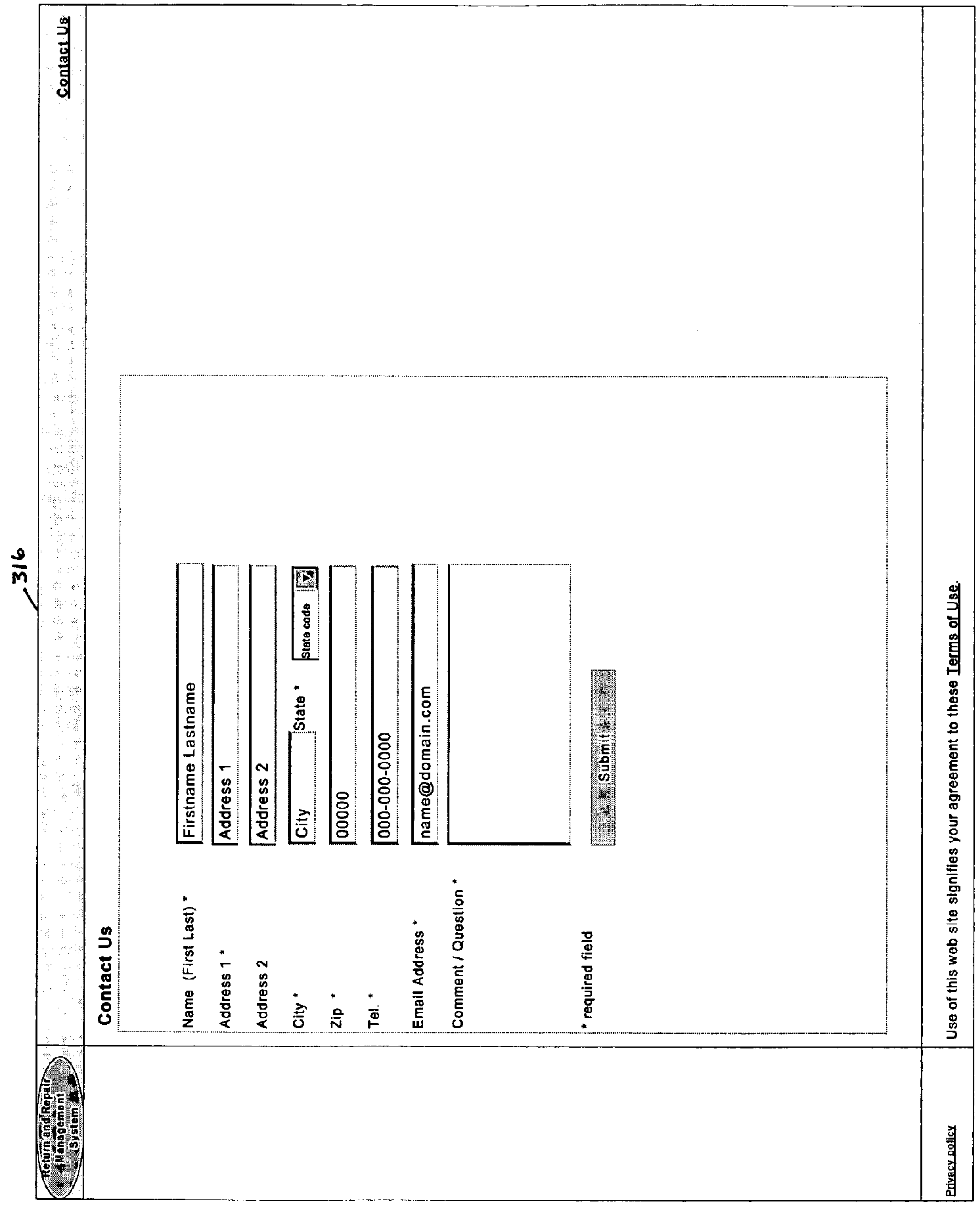
Figure 31:
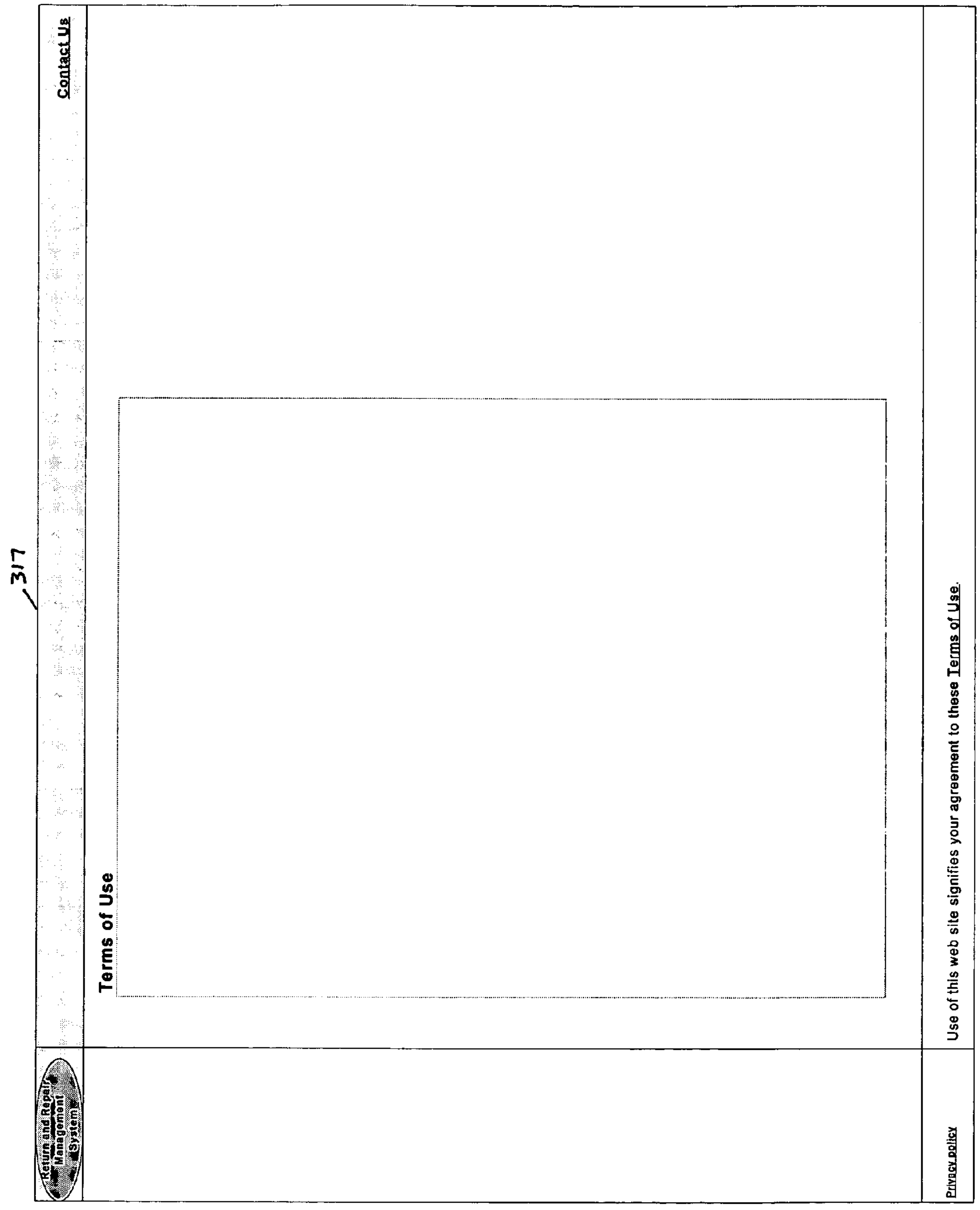

The user interface map 310 includes a contact us UI 316. FIG. 3H illustrates one embodiment of a contact us UI 316 that may be presented to a user. In one implementation, the customer information is pre-filled if the end-user has submitted information previously. In general, the contact us forms submitted are emailed to a specified address.

Figure 3J:
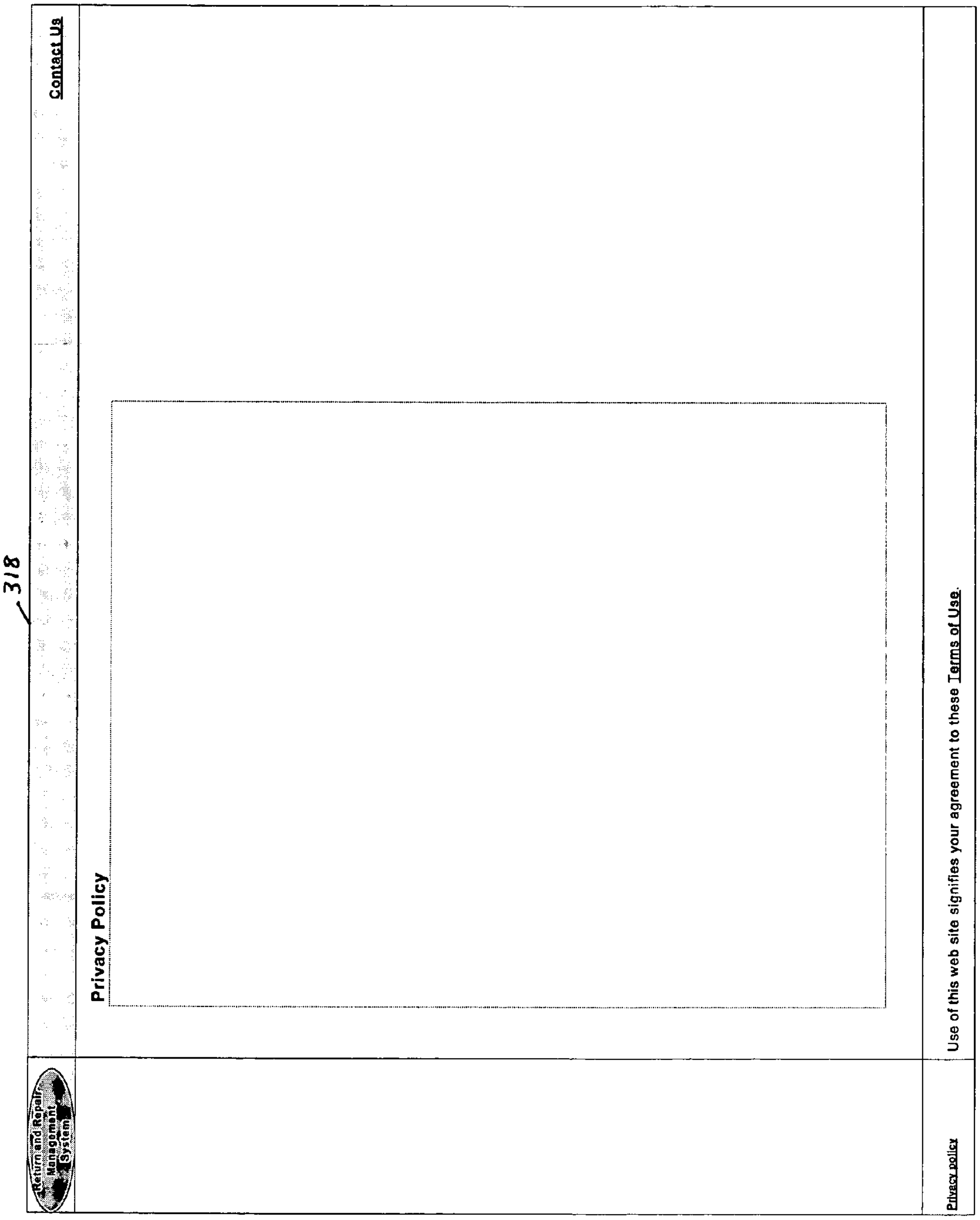

The user interface map 310 includes a terms of use UI 317. FIG. 3I illustrates one embodiment of a terms of use UI 317 that may be presented to a user. The user interface map 310 also includes a privacy policy UI 318. FIG. 3J illustrates one embodiment of a privacy policy UI 318 that may be presented to a user. The user interface map 310 includes a handset request status page UI 319. In one implementation, the handset request status page UI 319 is linked to/from a confirmation message emailed to an end-user.

Figure 4A:
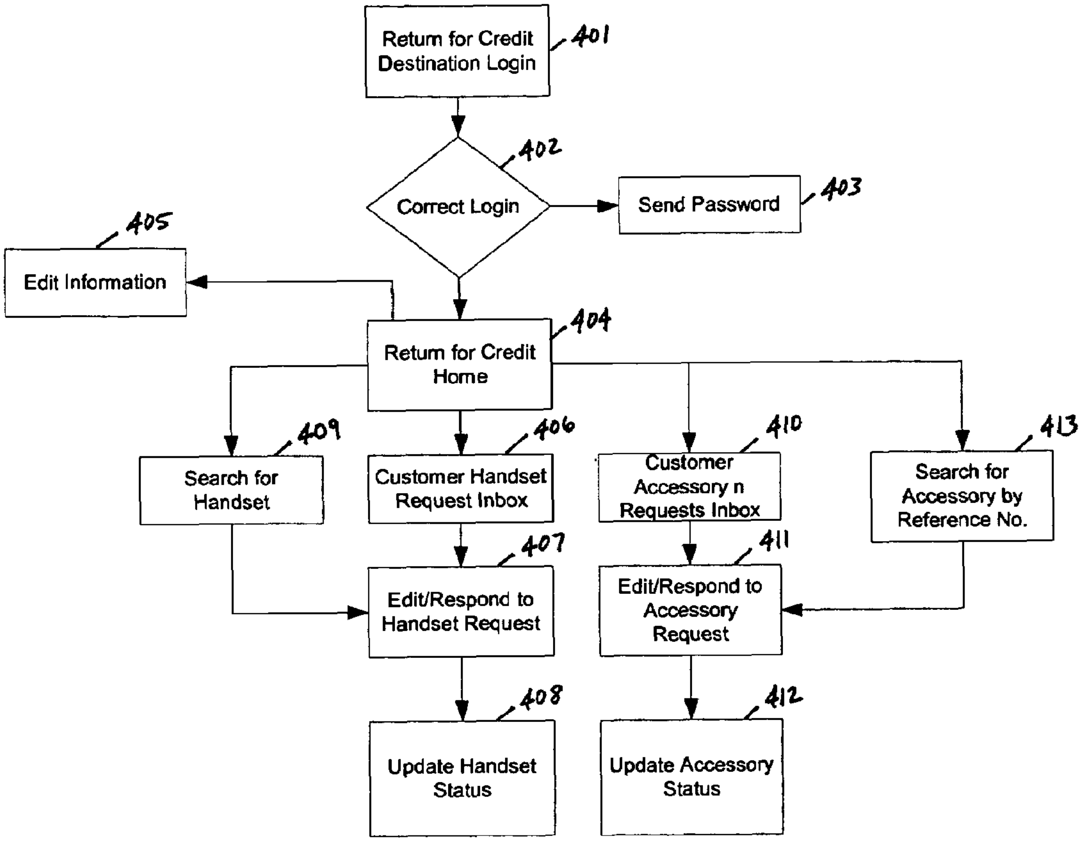
FIG. 4A illustrates return process according to one embodiment of the present invention.

Referring to FIG. 4A, the system 100 operates according to a return process 40. While particular embodiments and examples are described and illustrated, the process 40 may be implemented by any suitable type of hardware (e.g., device, computer, computer system, equipment, component), software (e.g., program, application, instruction set, code), storage medium (e.g., disk, device, propagated signal), or a combination thereof).

At step 401, a returned for credit destination login is performed. In one implementation, an email address and a password are required to access the system. At step 402, if the login information is incorrect, the system may send a password to a valid email address (step 403).

At step 402, if the login is correct at step 402, the system may present a return for credit home page (step 404).

From the home page, the system may allow return for credit destination center information to be edited (step 405). In one implementation, such information may include: company, name, address, city, state, zip code, email address, telephone number, fax number, and password.

At step 406, the system may generate a new customer handset request. In one implementation, the customer handset request may include ESN, manufacturer+model, date, and status.

At step 407, the system may allow a user to edit and/or to respond to a handset request. In one implementation, clicking on an ESN number enables the edit/respond function. Editing and/or responding to a handset request may include providing status, shipping information, and comments. In one embodiment, possible status include: waiting for item, received, credit issued, credit rejected, and returned to customer. Shipping information fields may include: shipping method (input), tracking number (input), and date shipped (input).

At step 408, handset status may be updated in customer and administrator interfaces. At step 409, the system may allow a user to search for handsets by ESN and/or reference number. At step 410, the system may generate a customer accessory request. In one implementation, the customer accessory request may include accessory item, date posted, and status.

At step 411, the system may allow a user to edit and/or to respond to an accessory request. In one implementation, clicking on an accessory item enables the edit/respond function. Editing and/or responding to an accessory request may include providing status and comments. Possible status includes: waiting for item, received, credit issued, credit rejected and returned to customer.

At step 412, the accessory status is updated in customer and administrator interfaces. At step 413, the system allows a user to search for an accessory by reference number.

Figure 4B:
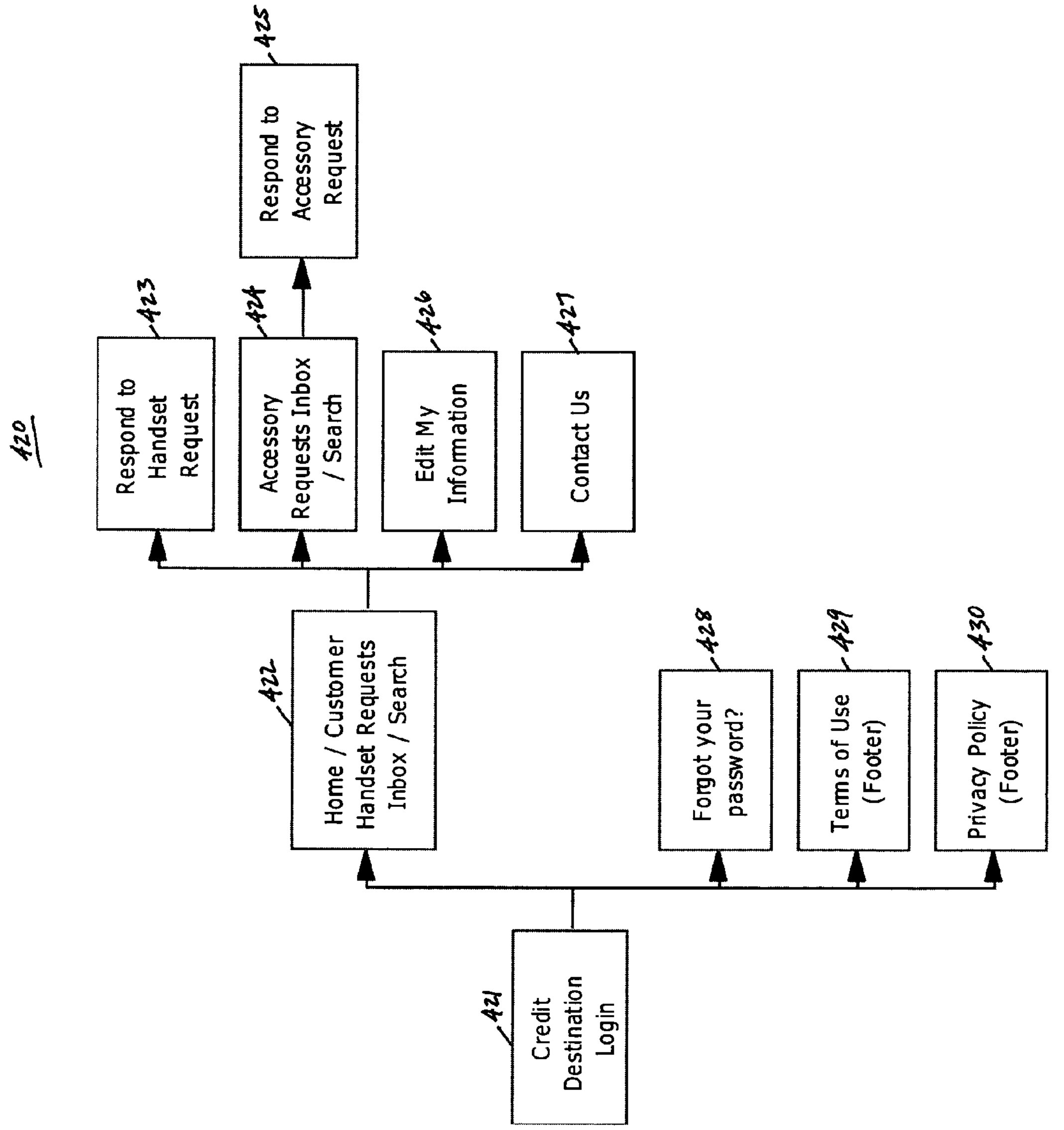
FIG. 4B illustrates a user interface map for a return process according to one embodiment the present invention.

FIG. 4B illustrates a user interface map 420 according to one embodiment of the present invention. In one implementation, the user interface map 420 includes a set of UIs that may be presented to a user. In general, the UIs may be presented through an interactive computer screen to solicit information from and present information to a user in conjunction with the return process 40. For example, the UIs may be presented through a client system 110 including a personal computer running a browser application and having various input/output devices (e.g, keyboard, mouse, touch screen, etc.) for receiving user input).

Figure 4C:
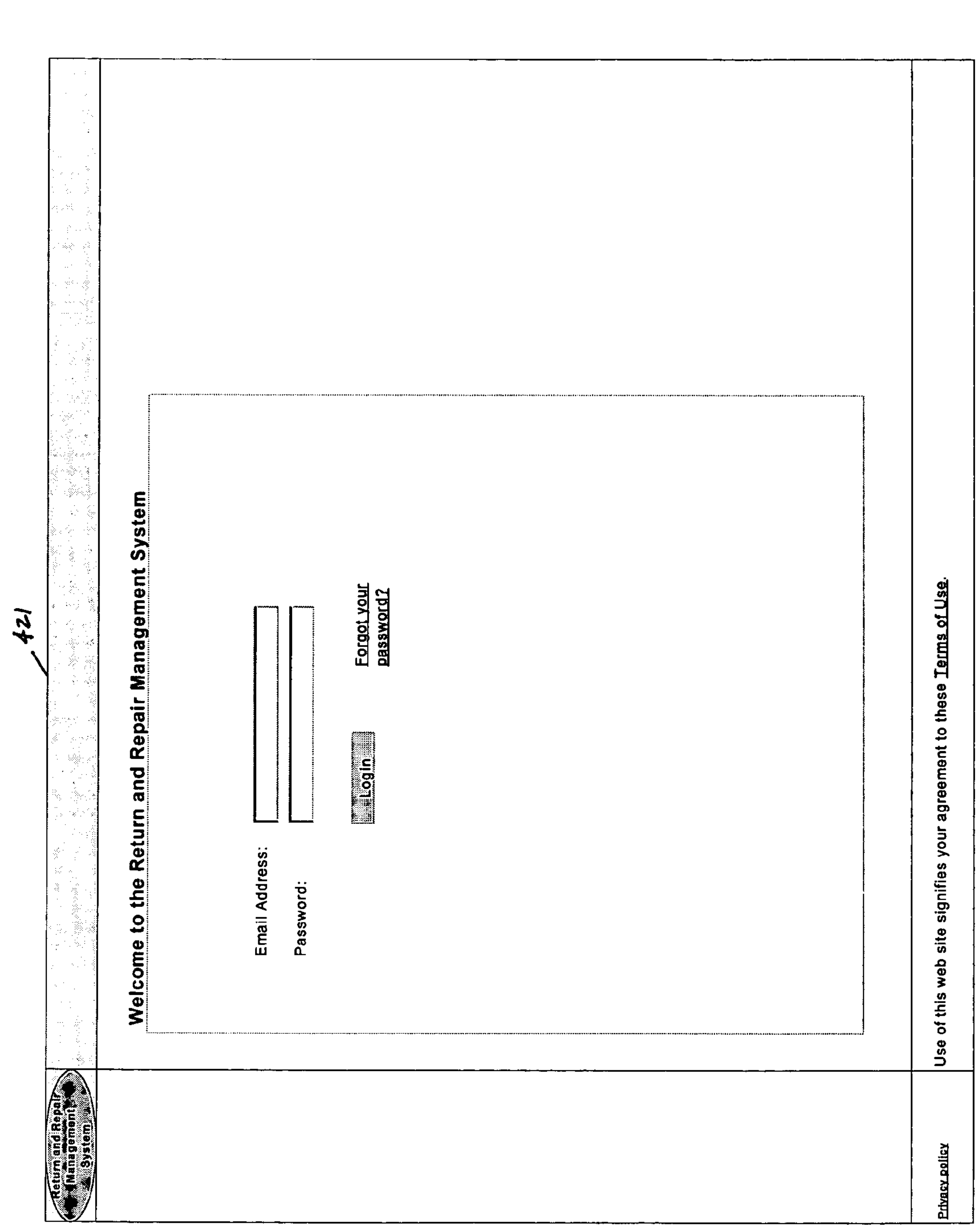
FIGS. 4C-4L illustrate user interfaces for a return process according to one embodiment the present invention.

As shown, the user interface map 420 includes a credit destination login UI 421. FIG. 4C illustrates one embodiment of a credit destination login UI 421 that may be presented to a user. In one implementation, the UI 421 requests the user to enter a valid email address and password to access the system.

Figure 4D:
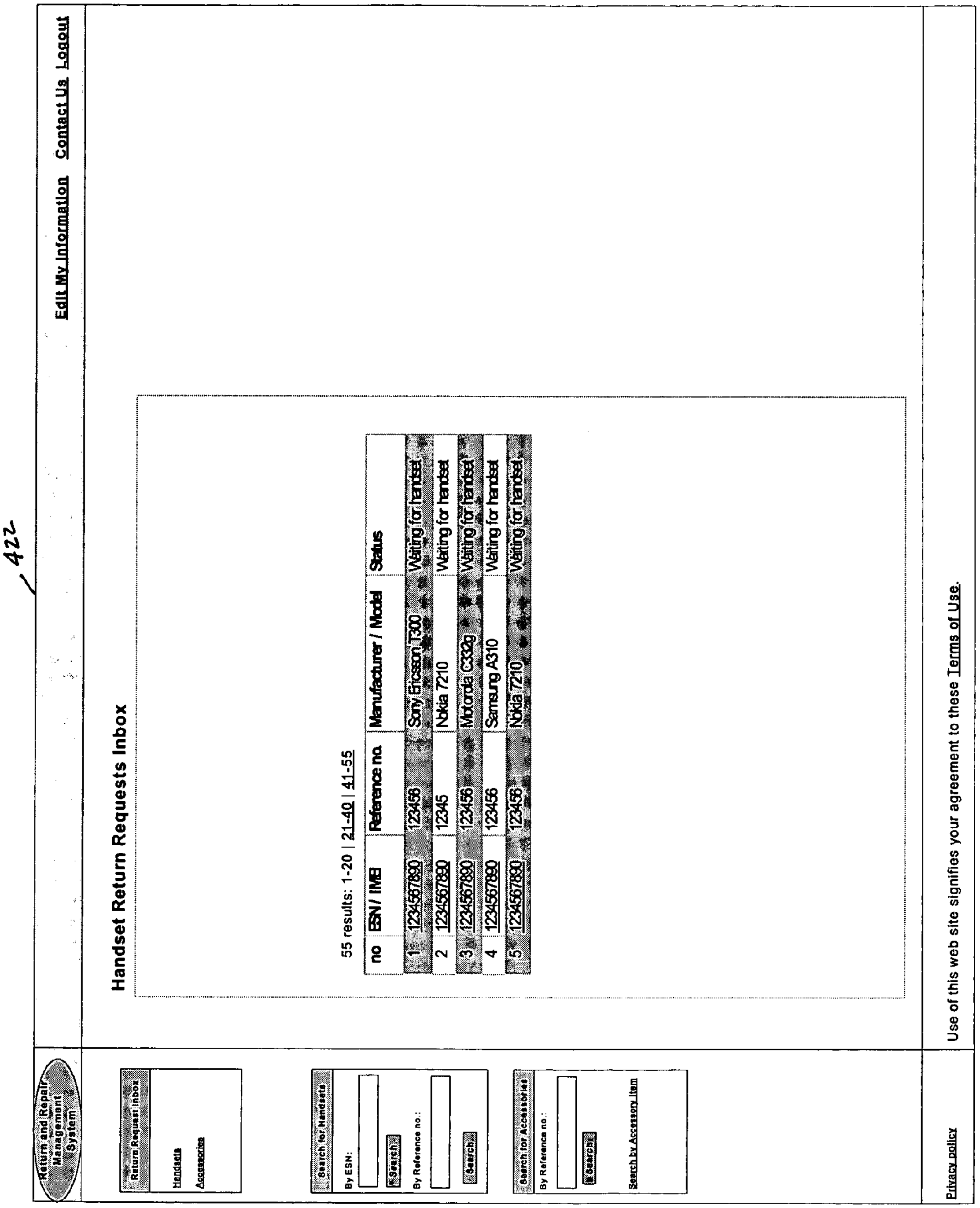

The user interface map 420 includes a handset return requests inbox UI 422. FIG. 4D illustrates one embodiment of a handset return requests inbox UI 422 that may be presented to a user. In one implementation, only handset return requests that have not been attended to (e.g., status is "waiting for handset") are listed by default. The same wireframe may apply to all handset search results screens.

As shown, a message area may display on-screen help and error messages. ESN numbers may be linked to full handset details. Return for credit destination users may click on the ESN number to respond to handset return requests. Users may search for handsets by ESN or by reference number for handset return requests no longer in the inbox. The ESN search may display a respond to handset request screen directly. A reference number search may return a search results list.

Figure 4E:
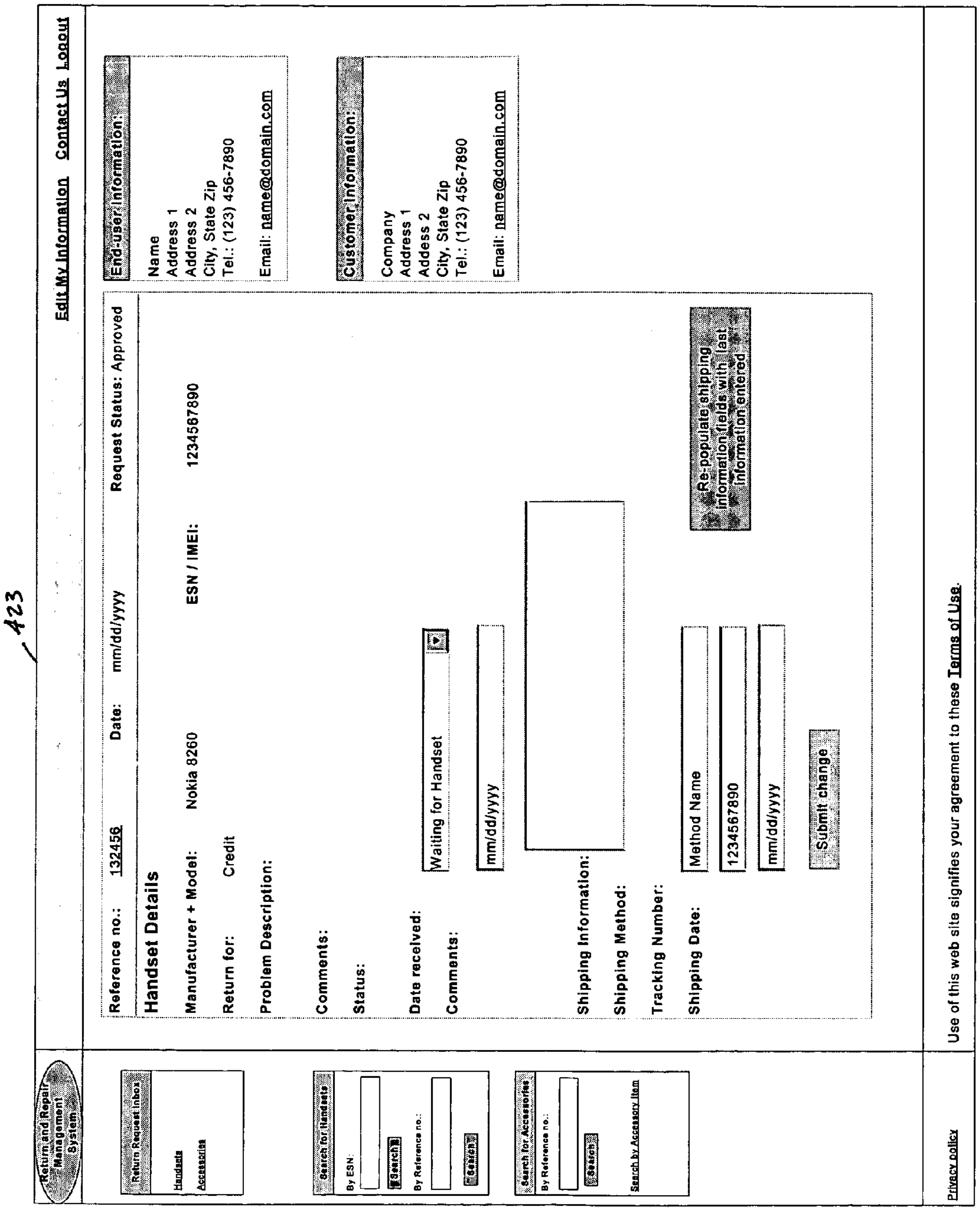

The user interface map 420 may include a respond to handset request UI 423. FIG. 4E illustrates one embodiment of a respond to handset request UI 423 that may be presented to a user. In one implementation, reference numbers may be hyperlinked to a list of handsets returned for credit in a particular handset request. Possible handset status values may include: waiting for item, received, credit issued, credit rejected, and returned to customer. In general, handset status controls may be available from this interface.

As shown, a comments field may be used to indicate replacement handset details, such as ESN. To support multiple handsets with the same shipping information, a user may click on a button to re-populate the form with shipping information entered previously. When the user clicks on the "submit change" button, the system updates the handset status in customer and administrator interfaces.

Figure 4F:
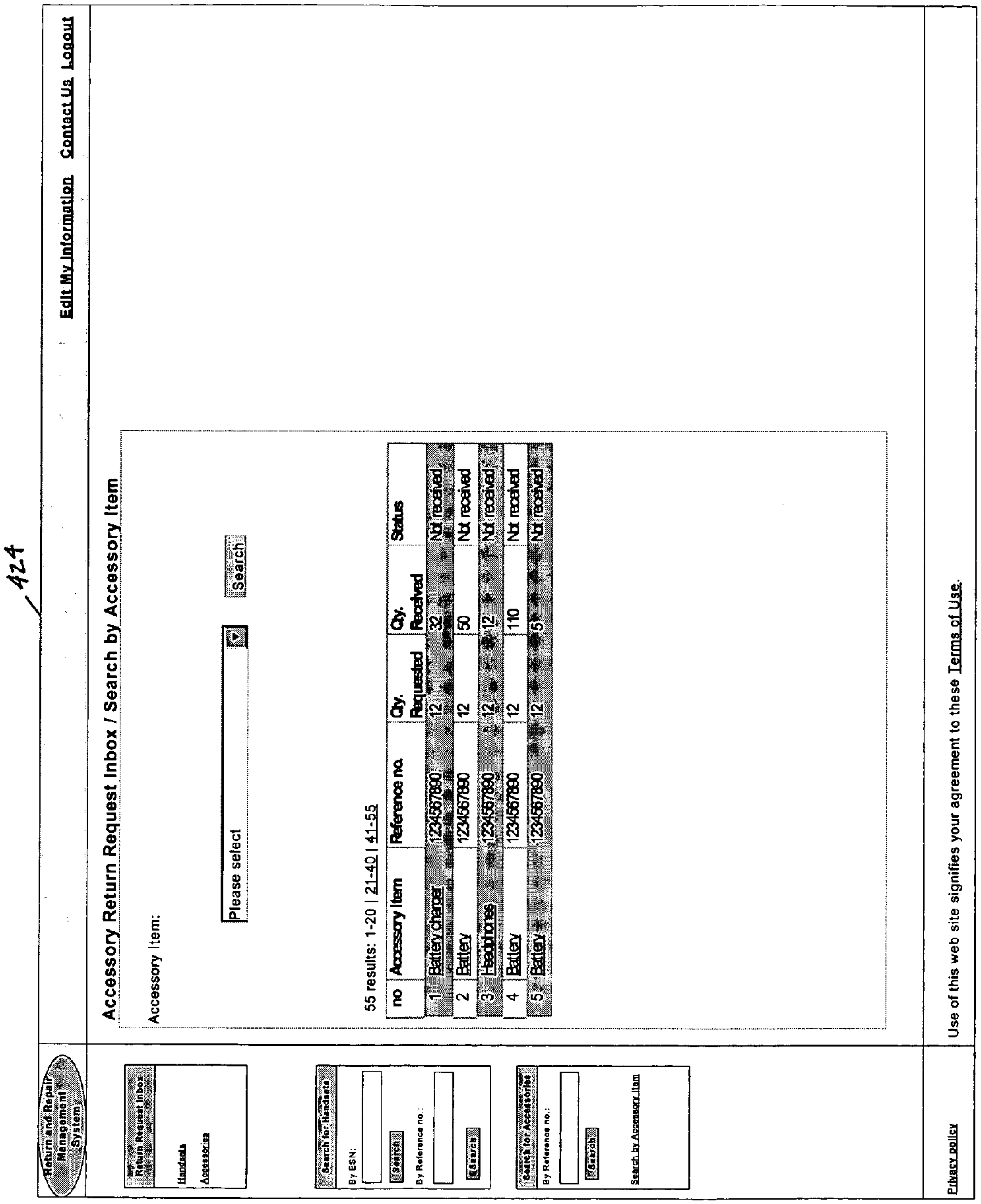

The user interface map 420 includes an accessory return request inbox/search by accessory item UI 424. FIG. 4F illustrates one embodiment of an accessory return request inbox/search by accessory item UI 424 that may be presented to a user. In one implementation, only accessory return requests that have not been attended to (e.g., status is "not received") are listed by default. In general, the same wireframe may apply to all accessory search results screens and to a search by accessory item screen.

As shown, a message area may display on-screen help and error messages. Accessory items may be hyperlinked to full accessory details. A user may click on a selected accessory item to respond to an accessory return request.

Figure 4G:
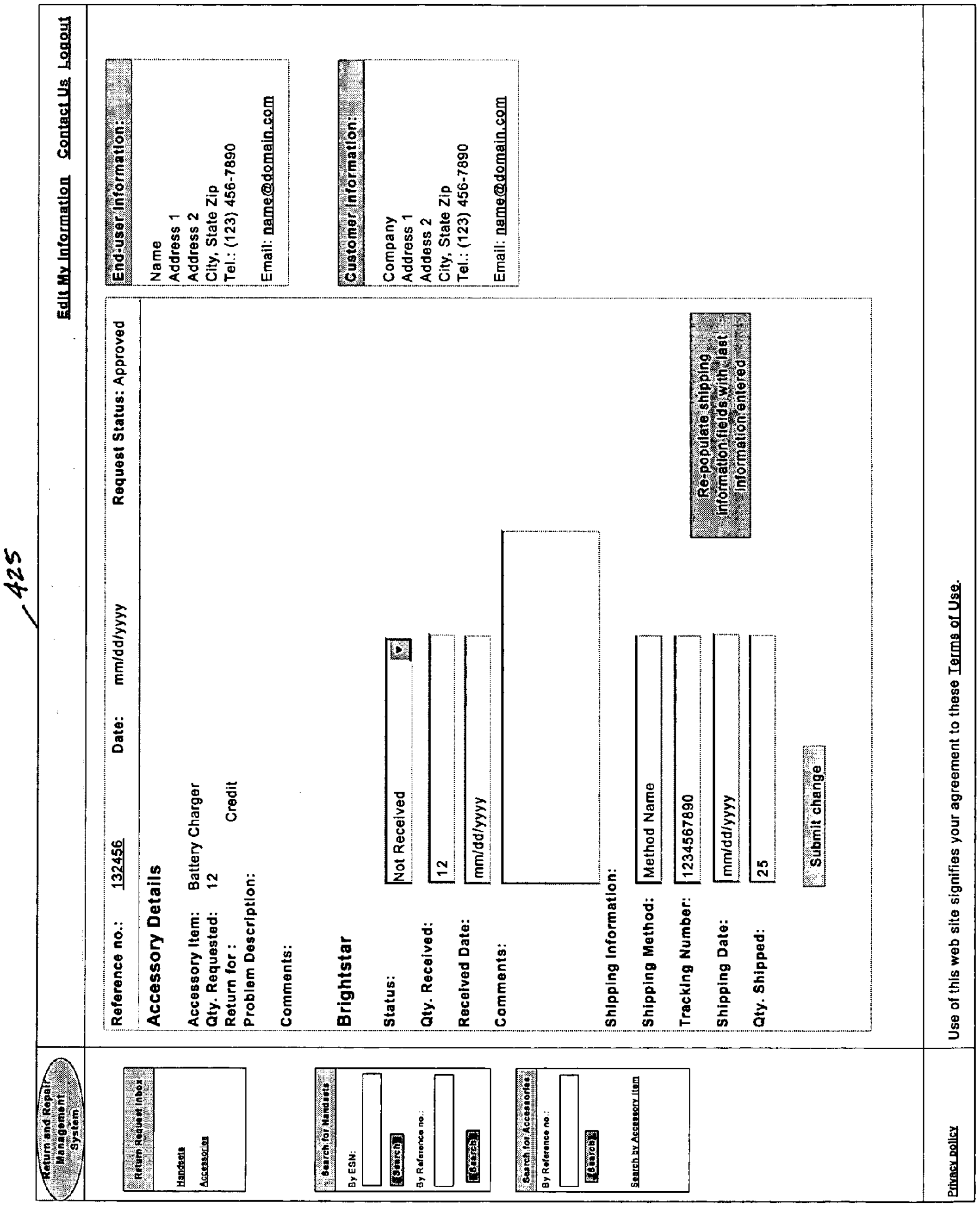

The user interface map 420 includes a respond to accessory request UI 425. FIG. 4G illustrates one embodiment of a respond to accessory request UI 425 that may be presented to a user. In one implementation, reference numbers are hyperlinked to a list of accessories returned for credit in a particular accessory request. Possible accessory status values may include: waiting for item, received, credit issued, credit rejected, and returned to customer. In general, accessory status controls may be available from this interface.

As shown, a comments field may be used to indicate any comments necessary. To support multiple accessories having the same shipping information, a user may click on a button to re-populate a form with shipping information entered previously. When the user clicks on the "submit change" button, the system updates accessory status in the customer and administrator interfaces.

Figure 4H:
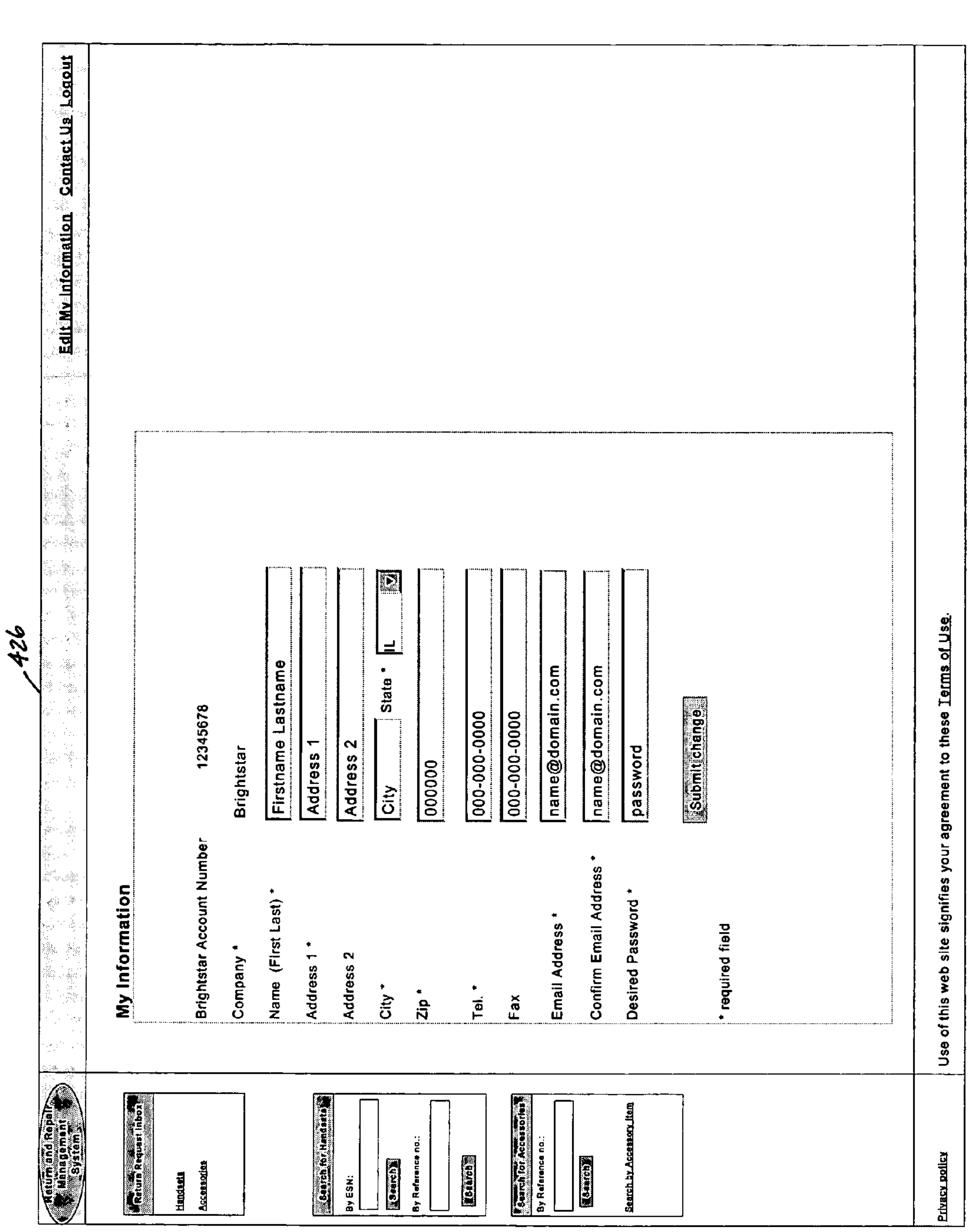

The user interface map includes an edit information UI 426. FIG. 4H illustrates one embodiment of an edit information UI 426 that may be presented to a user. In one implementation, a return for credit destination user cannot change an account number or company name.

Figure 4I:
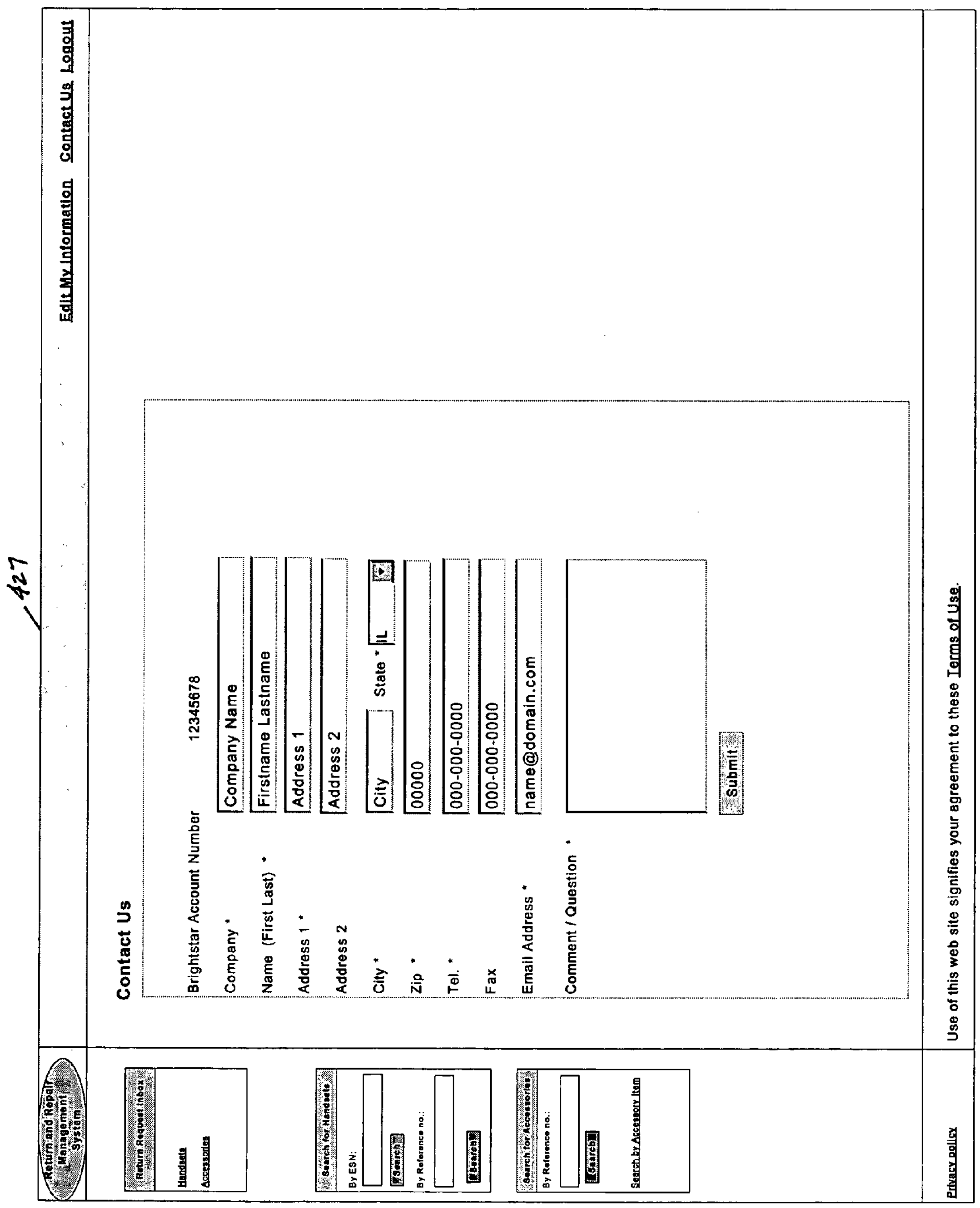

The user interface map 420 includes a contact us UI 427. FIG. 4I illustrates one embodiment of a contact us UI 427 that may be presented to a user. In one implementation, return for credit destination information is pre-filled with information on record. The account number may be read only. In general, contact us forms submitted are emailed to a specified address.

Figure 4J:
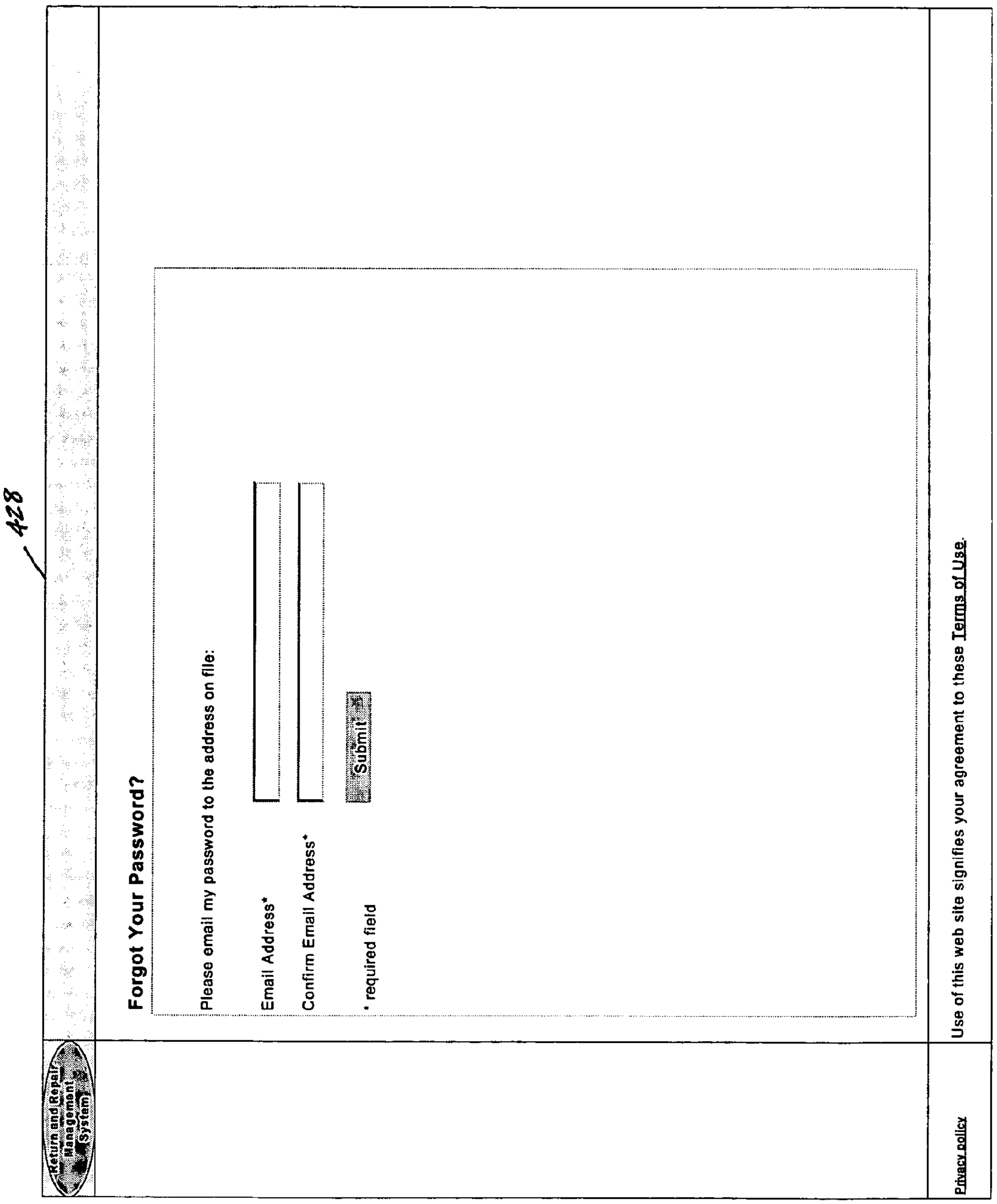
Figure 4K:
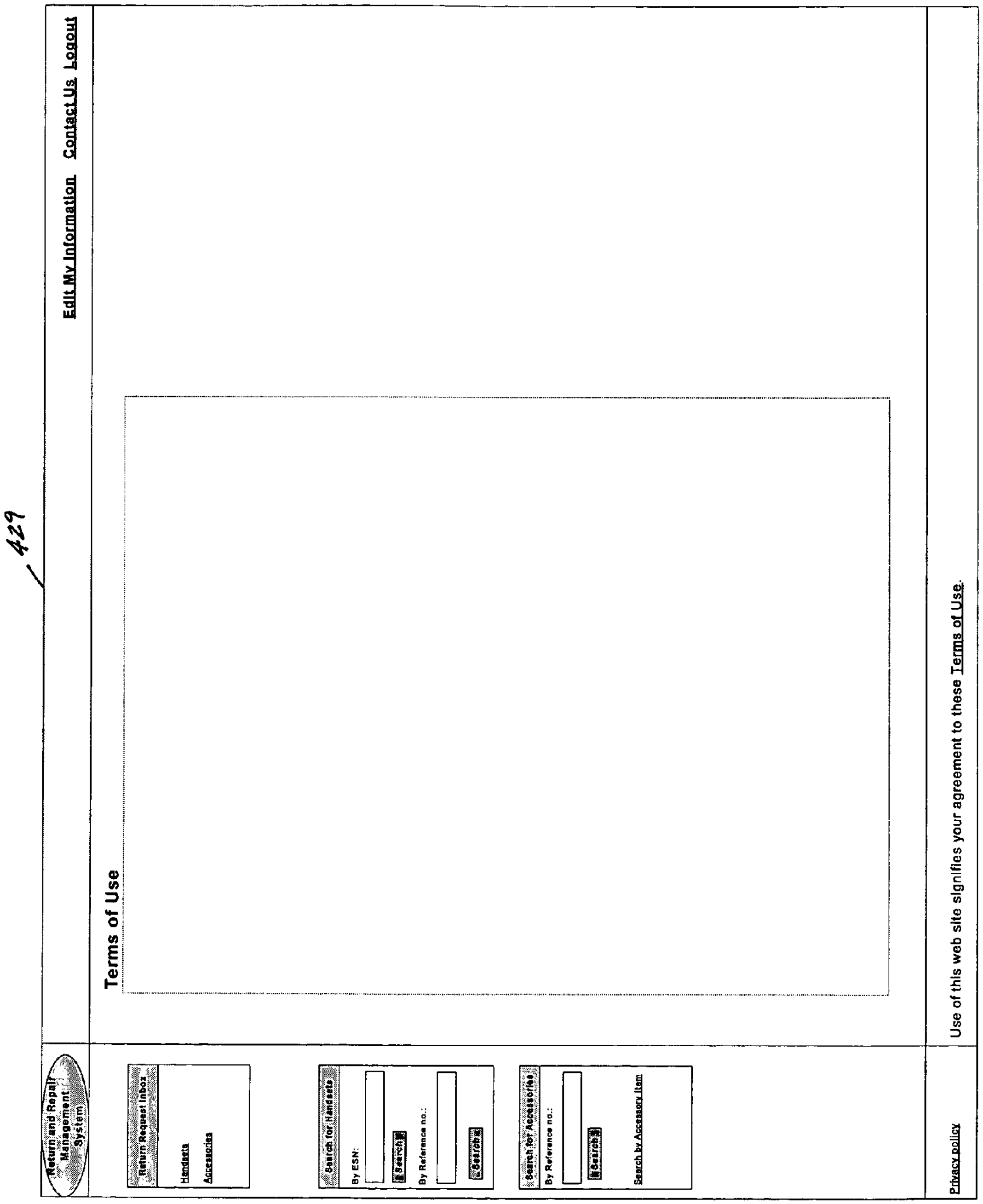
Figure 4L:
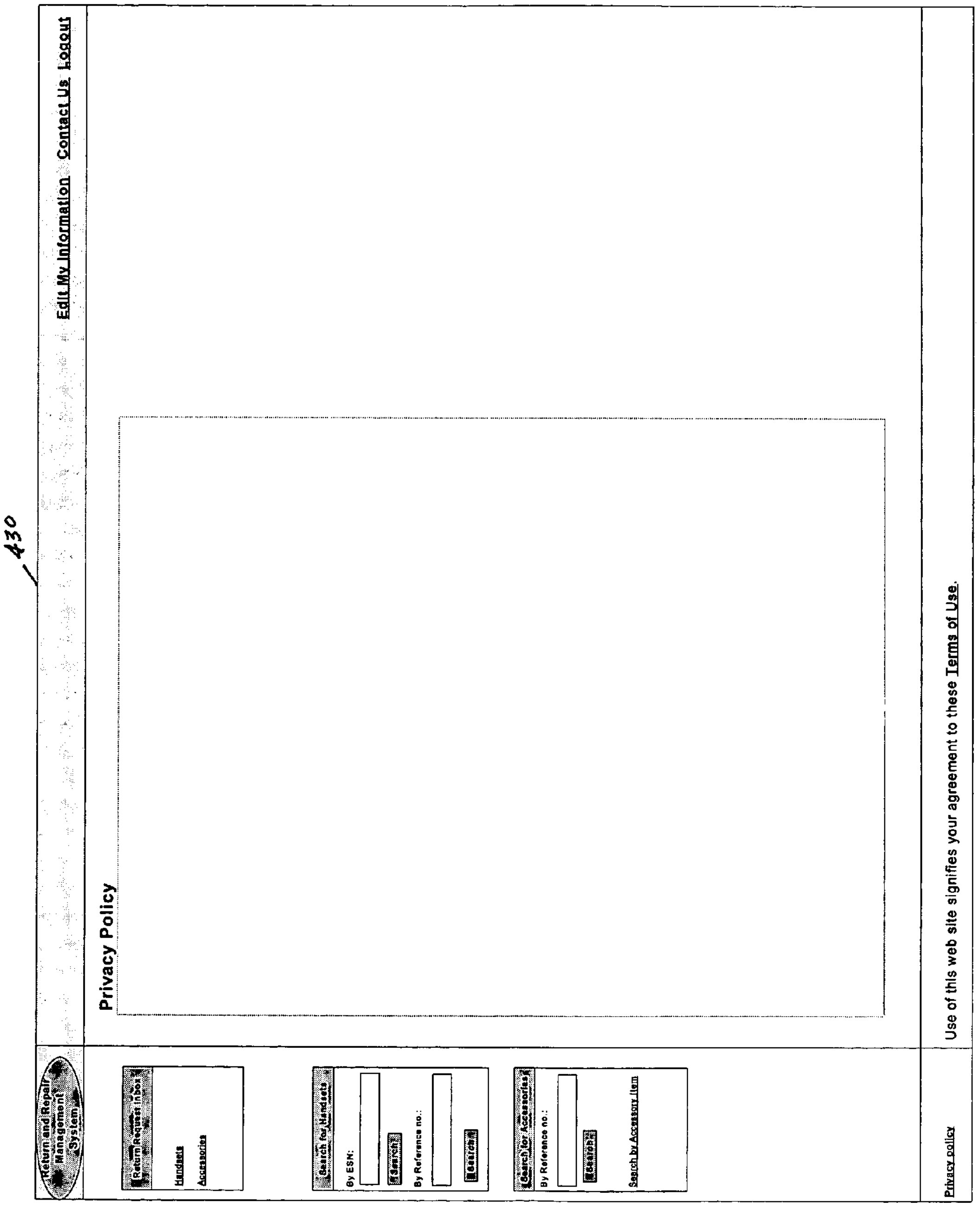

The user interface map 420 includes a forgot password UI 428. FIG. 4J illustrates one embodiment of a forgot password UI 428 that may be presented to a user. The user interface map 420 also includes a terms of use UI 429. FIG. 4K illustrates one embodiment of a terms of use UI 429 that may be presented to a user. The user interface map 420 includes a privacy policy UI 420. FIG. 4L illustrates one embodiment of a privacy policy UI 430 that may be presented to a user.

Figure 5A:
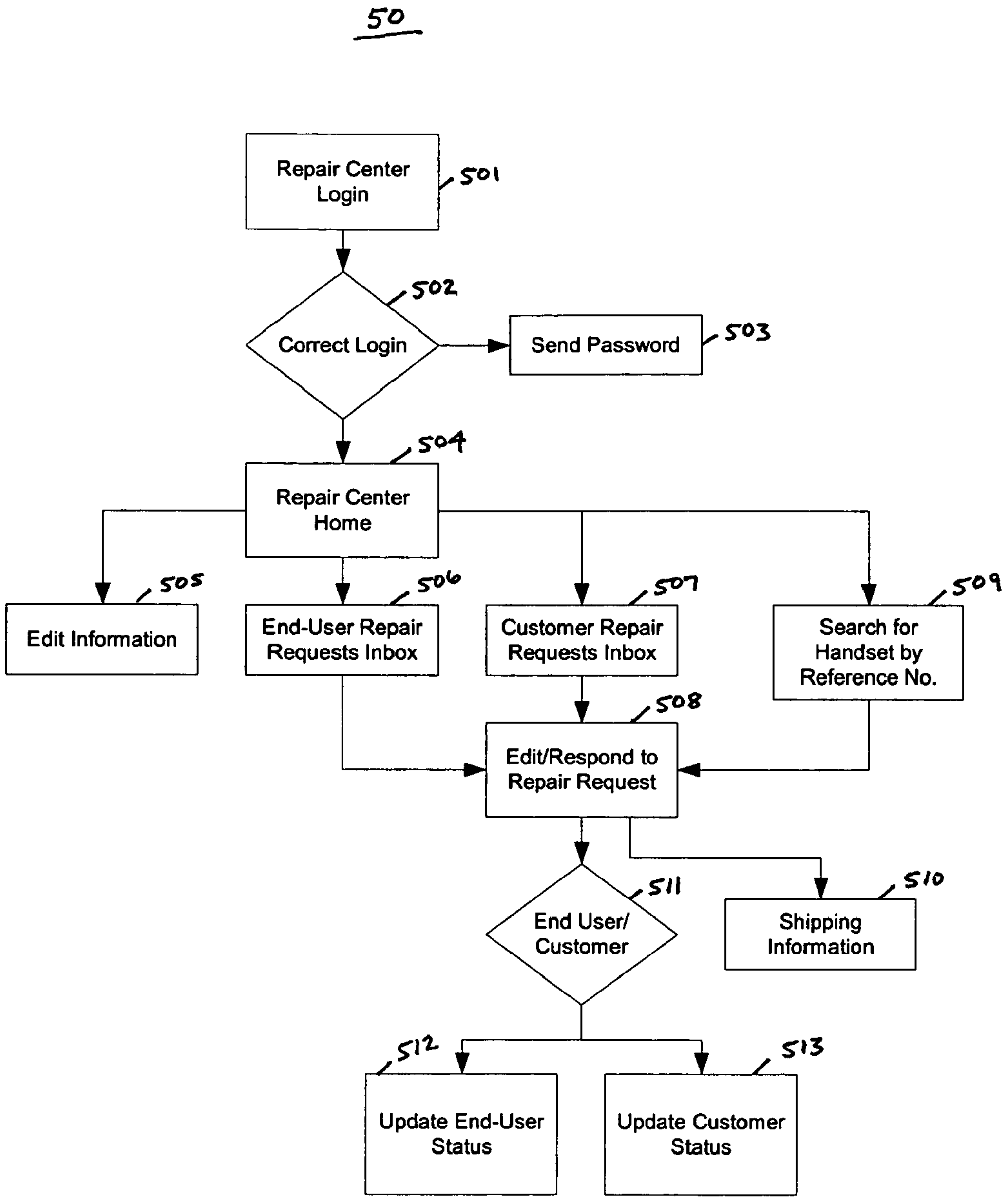
FIG. 5A illustrates a repair process according to one embodiment of the present invention.

Referring to FIG. 5A, the system 100 operates according to a repair process 50. While particular embodiments and examples are described and illustrated, the process 50 may be implemented by any suitable type of hardware (e.g., device, computer, computer system, equipment, component), software (e.g., program, application, instruction set, code), storage medium (e.g., disk, device, propagated signal), or combination thereof.

At step 501, a repair center login is performed. In one implementation, a valid email address and password are requested. At step 502, if the login is performed incorrectly, a password may be sent to a valid email address (step 503).

At step 502, if the login is performed correctly, the system may direct a user to a repair center home page (step 504).

From the home page, the system may allow editing of repair center information (step 505). In one implementation, the repair center information may include: company, name, address, city, state, zip code, email address, telephone number, fax number, and password.

At step 506, the system may generate an end-user repair request. In one implementation, the handset repair request includes ESN, manufacturer+model, problem description, and date posted. Clicking on the ESN number may enable edit/respond functionality.

At step 507, the system may generate a customer repair request. In one implementation, the customer handset repair request includes ESN, manufacturer+model, problem description, and date posted. Clicking on the ESN number may enable edit/respond functionality.

At step 508, the system may enable a user to edit and/or to respond to a repair request. In one implementation, editing and/or responding to a repair request may include providing status and comments. The comments field may be used to indicate replacement handset details such as ESN. In one implementation, status values may include: waiting for handset, received, in progress, back order, and shipped. At step 509, the system may allow a user to search for a handset by reference number.

At step 510, shipping information may be provided if available. In one implementation, such information may include shipping method (input), tracking number (input), and date shipped (input). To support multiple handsets with the same shipping information, the repair center may re-populate a form with shipping information entered previously.

At step 511, the system determines whether the repair request is for an end-user or for a customer. The system then either updates end-user status (step 512) or updates customer status (step 513) based on the determination.

Figure 5B:
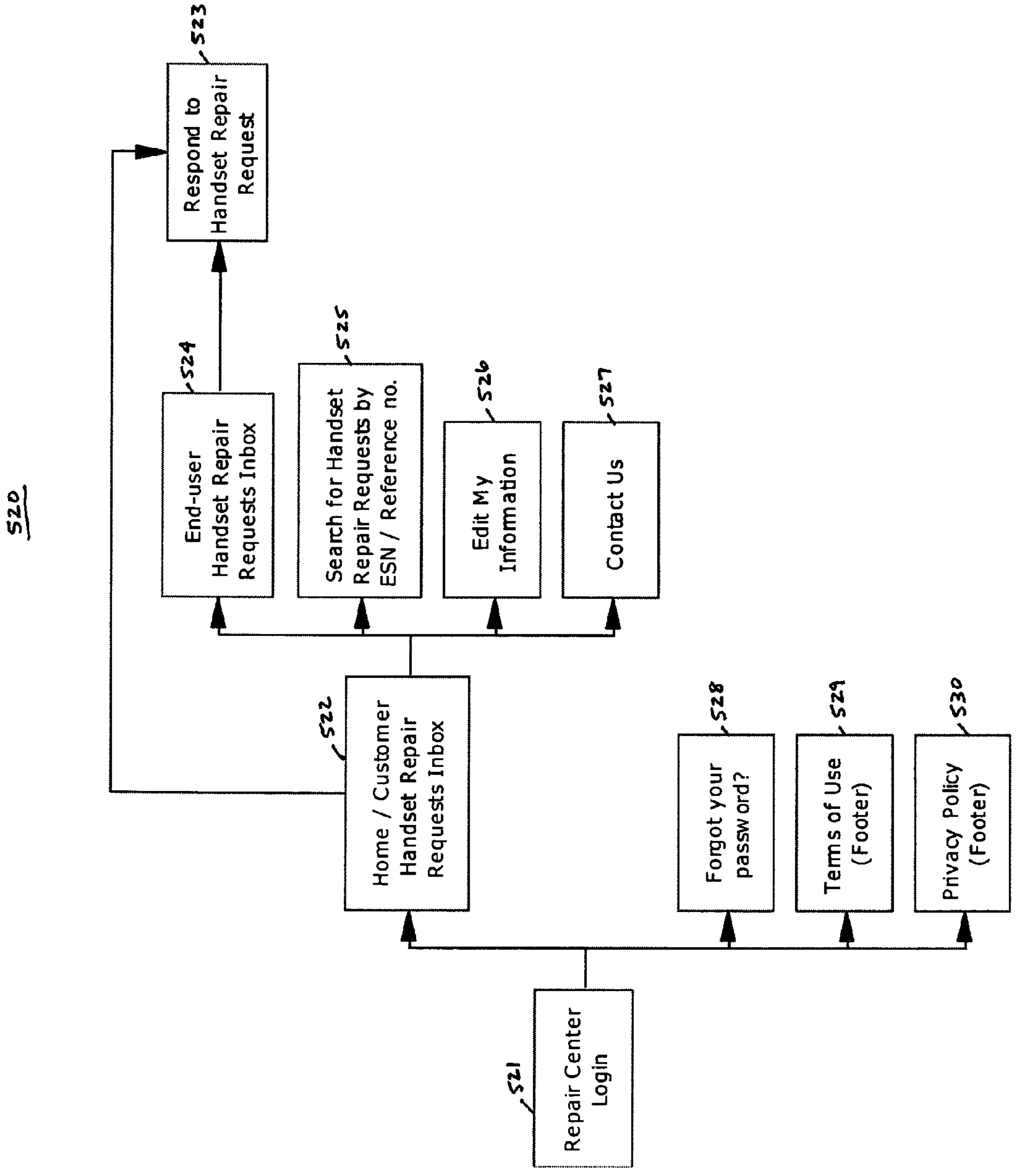
FIG. 5B illustrates a user interface map for a repair process according to one embodiment the present invention.

FIG. 5B illustrates a user interface map 520 according to one embodiment of the present invention. In one implementation, the user interface map 520 includes a set of UIs that may be presented to a user. In general, the UIs may be presented through an interactive computer screen to solicit information from and present information to a user in conjunction with the repair process 50. For example, the UIs may be presented through a client system 110 including a personal computer running a browser application and having various input/output devices (e.g., keyboard, mouse, touch screen, etc.) for receiving input.

Figure 5C:
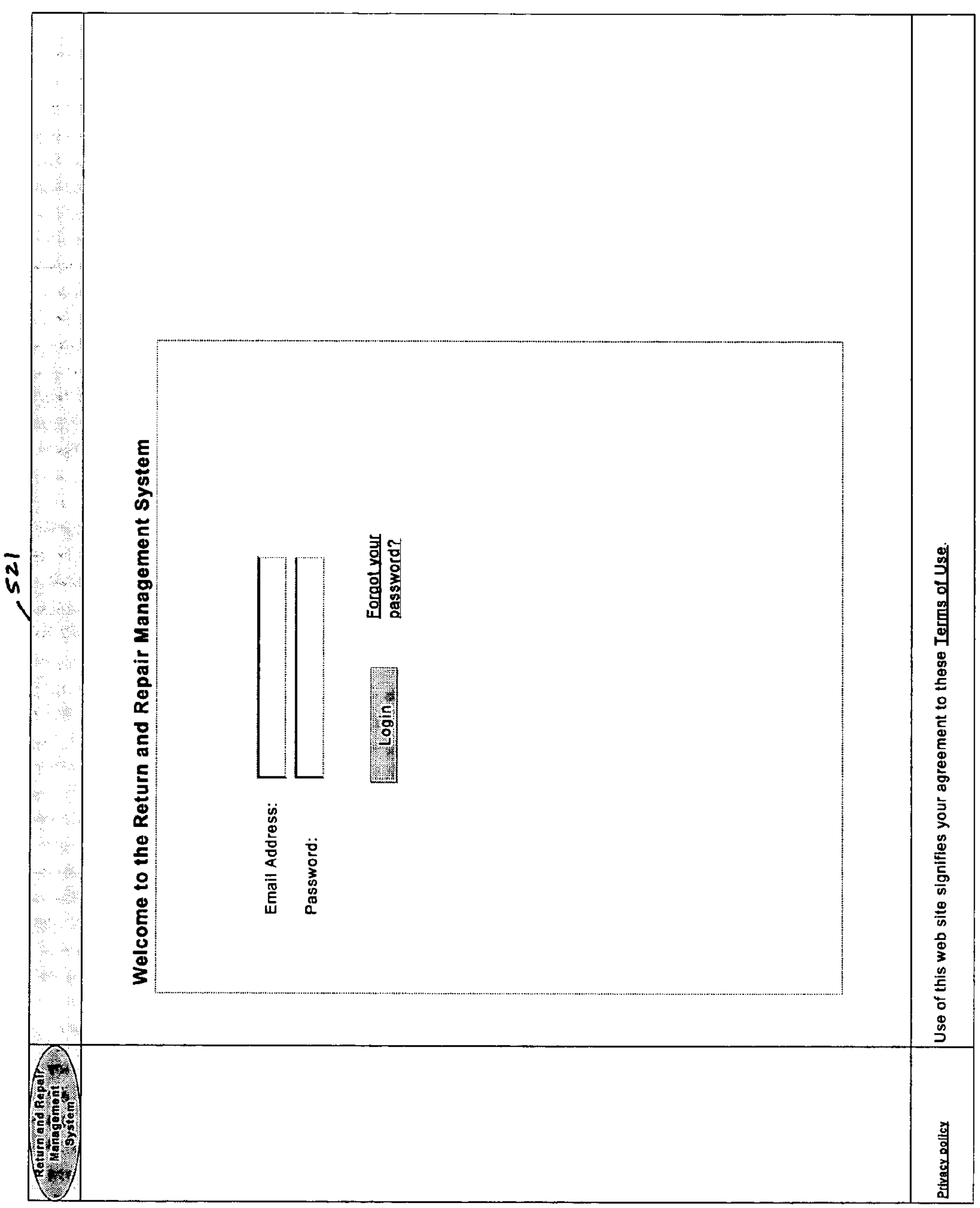
FIGS. 5C-5J illustrate user interfaces for a repair process according to one embodiment the present invention.

As shown, the user interface map 520 includes a repair center login UI 521. FIG. 5C illustrates one embodiment of a repair center login UI 521 that may be presented to a user. In one implementation, the UI 521 requests a valid email address and password to access the system.

Figure 5D:
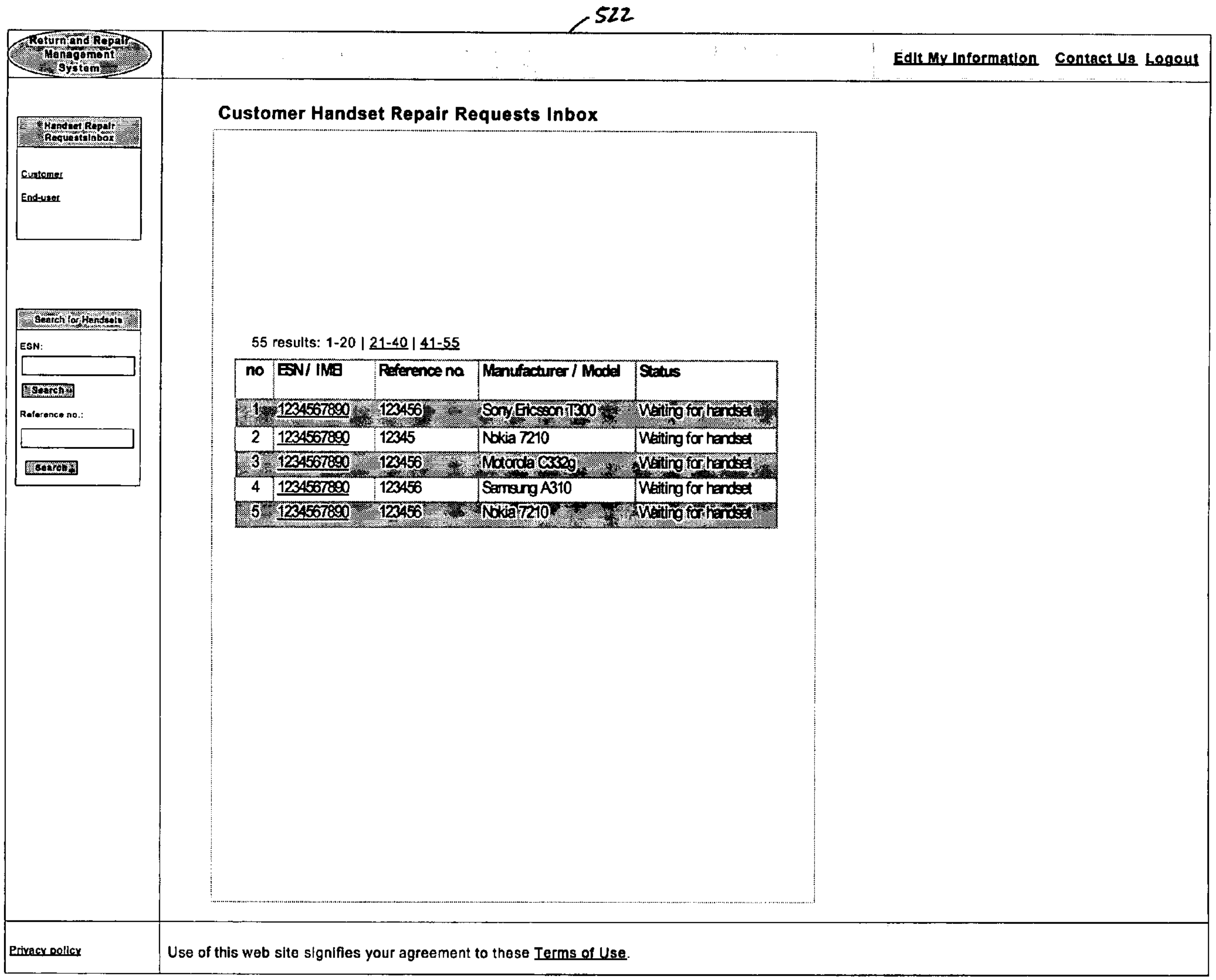

The user interface map 520 includes a customer handset repair requests inbox UI 522. FIG. 5D illustrates one embodiment of a customer handset repair requests inbox UI 522 that may be presented to a user. In one implementation, the same wireframe may apply to end-user handset repair request inbox and all search results screens. In general, only handset repair requests that have not been attended to (e.g., status is “waiting for handset”) are listed by default.

As shown, a message area may display on-screen help and error messages. ESN numbers may be hyperlinked to full handset details. In one implementation, a repair center user clicks on a particular ESN number to respond to a handset repair request. A user may search for handsets by ESN number or reference number for handset repair requests no longer in the inbox. A search by ESN number may directly display a respond to repair request screen. A search by reference number may return a search results list.

Figure 5E:
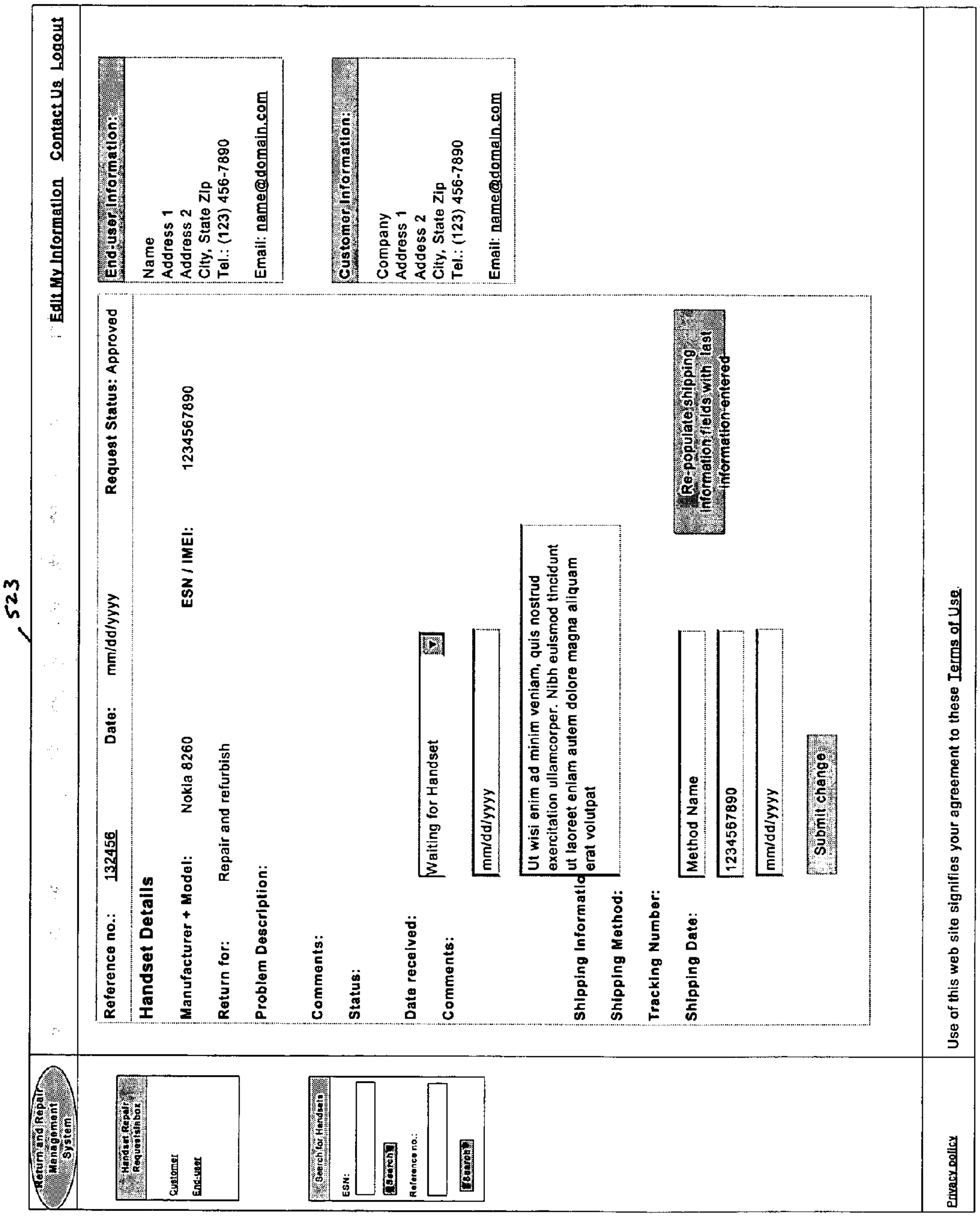

The user interface map 520 includes a respond to handset repair requests UI 523. FIG. 5E illustrates one embodiment of a respond to handset repair requests UI 523 that may be presented to a user. In one implementation, reference numbers may be hyperlinked to a list of handsets for a particular customer or end-user handset request. Handset status values for repair centers may include: waiting for handset, received, in progress, back order and shipped. Handset status controls may be available from this interface.

As shown, a comments field may be used to indicate replacement handset details such as ESN. In order to support multiple handsets with the same shipping information, repair center users may click on a button to re-populate a form with shipping information entered previously.

When repair center users click on the “submit change” button, the system may update handset status in end-user handset request status page and/or corresponding screens in customer and administrator interfaces.

User interface map 520 also may include an end-user handset repair requests inbox UI 524 and a search for handset repair requests by ESN/reference number UI 525.

Figure 5F:
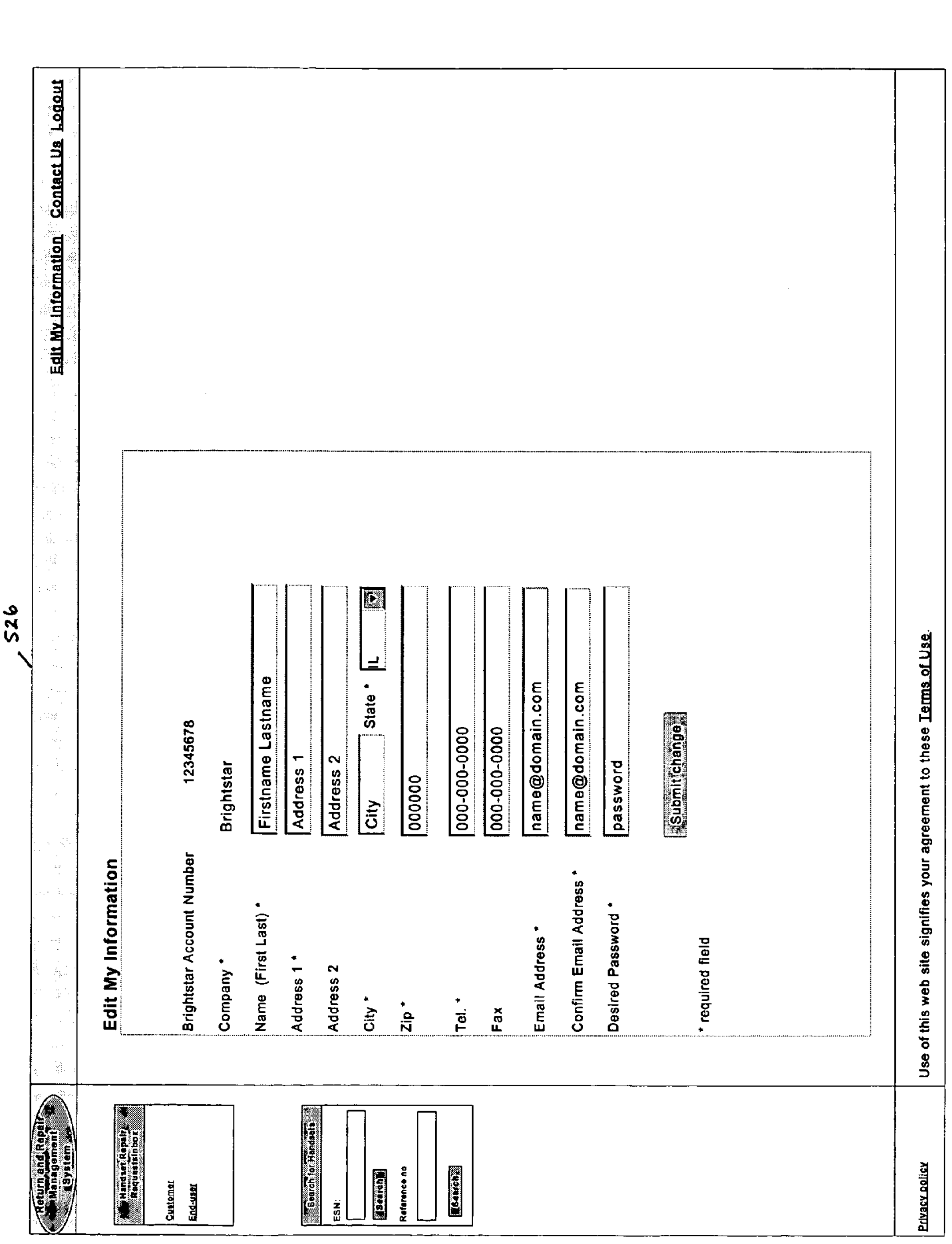

The user interface map 520 includes an edit information UI 526. FIG. 5F illustrates one embodiment of an edit information UI 526 that may be presented to a user. In one implementation, repair centers cannot edit their account number. A valid email address is required for login to the system. In one embodiment, an administrator must edit the account number from an administrator interface.

Figure 5G:
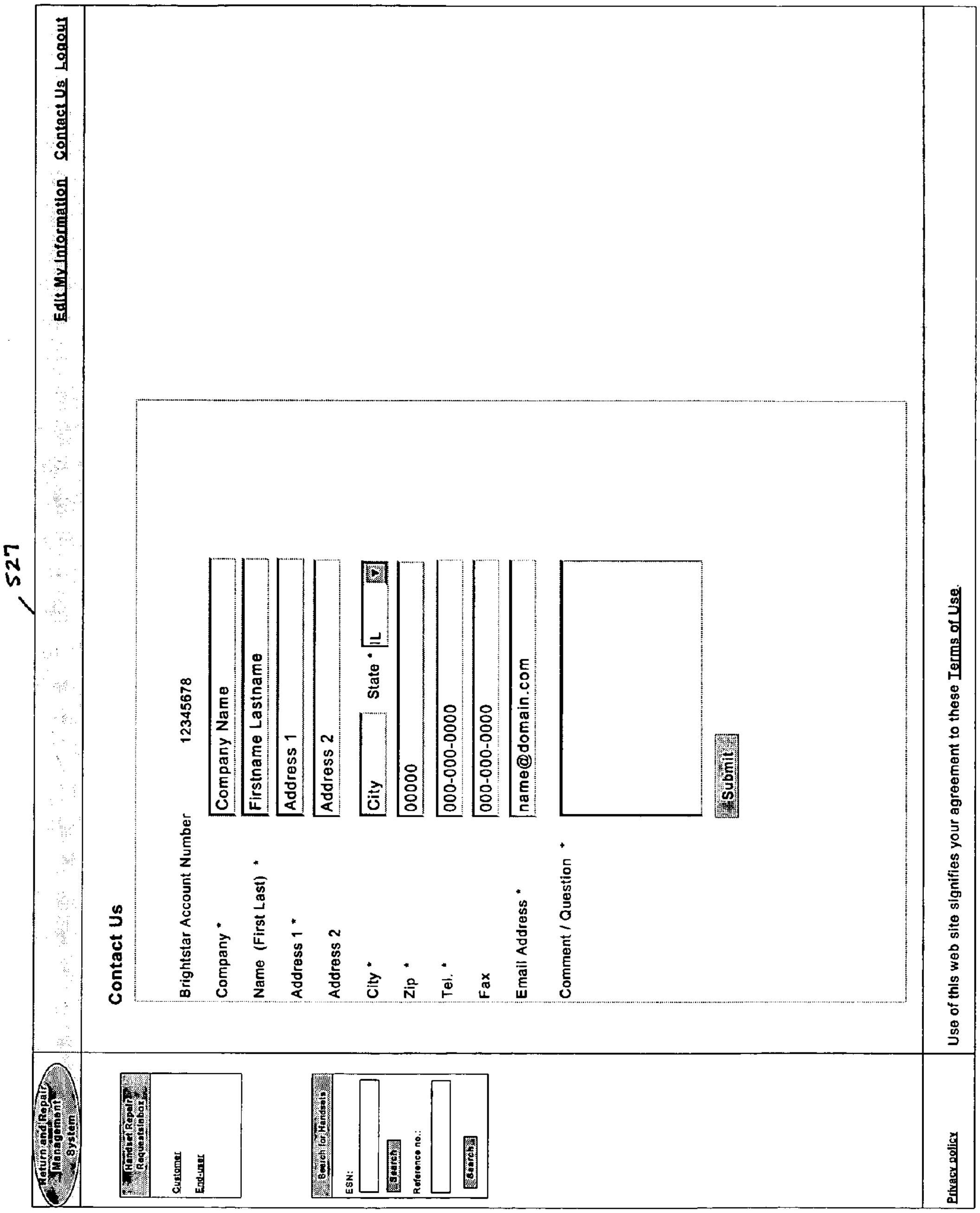

The user interface map 520 includes a contact us UI 527. FIG. 5G illustrates one embodiment of a contact us UI 527 that may be presented to a user. In one implementation, the repair center information is pre-filled with information on record. The account number may be read only. In general, contact us forms submitted are emailed to a specified address.

Figure 5H:
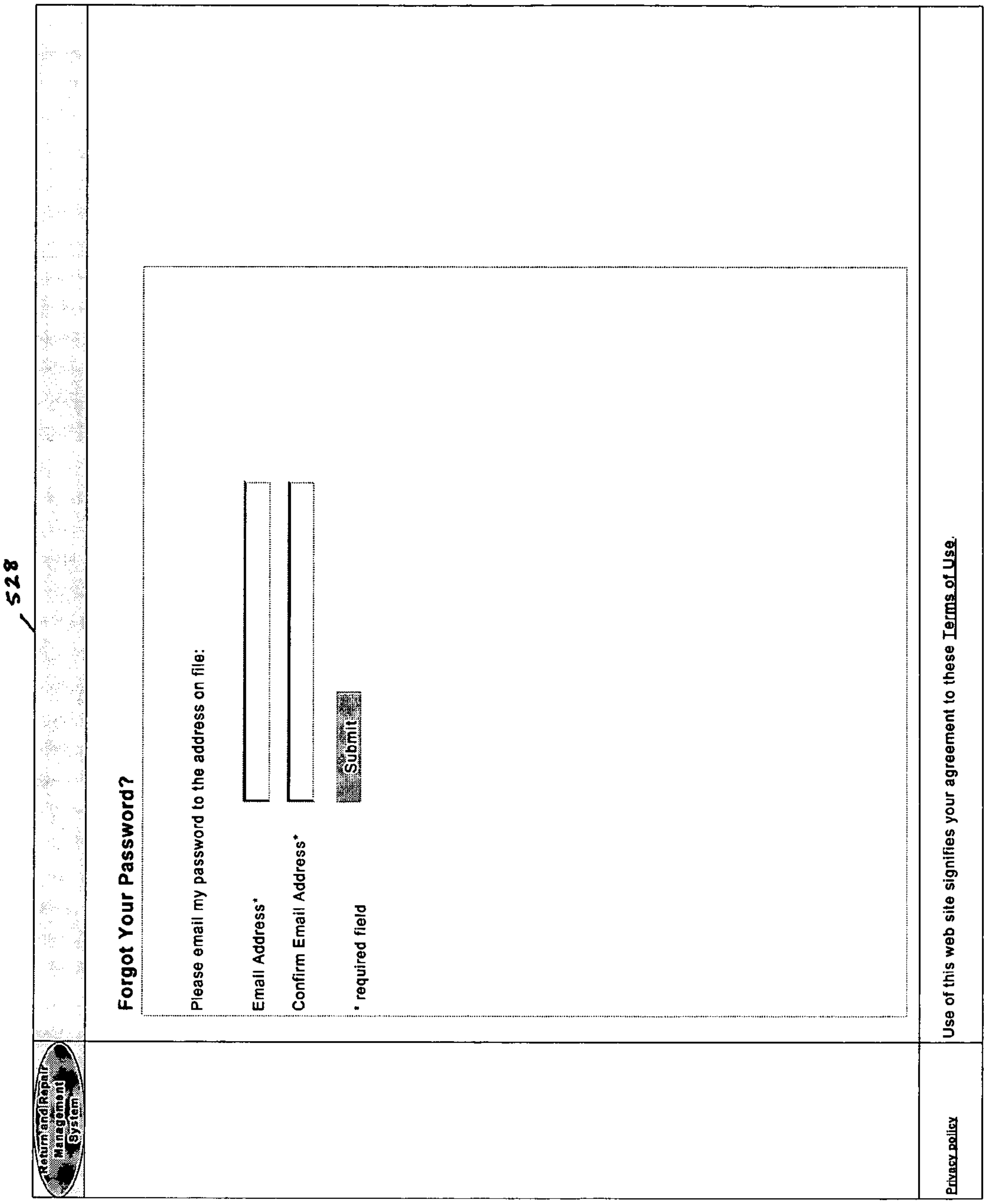

The user interface map 520 includes a forgot password UI 528. FIG. 5H illustrates one embodiment of a forgot password UI 528 that may be presented to a user. In one implementation, only valid accounts will be emailed their access details. The system may reply with a "thank you" message.

Figure 5I:
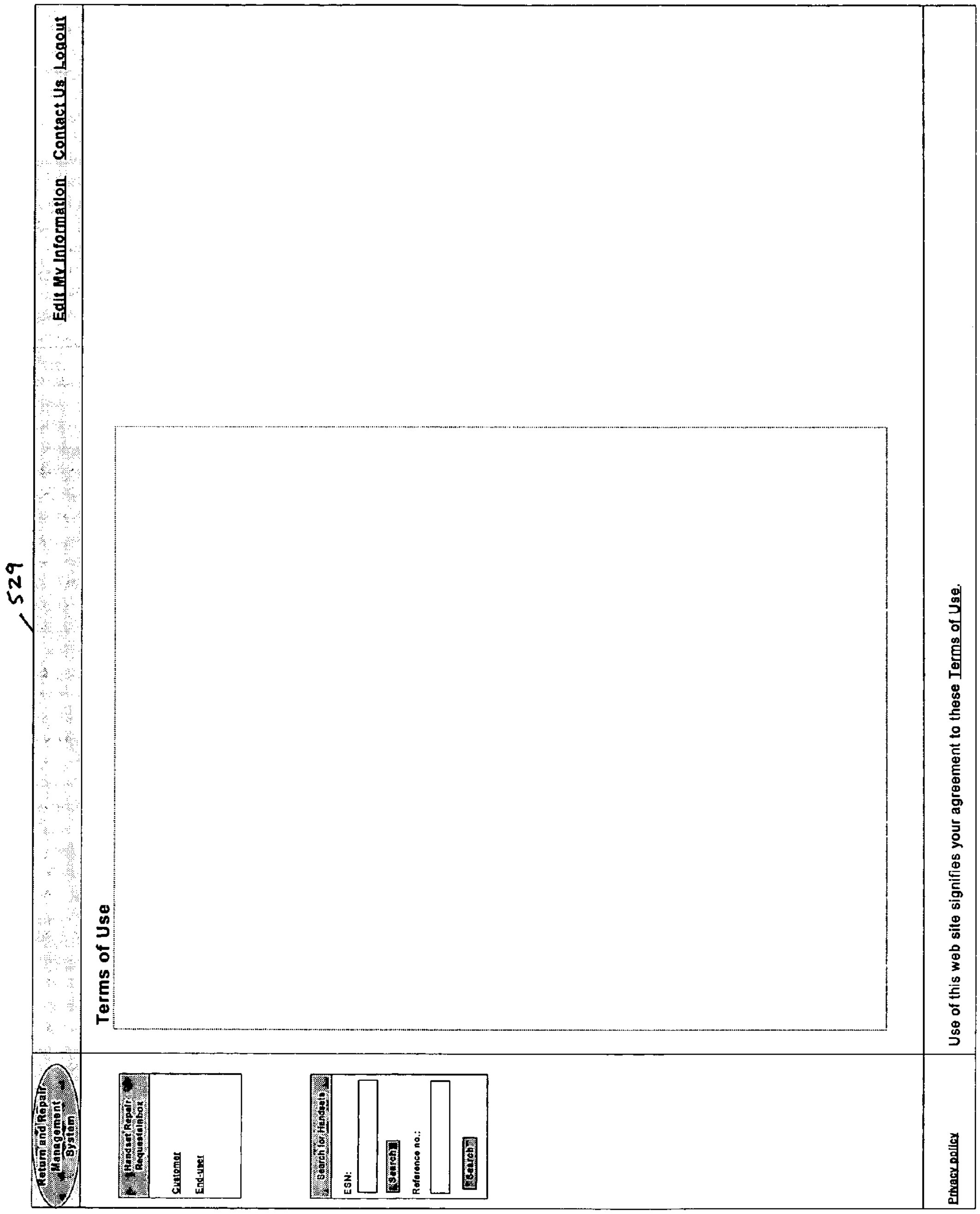
Figure 5J:
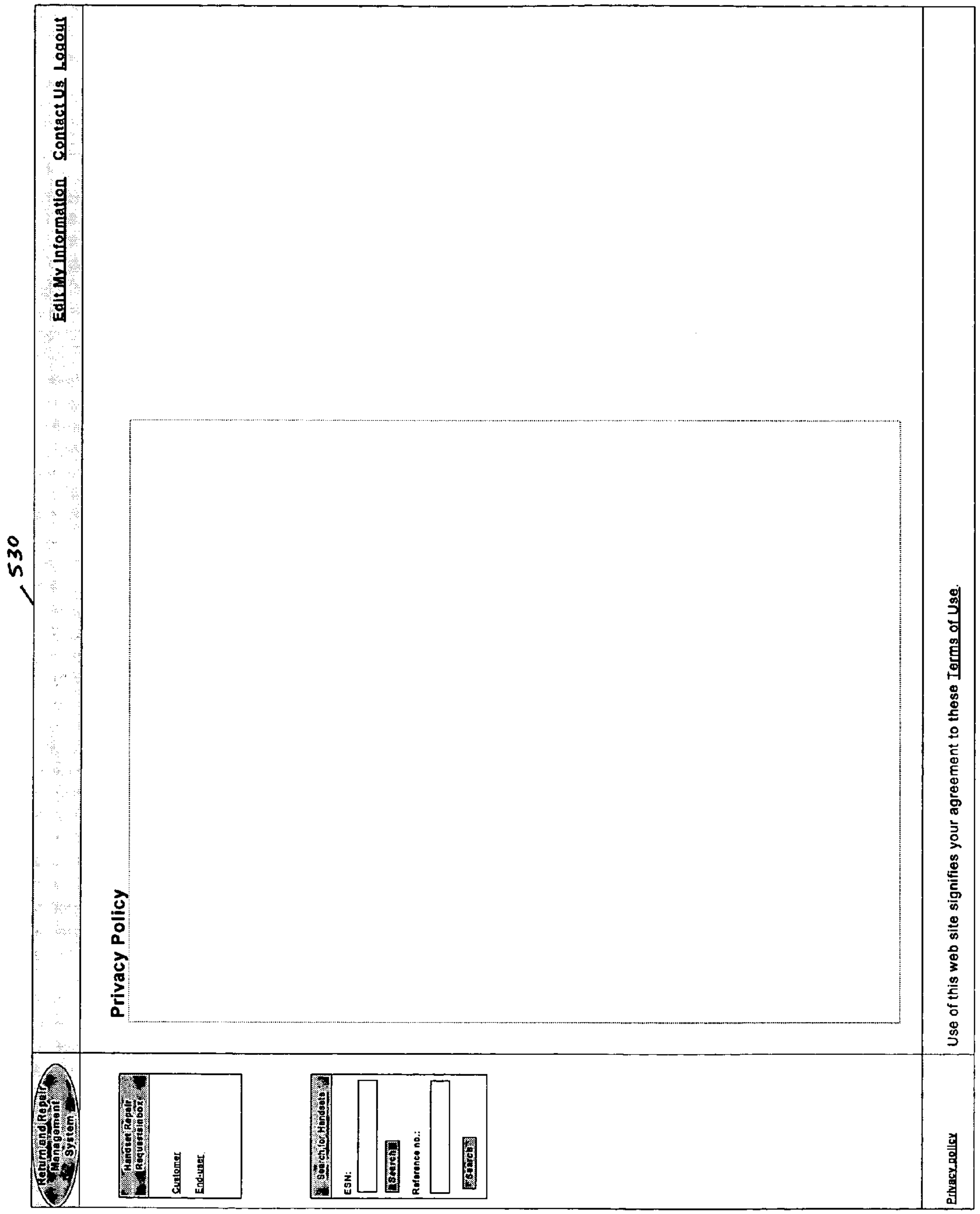

The user interface map 520 includes a terms of use UI 529. FIG. 5I illustrates one embodiment of a terms of user UI 529 that may be presented to a user. The user interface map 520 includes a privacy policy UI 530. FIG. 5J illustrates one embodiment of a privacy policy UI 530 that may be presented to a user.

Figure 6A:
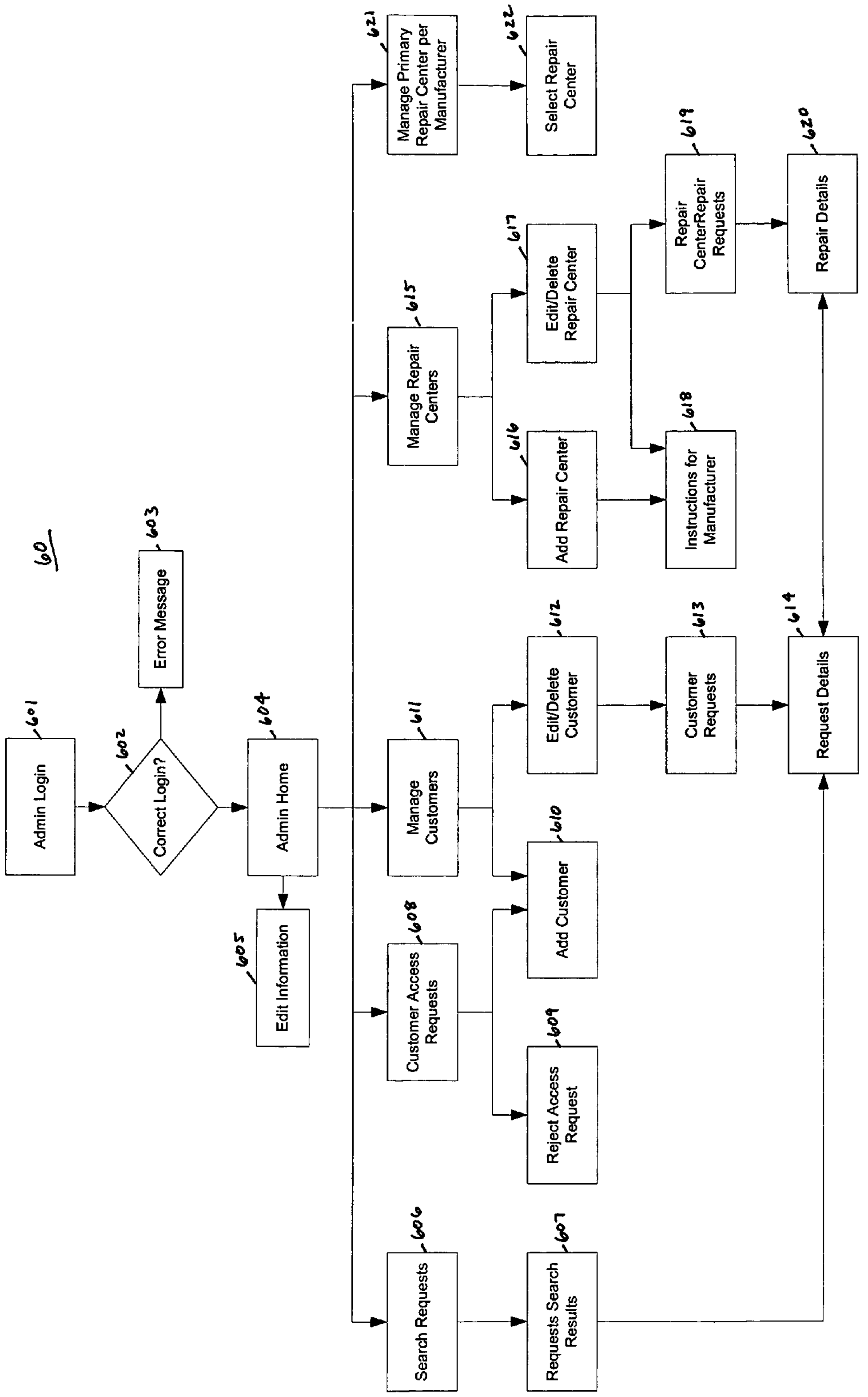
FIG. 6A illustrates an administrative process according to one embodiment of the present invention.

Referring to FIG. 6A the system 100 operates according to an administrative process 60. While particular embodiments and examples are described and illustrated, the process 60 may be implemented by any suitable type of hardware (e.g., device, computer, computer system, equipment, component), software (e.g., program, application, instruction set, code), storage medium (e.g., disk, device, propagated signal), or combination thereof.

At step 601, administrative login is performed. In one implementation, a valid email address and password are requested. At step 602, if the login is incorrect, an error message may be displayed (step 603).

At step 602, if the login is performed correctly, the system may direct a user to an administrative home page (step 604).

From the home page, the system may allow information to be edited (step 605). In one implementation, information such as name, email address, and password may be edited.

At step 606, the system may allow a user to search repair requests and/or return requests. In one implementation, the search may be performed by reference number, customer company name, end-user name and date. At step 607, the system displays results of the requests search.

At step 608, the system may enable customer access requests. Access requests may be rejected (step 609) or customers may be added (step 610). In one implementation, customer information may include company, name, address, city, state, zip code, email address, phone number, fax number, user name and password. Customers may be emailed necessary access details.

At step 611, the system may manage customers. In general, customers may be added (step 610) edited and/or deleted (step 612). At step 613, customer requests may be edited and/or deleted. Customer information may include reference identification and date. At step 614, the system may provide request details. In one implementation, the details may include reference (e.g., date, comments, and handset list). The handset list may include ESN, manufacturer+model, and the first 40 characters of the problem for each handset. Clicking on a particular ESN may display repair details.

At step 615, the system may manage a repair center. Repair centers may be added (step 616) and edited and/or deleted (step 617). Repair center information may include company, name, address, city, state, zip code, email address, phone number, fax number, user name, password and upload instructions (step 618).

At step 619, the system may display repair center repair requests. Repair information may include: ESN manufacturer+model, the first 40 characters of the problem, and date posted. Clicking on a particular ESN may display repair details. At step 620, repair details are displayed. In one implementation, the information may include ESN, manufacturer+ model, description of problem, date posted, status, shipping information and comments.

At step 621, the system may manage primary repair center per manufacturer. In one implementation, the system lists manufacturer names, repair center name, and a link to change. When a user clicks on "change," the system displays a screen with a repair center pull-down menu and a select button to select a repair center (step 622).

Figure 6B:
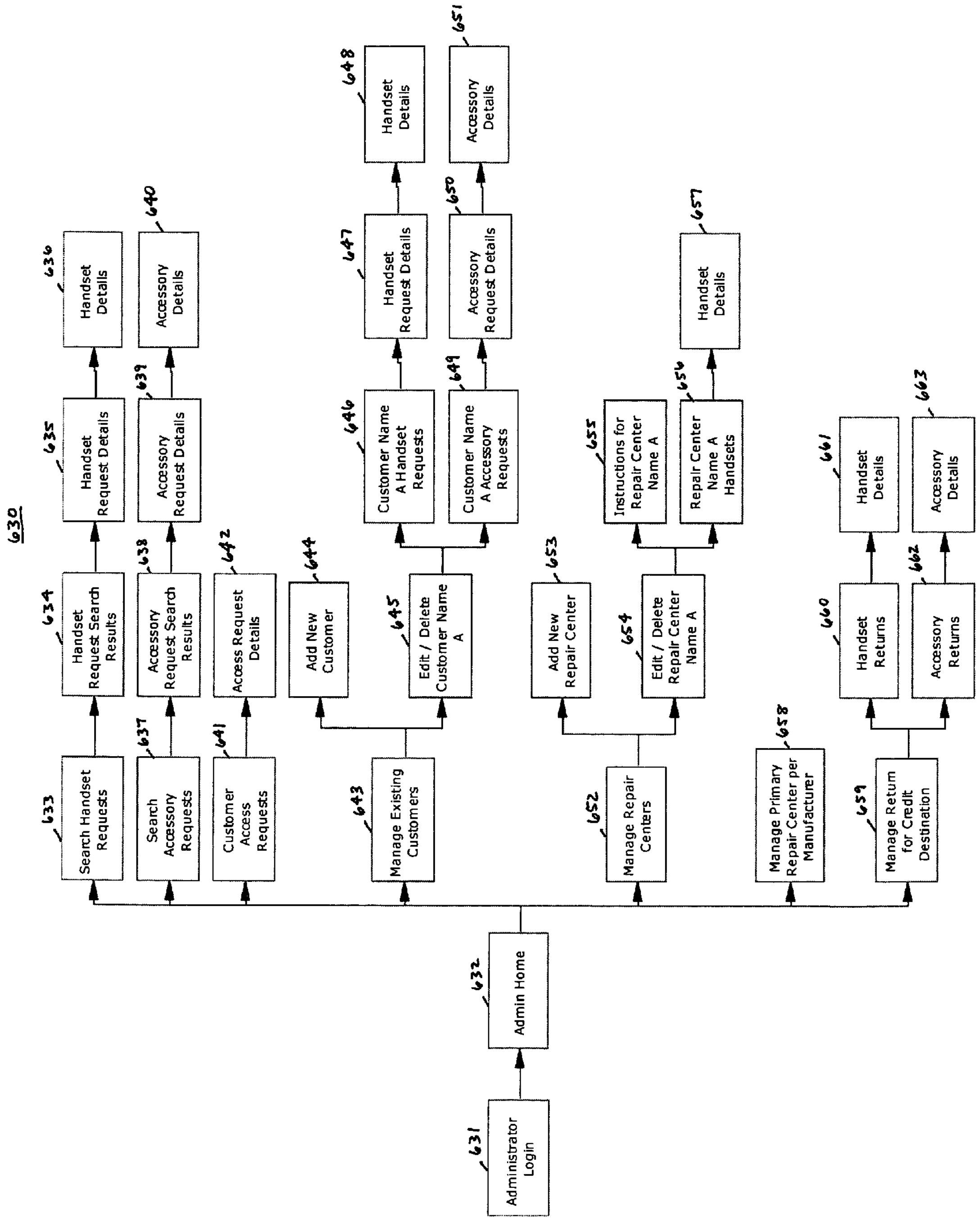
FIG. 6B illustrates a user interface map for an administrative process according to one embodiment the present invention.

FIG. 6B illustrates a user interface map 630 according to one embodiment of the present invention. In one implementation, a user interface map 630 includes a set of UIs that may be presented to a user. In general, the UIs may be presented through an interactive computer screen to solicit information from and present information to a user in conjunction with the administrative process 60. For example, the UIs may be presented through a client system 110 including a personal computer running a browser application and having various input/output devices (e.g., keyboard, mouse, touch screen, etc.) for receiving user input. As shown, the user interface map 630 includes an administrator login UI 631. In one implementation, the UI 631 requests a valid email address and password. Upon proper login, the system may present an administrator home page UI 632.

Figure 6C:
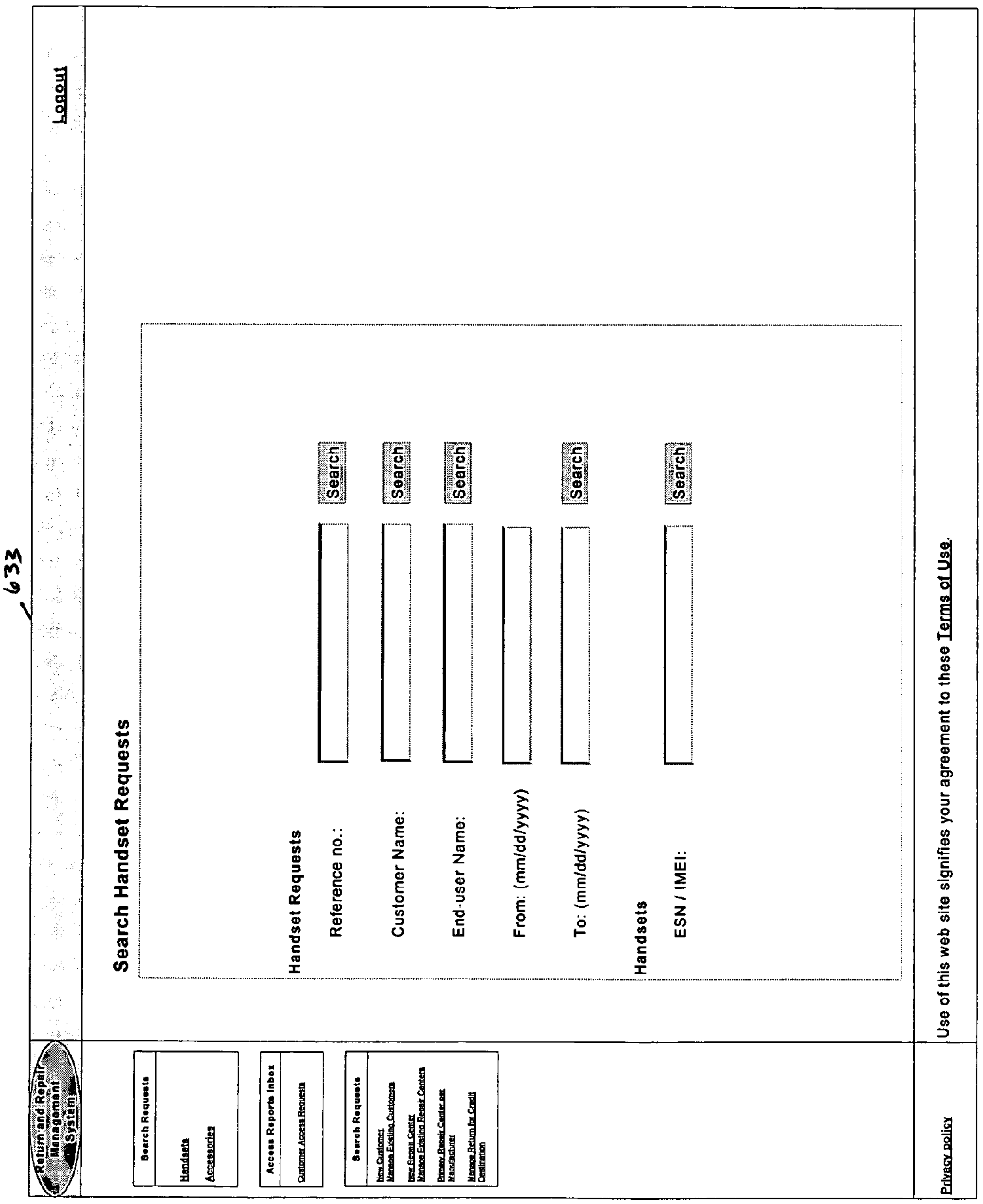
FIGS. 6C-6Z illustrate user interfaces for an administrative process according to one embodiment the present invention.

The user interface map 630 includes a search handset requests UI 633. FIG. 6C illustrates one embodiment of a search handset requests UI 633 that may be presented to a user. In one implementation, a message area displays on-screen help and error messages. A search by reference number returns a handset request details screen. A search by customer name, end-user name, and date (from/to) returns a handset request search results screen. A search by ESN/IMEI displays a handset details screen.

Figure 6D:
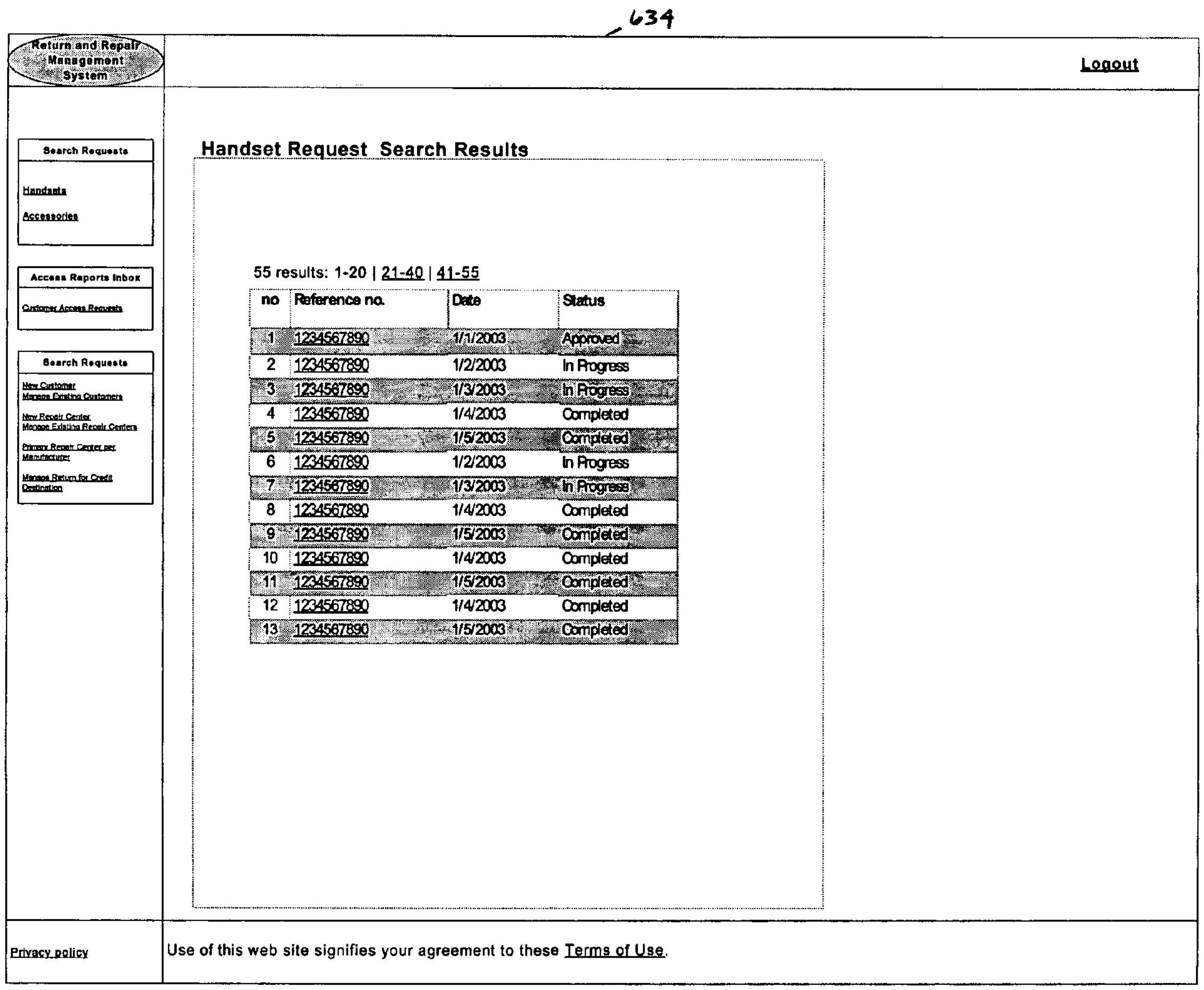

The user interface map 630 includes a handset request search results UI 634. FIG. 6D illustrates one embodiment of a handset request search results UI 634 that may be presented to a user. In one implementation, reference numbers are hyperlinked to handset request details.

Figure 6E:
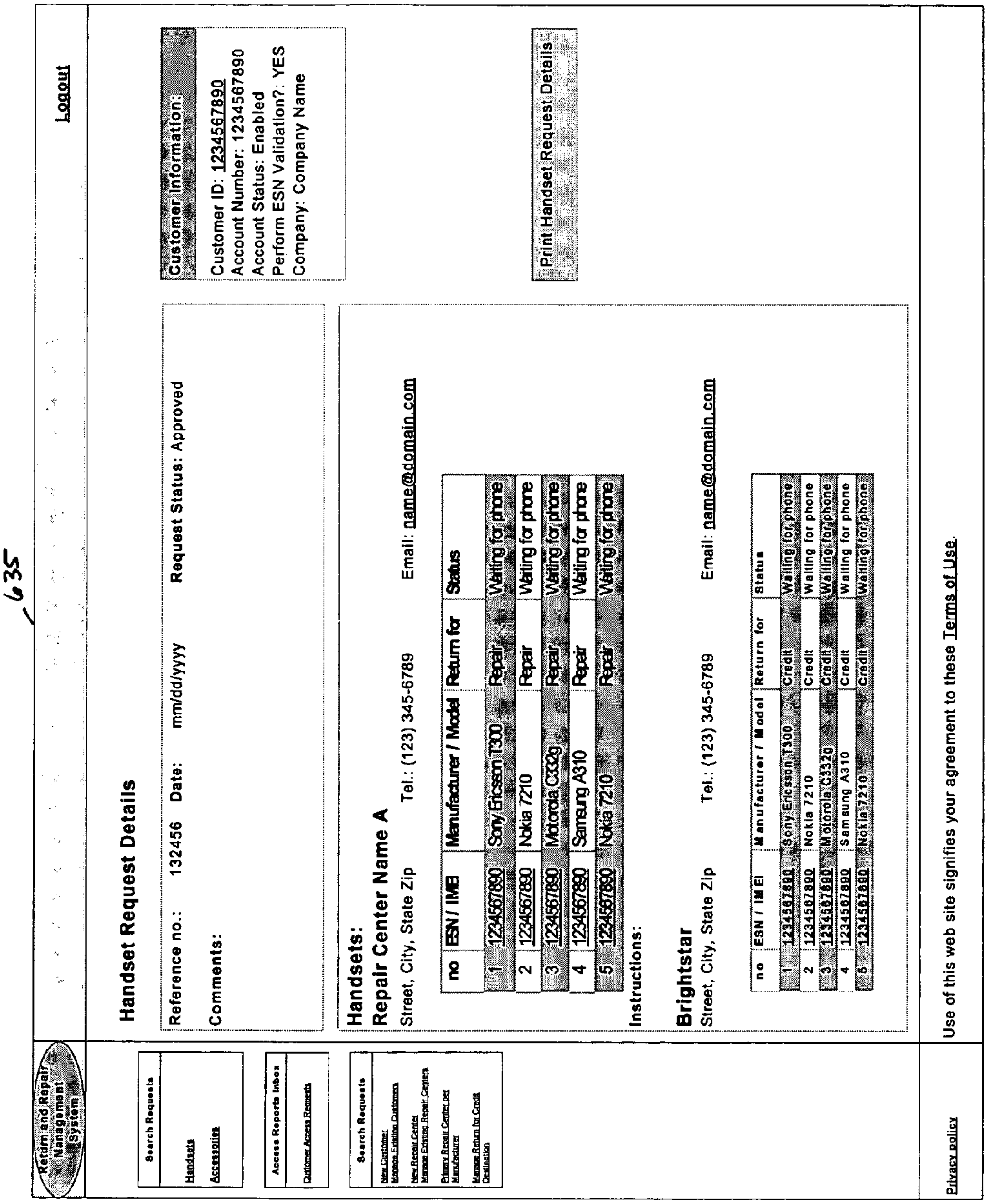

The user interface map 630 includes a handset request details UI 635. FIG. 6E illustrates one embodiment of a handset request details UI 635 that may be presented to a user. In one implementation, reference numbers are hyperlinked to handset request details. Customer ID numbers are hyperlinked to an edit/delete customer screen. Handset status values for repair centers may include: (waiting for handset, received, in progress, back order and shipped). Status values for handsets returned for credit may include: waiting for item, received, credit issued, credit rejected and returned to customer. In general, handset status controls may be available from the repair center interface or from the return for credit destination interface.

As shown, account numbers may be hyperlinked to the edit/delete repair center. Shipping information may be displayed when available. The same wireframe may apply to handsets returned for credit, except that the repair center information may contain return for credit destination information instead.

The user interface map 630 includes a search accessory request UI 637. FIG. 6G illustrates one embodiment of a search accessory request UI 637 that may be presented to a user. In one implementation, a message area may display on-screen help and error messages. A search by reference number may return an accessory request details screen. A search by accessory item, customer name, and date (from/to) may return an accessory request search results screen. Accessory item pull-down menu options may be either hardcoded or managed by a proprietary database.

The user interface map 630 includes an accessory request search results UI 638. FIG. 6H illustrates one embodiment of an accessory request search results UI 638 that may be presented to a user. In one implementation, accessory items may be hyperlinked to accessory details. Reference numbers may be hyperlinked to accessory request details.

The user interface map 630 may include an accessory request details UI 639. FIG. 6I illustrates one embodiment of an accessory request details UI 639 that may be presented to a user. In one implementation, accessory return request status is assigned automatically by the system. Status values may include: approved (accessory return ID generated), in progress (at least one accessory is not complete), and complete (all accessories in accessory return request are complete).

As shown, customer ID numbers may be hyperlinked to an edit/delete customer screen. Accessory items may be hyperlinked to an accessory details screen, which includes accessory status. A "print accessory request details" button reformats information in a printer-friendly fashion (e.g., removing navigation) and prints the accessory request details. In general, all accessories are listed on a single page if possible.

The user interface map 630 includes an accessory details UI 640. FIG. 6J illustrates one embodiment of an accessory details UI 640 that may be presented to a user. In one implementation, reference numbers are hyperlinked to accessory return requests details. Accessory return request status may be assigned by the system automatically. Status values may include: approved (accessory return ID generated), in progress (at least one accessory is not complete), and complete (all accessories in accessory return request are complete).

As shown, customer ID numbers are hyperlinked to an edit/delete customer screen. Accessory status options may include: waiting for item, received, credit issued, credit rejected and returned to customer. Clicking on a hyperlink account number of return for credit destination displays an edit return for credit destination screen. Shipping information may be displayed when available.

The user interface map 630 includes a customer access request UI 641. FIG. 6K illustrates one embodiment of a customer access requests UI 641 that may be presented to a user. In one implementation, names are hyperlinked to full access request details. Access requests that have been either accepted or rejected are removed from the list.

The user interface map 630 includes an access request details UI 642. FIG. 6L illustrates one embodiment of an access request details UI 642 that may be presented to a user. In one implementation, a message area displays on-screen help and error messages. In one embodiment, a check is performed to determine whether an account already exists in the system (e.g., email address correspond to an existing customer). If an account exists, access information is emailed to the valid email address as a reminder. If a customer is not already in the system, a new customer record is created and an email confirmation is sent to the customer. Rejection messages may be emailed to the address on the access request if necessary.

The user interface map 630 includes a manage existing customers UI 643. FIG. 6M illustrates one embodiment of a manage existing customers UI 643 that may be presented to a user. In one implementation, a list is sorted by account number. Customer ID numbers may be hyperlinked to an edit/delete customer name screen.

The user interface map 630 includes an add new customer UI 644. FIG. 6N illustrates one embodiment of an add new customer UI 644 that may be presented to a user. In one implementation, a message area displays on-screen help and error messages. The system may check whether an email address is already associated with a customer. If it is, an error message is returned. If the customer is not already in the system, a new customer record is created and confirmation is emailed to the customer.

The user interface map 630 includes an edit/delete customer name UI 645. FIG. 6O illustrates one embodiment of an edit/delete customer name UI 645 that may be presented to a user. In one implementation, when account status is disabled, a customer can no longer access the system, but all information is kept. The default value is "enabled."

When the ESN validation is set to NO, the system will not validate against the ESN database any of the ESN numbers entered by the particular customer. Only ESN syntax validation will take place. The default value is "YES."

As shown, a "submit change" button can be used to edit customer records and email confirmation to a customer. A "delete customer" button may be used to delete a customer record. In general, it is only possible to delete a customer record when the customer has no handset or accessory requests.

The user interface map 630 includes a customer handset requests UI 646. FIG. 6P illustrates one embodiment of a customer handset requests UI 646 that may be presented to a user. In one implementation, customer ID numbers are hyperlinked to an edit/delete customer screen. Reference numbers are hyperlinked to a handset request details screen.

Figure 6F:
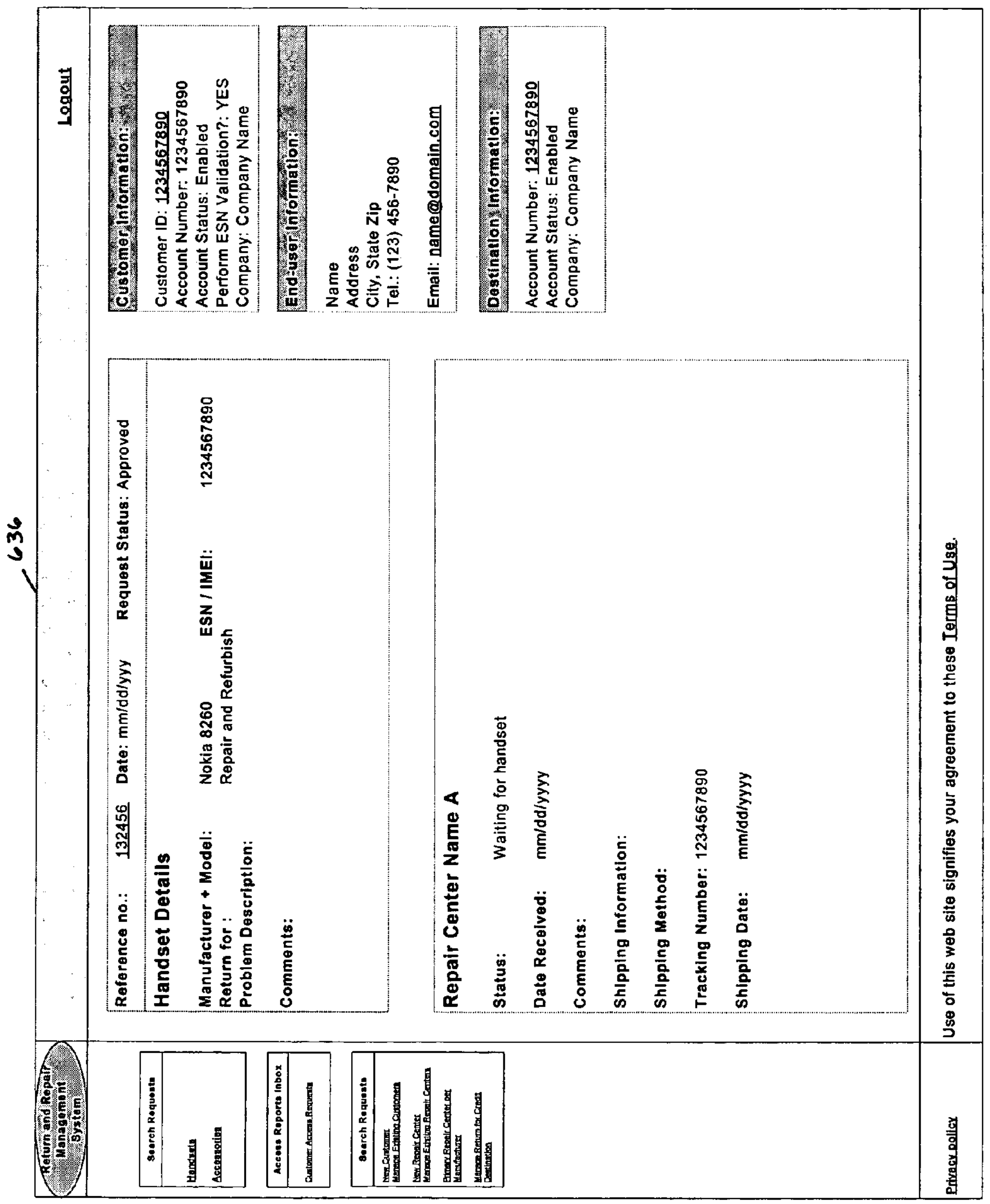
Figure 6G:
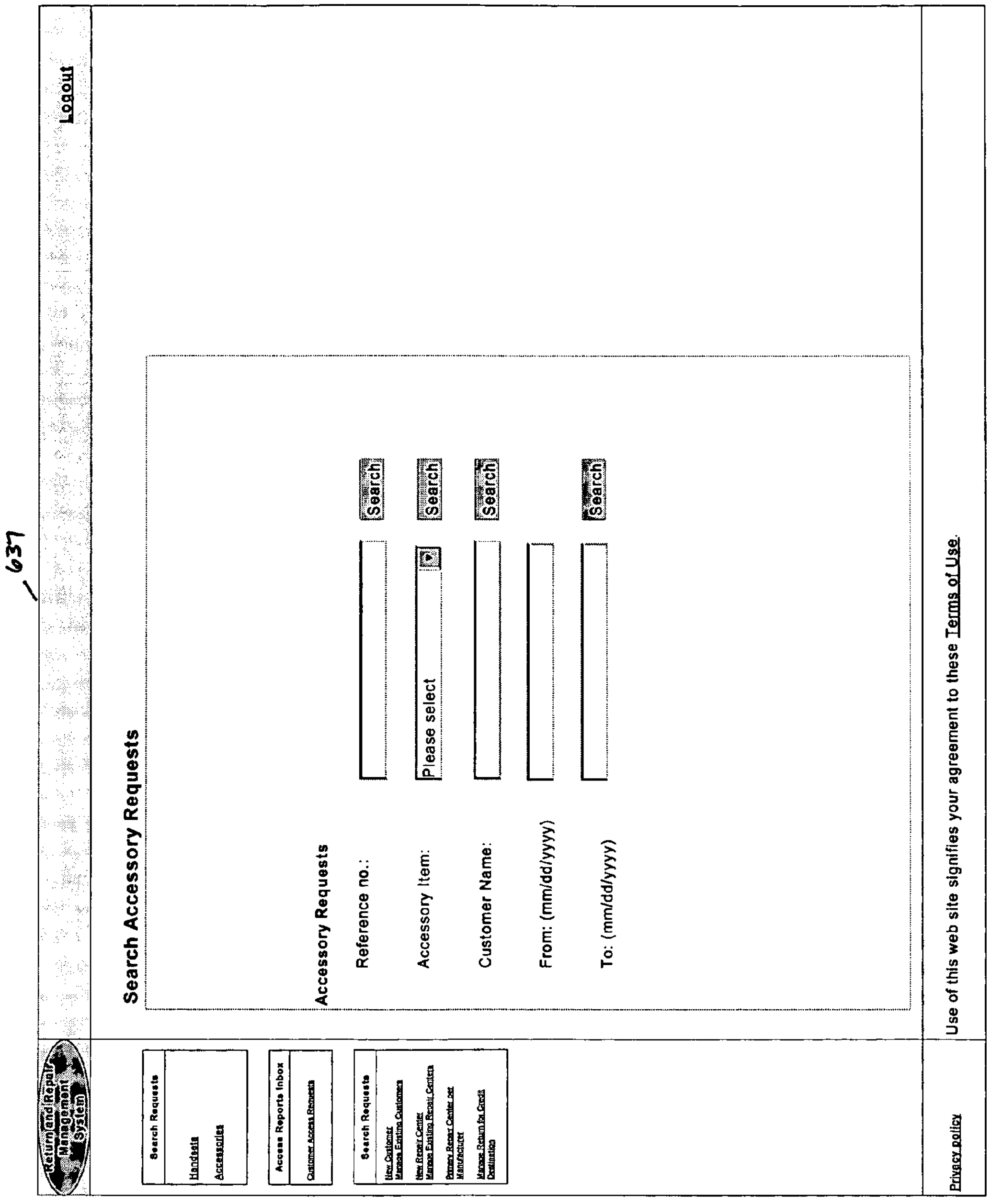
Figure 6H:
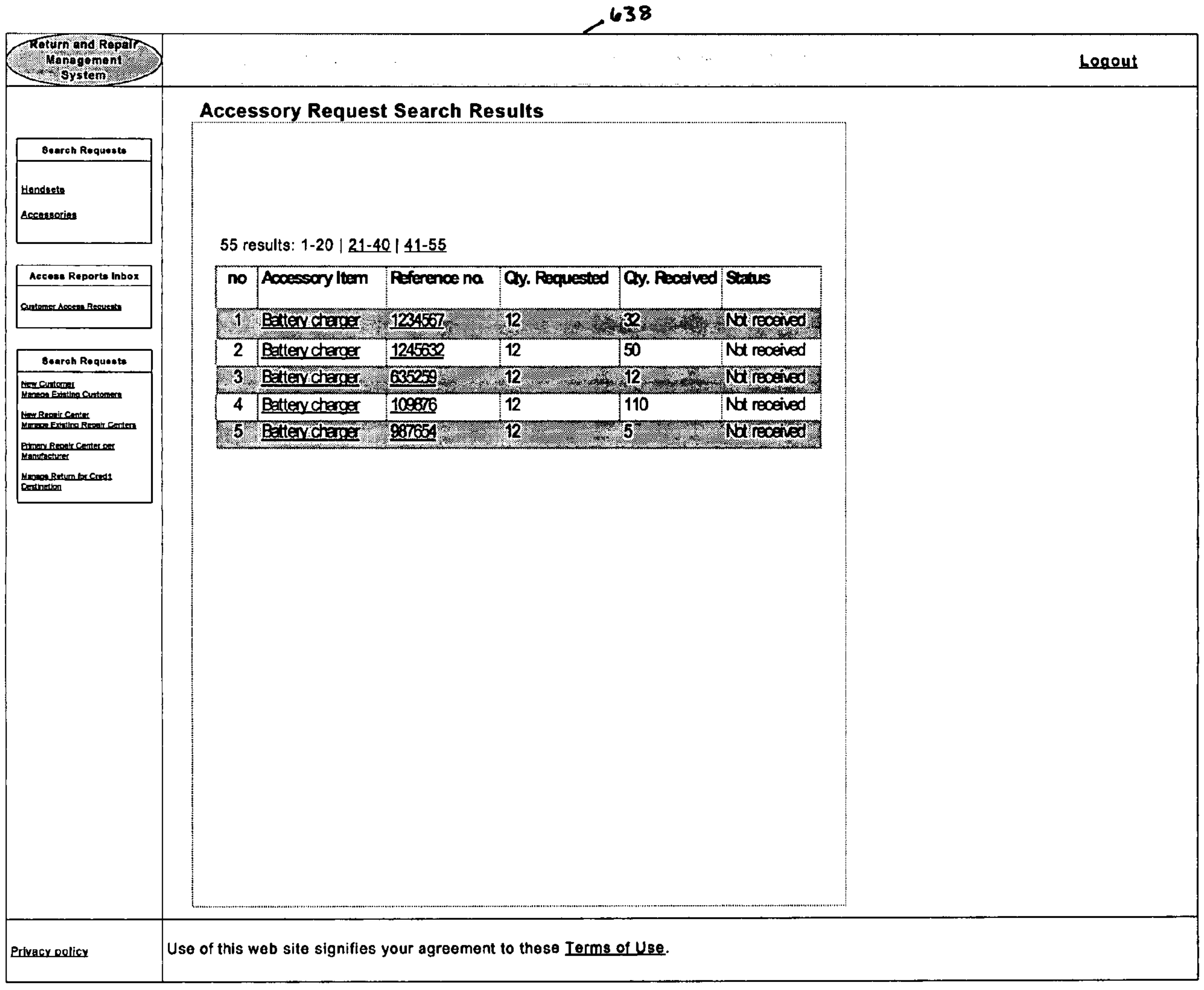
Figure 6I:
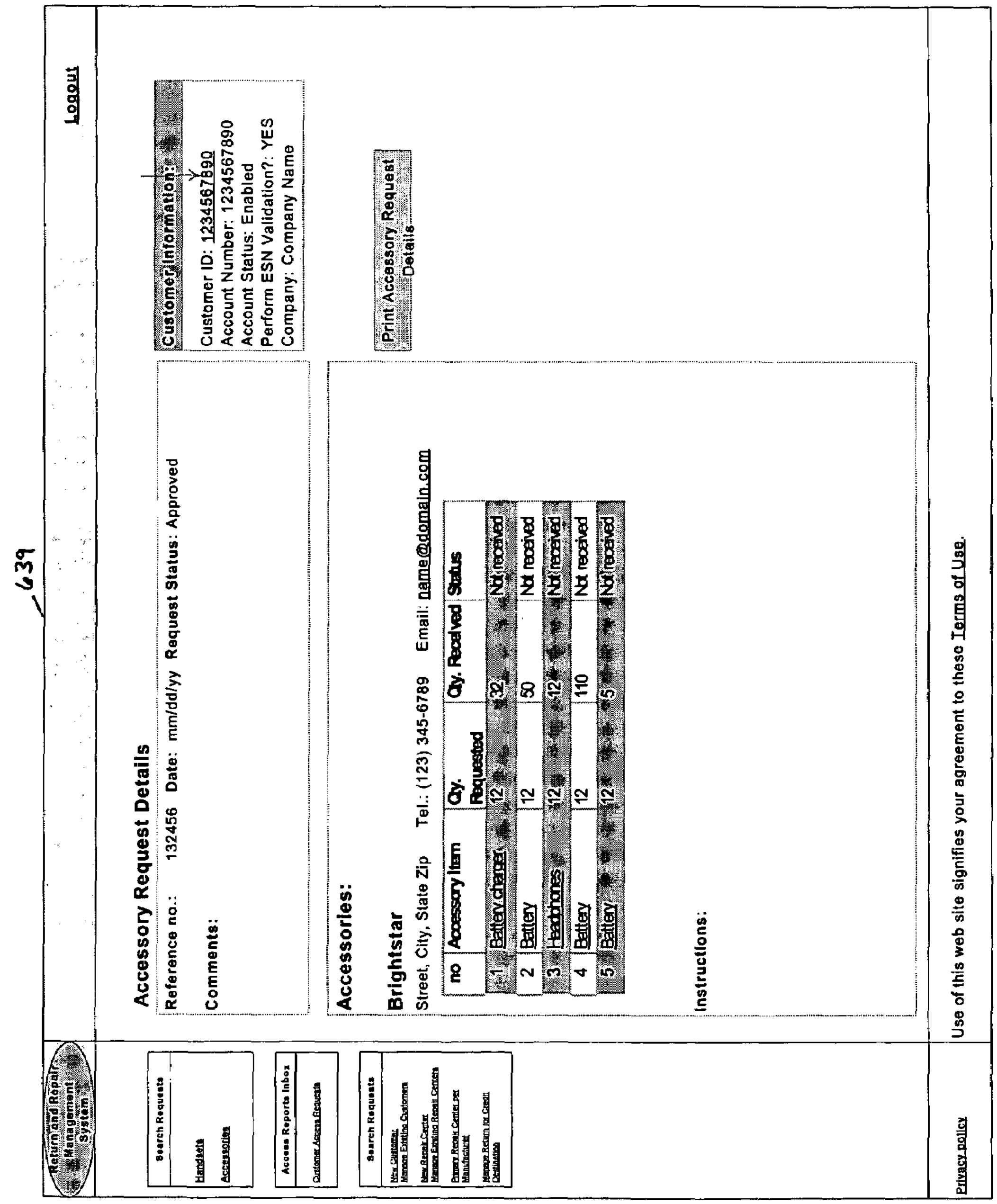
Figure 6J:
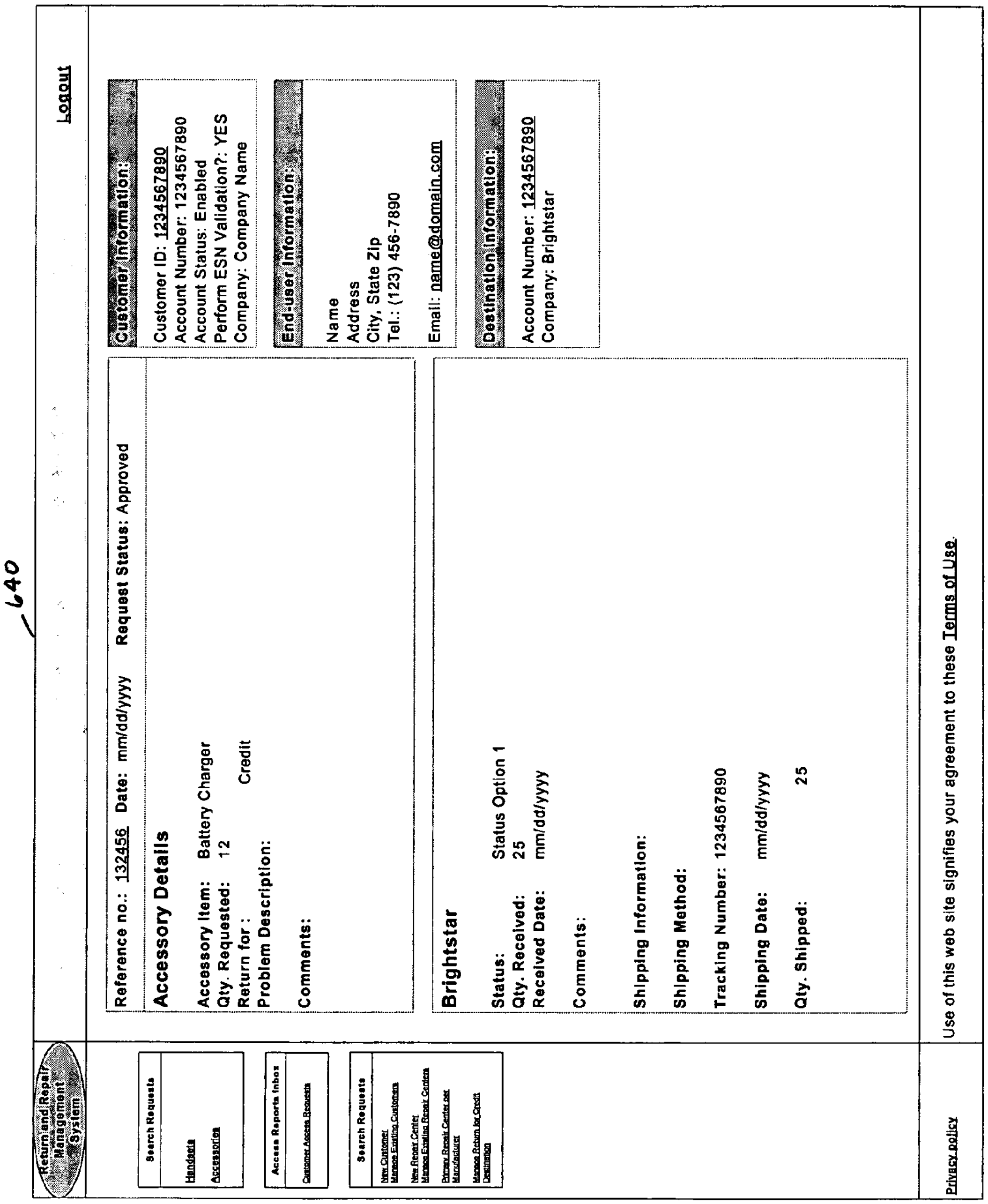
Figure 6K:
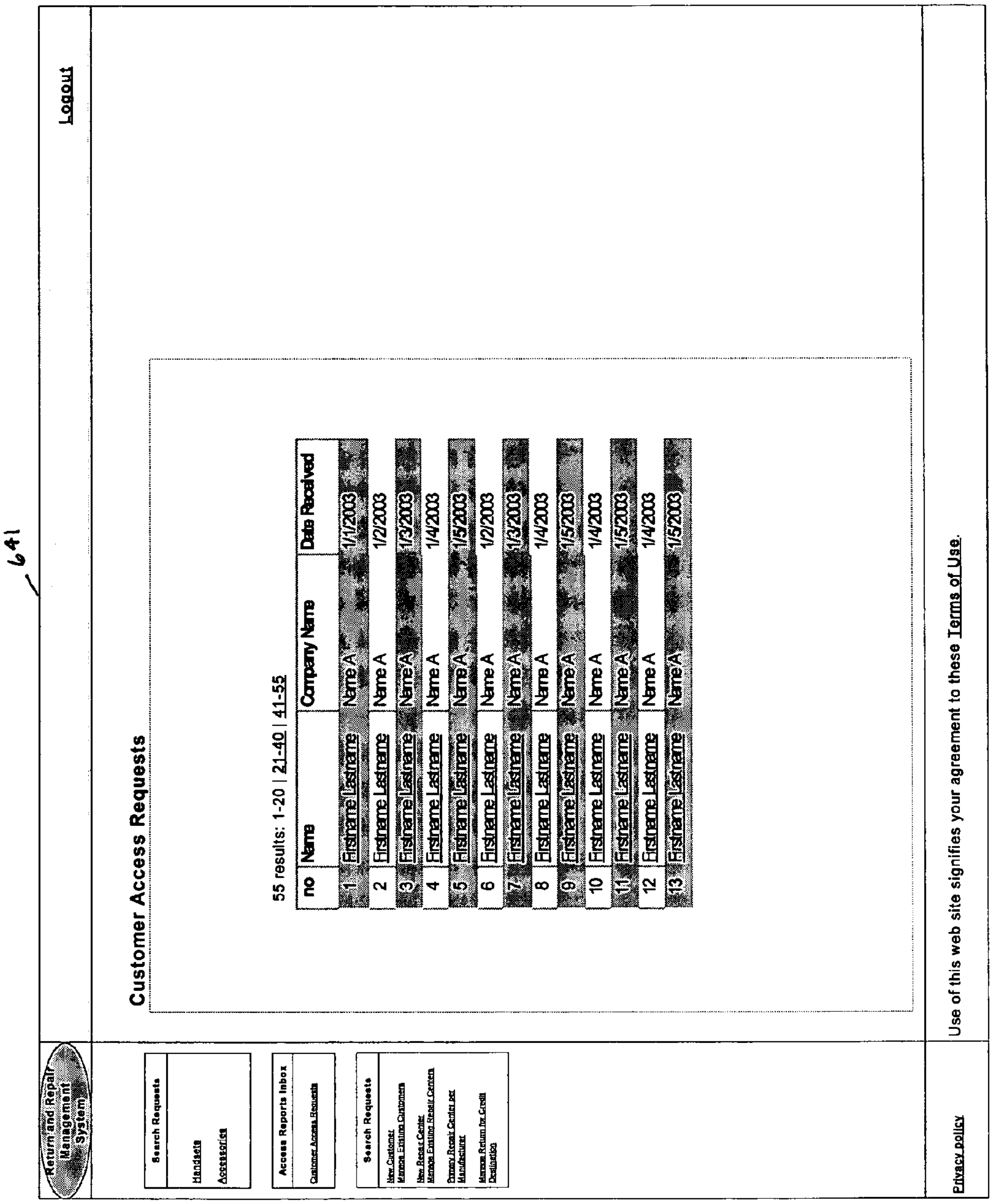
Figure 6L:
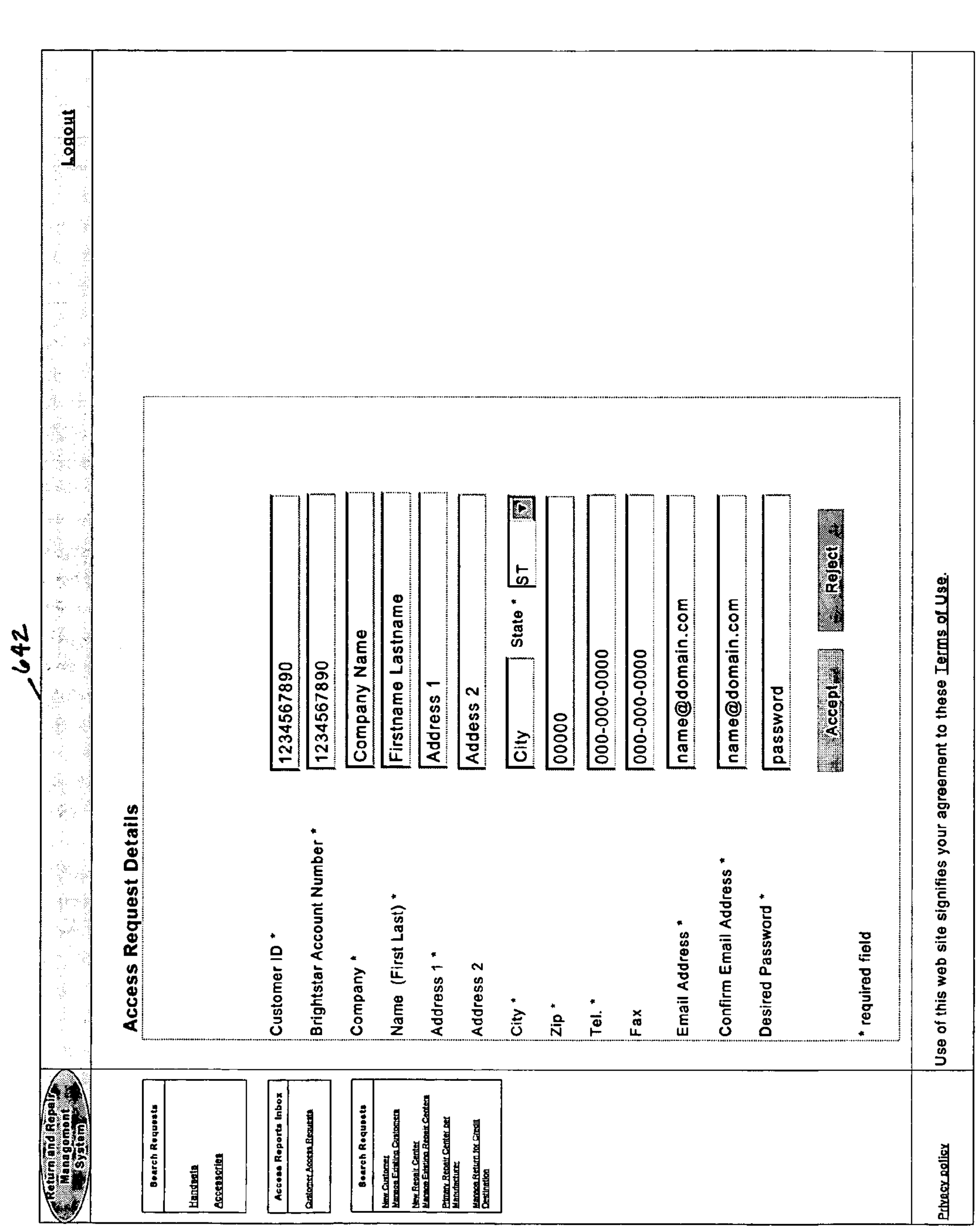
Figure 6M:
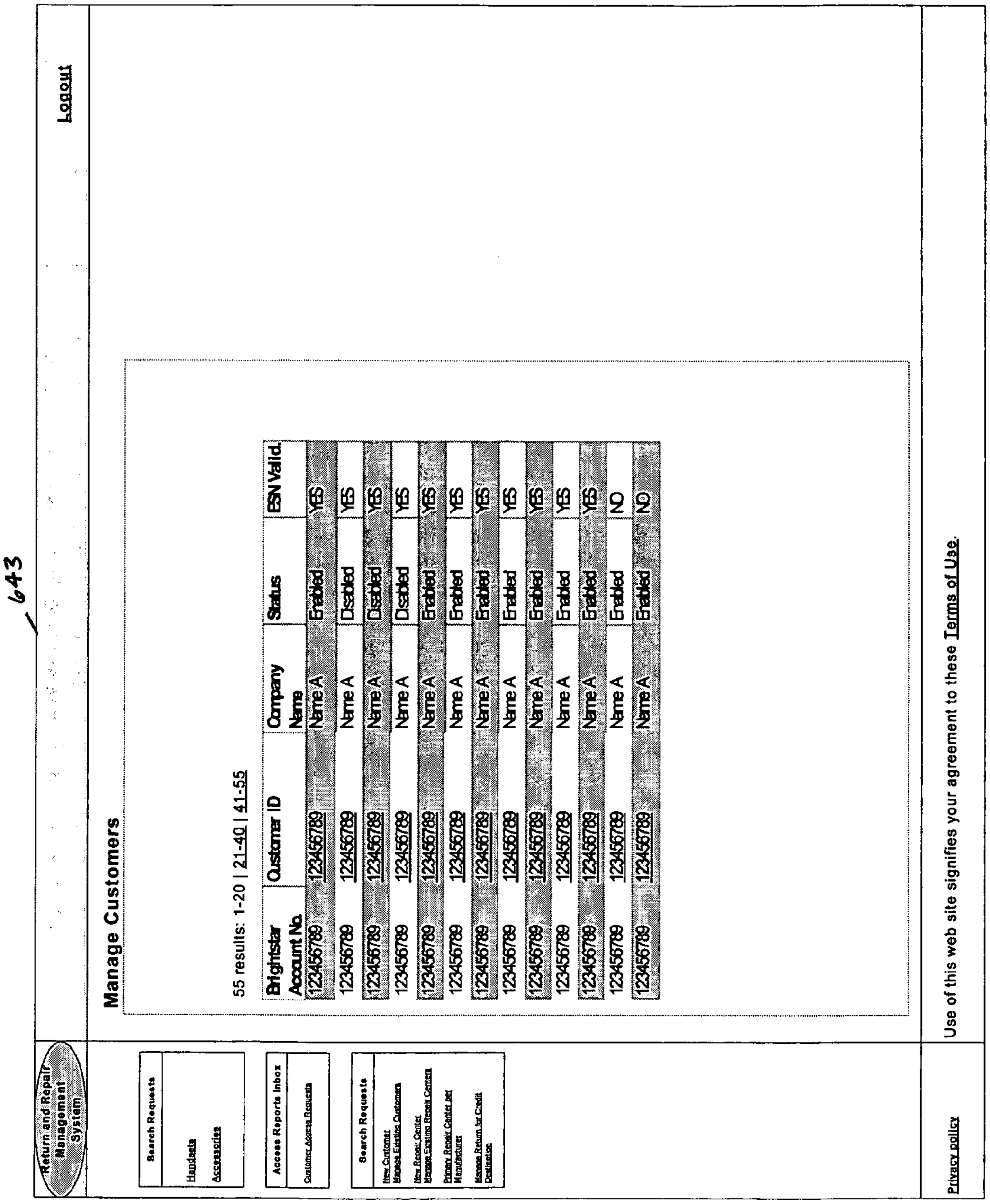
Figure 6N:
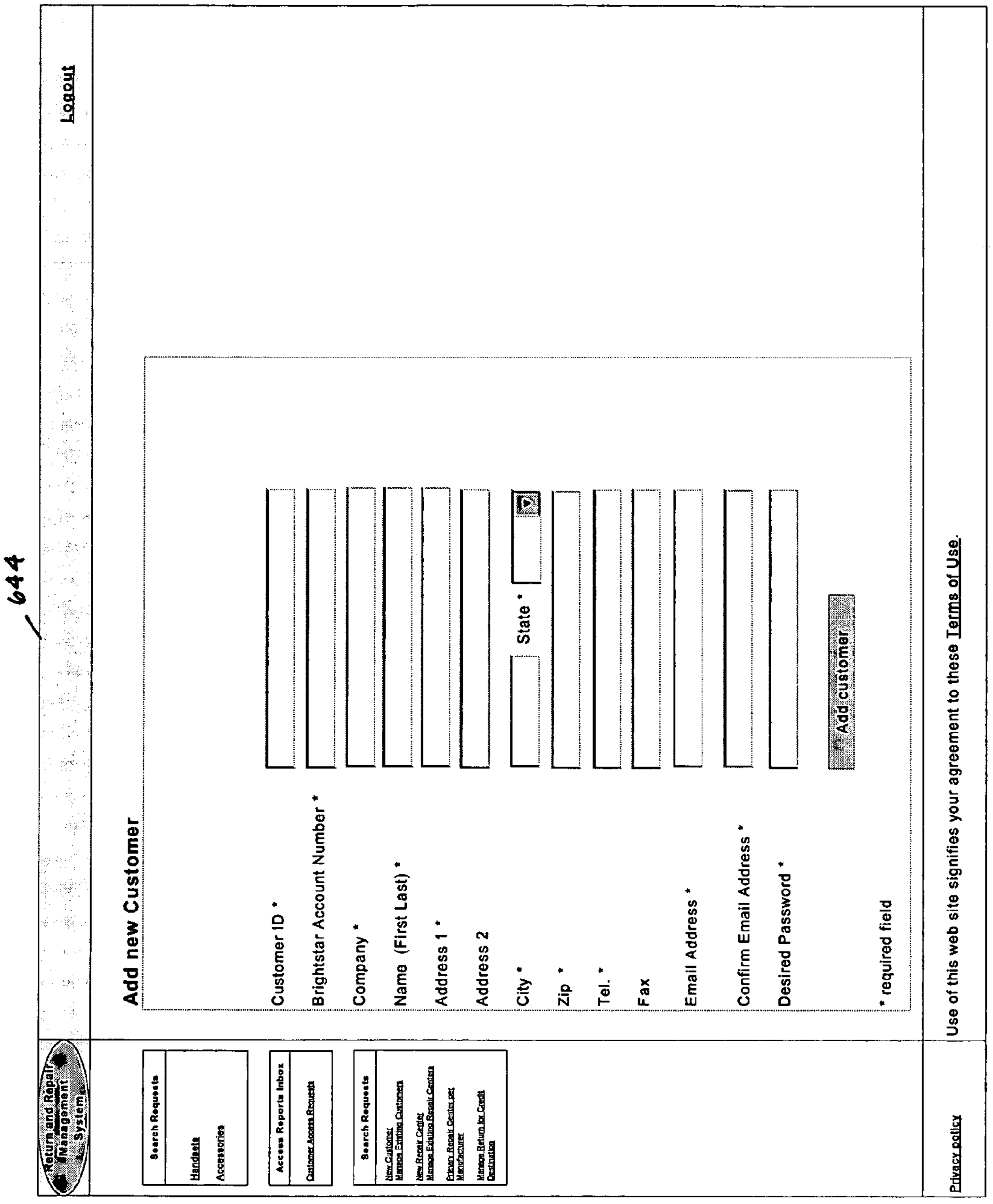
Figure 6O:
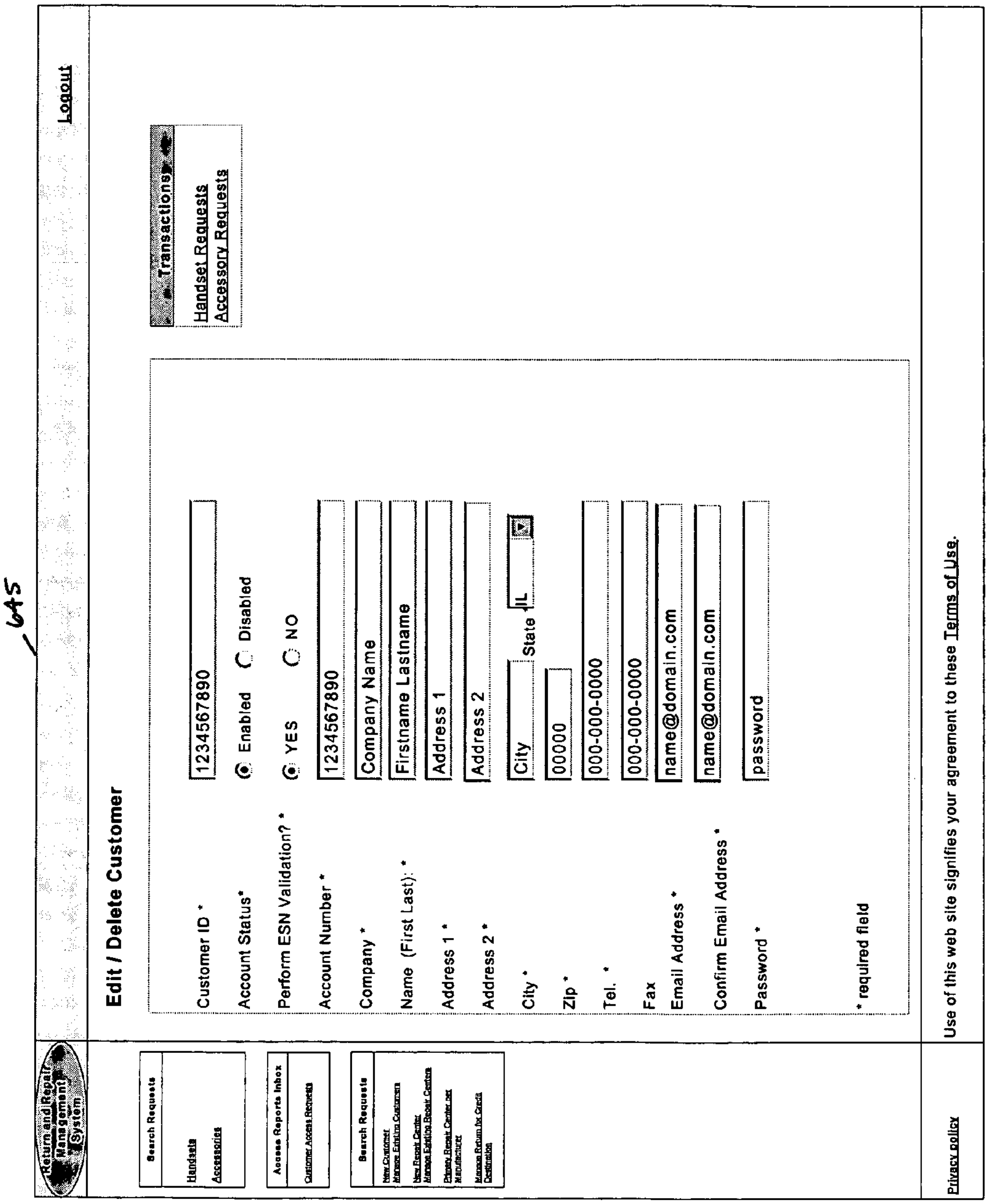
Figure 6P:
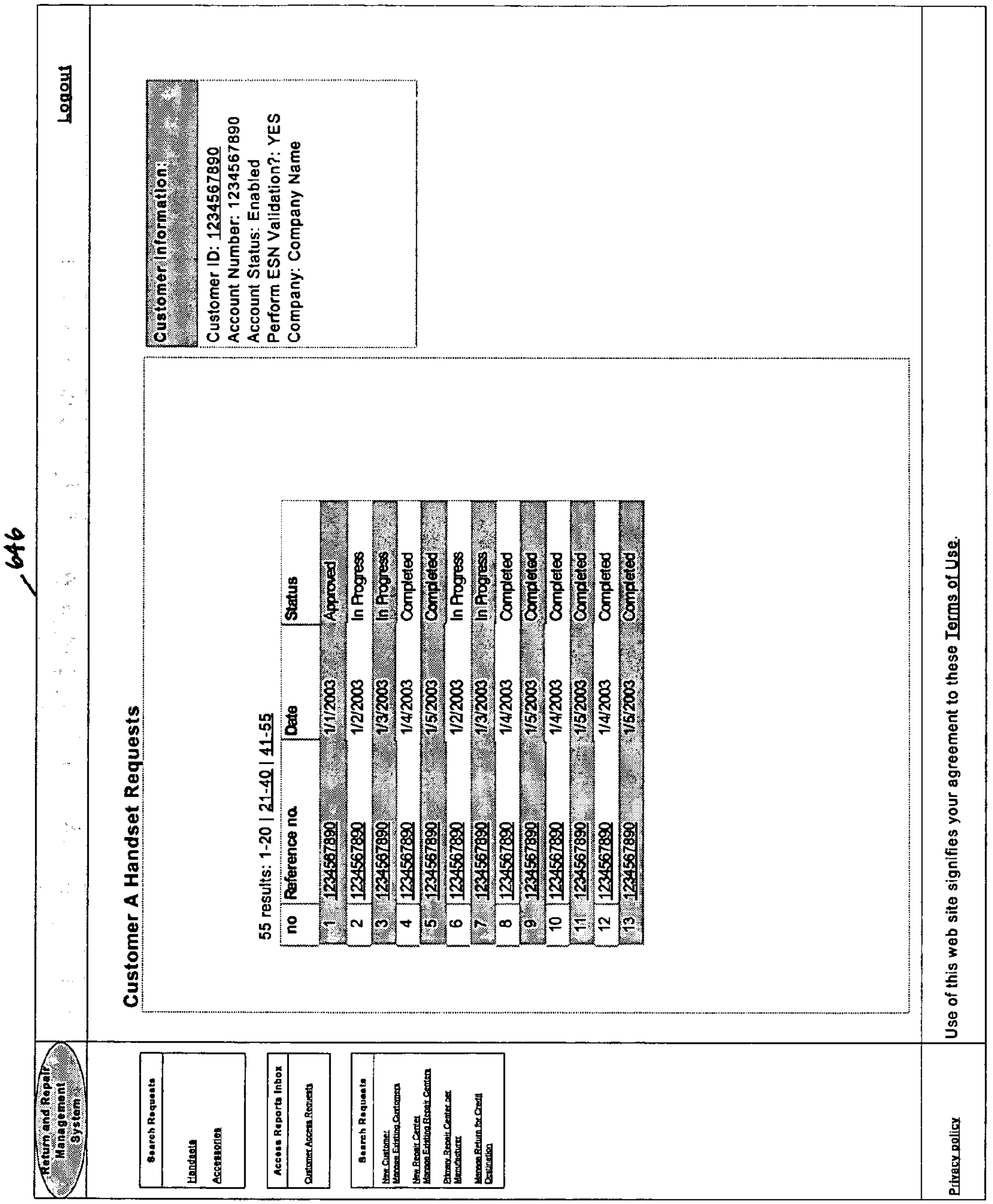

The user interface map 630 also includes a handset request details UI 647 (e.g., FIG. 6E) and a handset details UI 648 (e.g., FIG. 6F).

Figure 6Q:
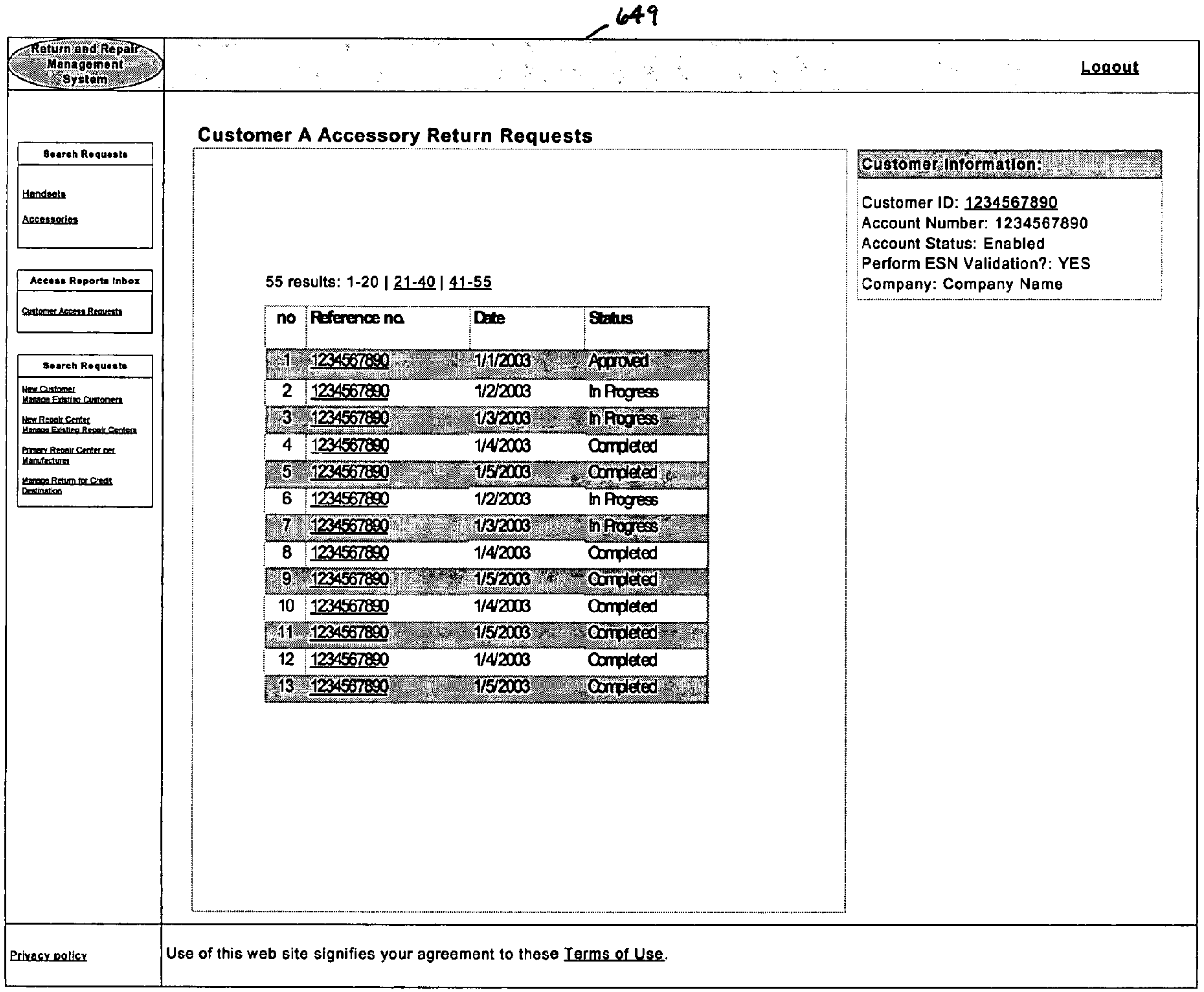

The user interface map 630 includes a customer accessory return requests UI 649. FIG. 6Q illustrates one embodiment of a customer accessory return requests UI 649 that may be presented to a user. In one implementation, customer ID numbers are hyperlinked to a edit/delete customer screen. Reference numbers are hyperlinked to an accessory return requests details screen.

The user interface map 630 also includes an accessory requests details UI 650 (e.g., FIG. 6I) and an accessory details UI 651 (e.g., FIG. 6J).

Figure 6R:
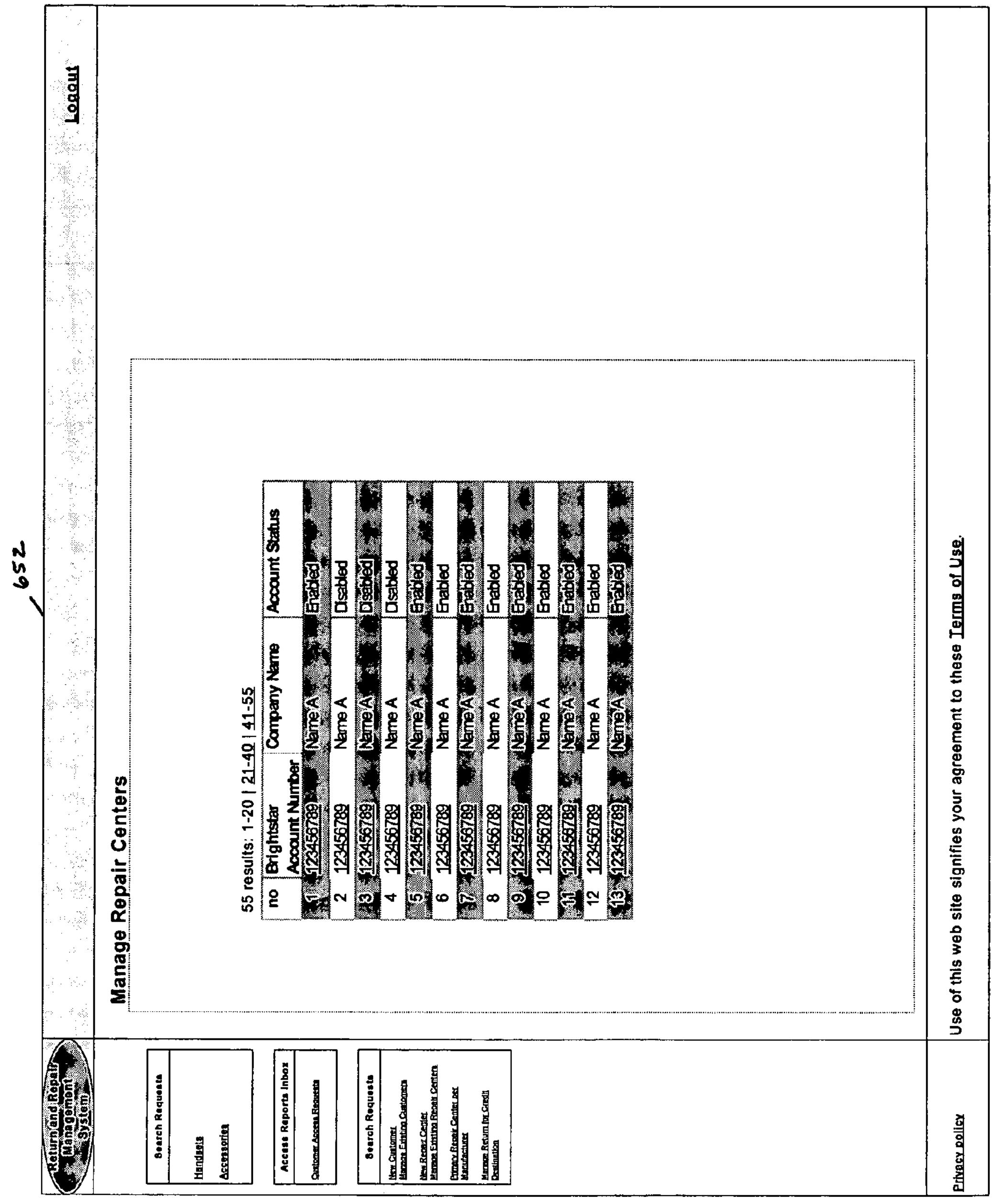

The user interface map 630 includes a manage repair centers UI 652. FIG. 6R illustrates one embodiment of a manage repair centers UI 652 that may be presented to a user. In one implementation, account numbers are hyperlinked to an edit/delete repair center name screen.

Figure 6S:
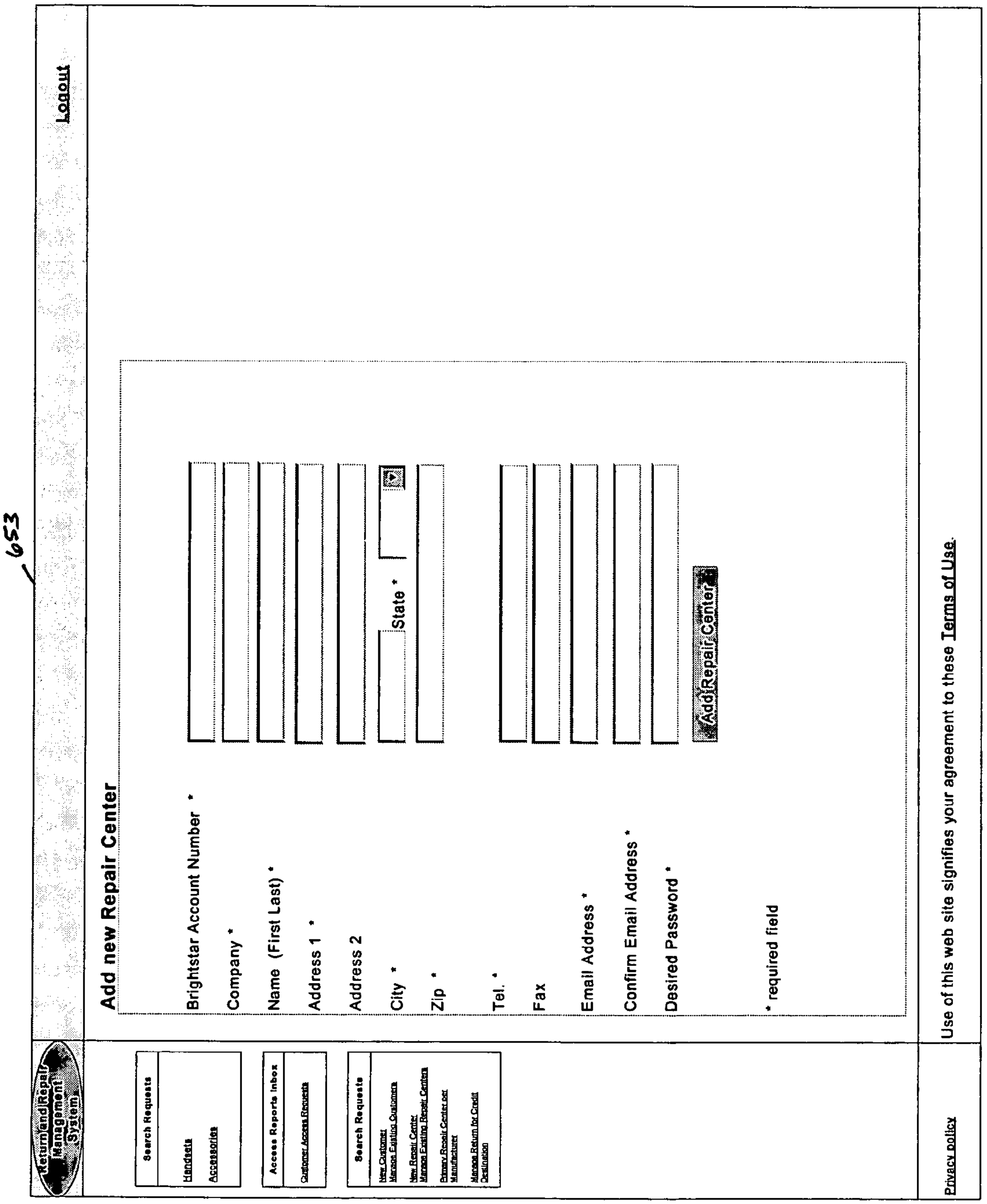

The user interface map 630 includes an add new repair center UI 653. FIG. 6S illustrates one embodiment of an add new repair center UI 653 that may be presented to a user. In one implementation, the system checks to determine whether an account number is already in the system. If it is, the system returns an error message. If the repair center is not already in the system, the repair center is added to the return and repair management system and a confirmation is emailed to the repair center. In general, the email address is used to access the system.

Figure 6T:
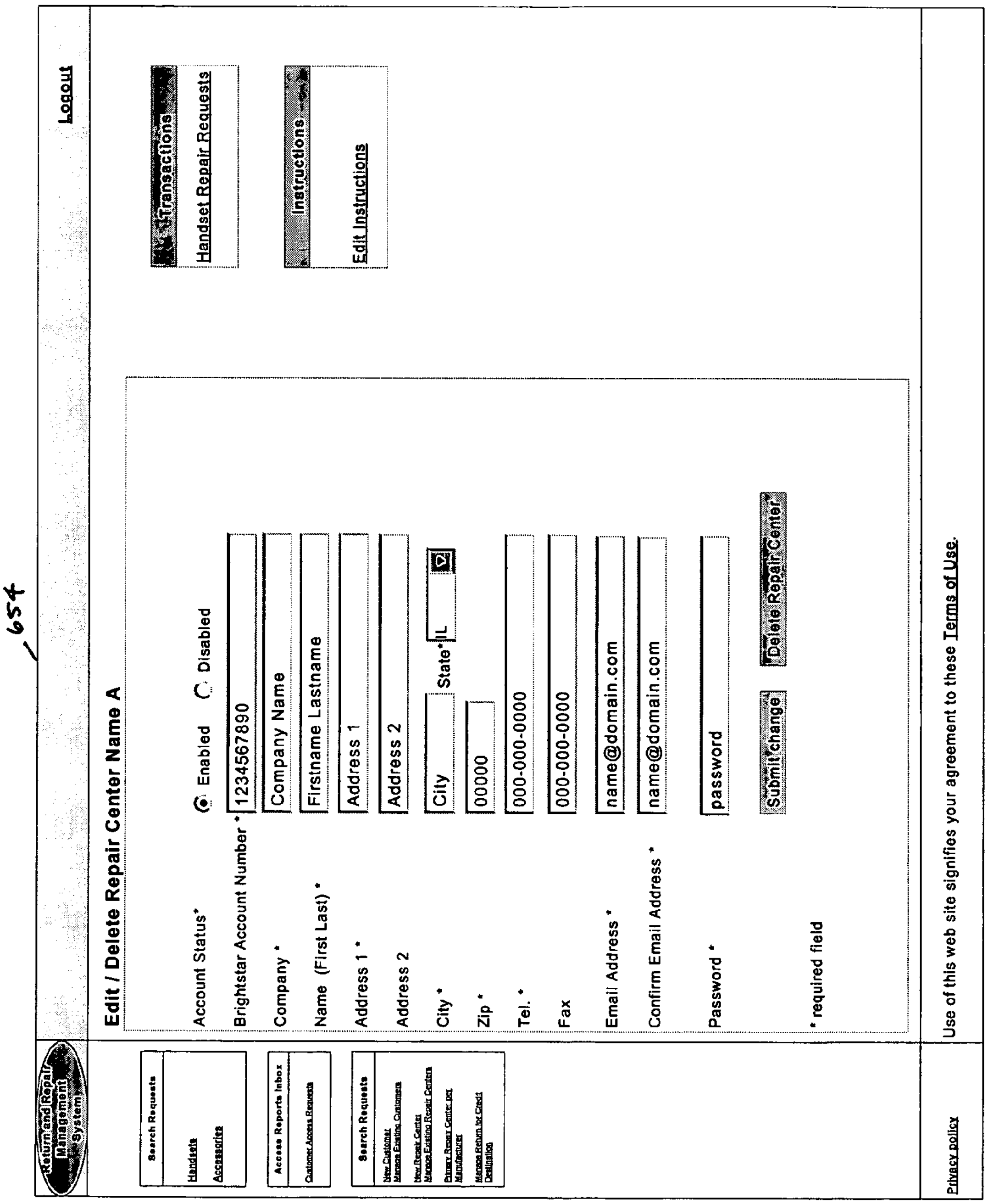

The user interface map 630 includes an edit/delete repair center UI 654. FIG. 6T illustrates one embodiment of an edit/delete repair center UI 654 that may be presented to a user. In one implementation, when account status is disabled, the repair center can no longer access the system, but information is kept secure.

As shown, a "submit change" button may be used to edit repair center records and email confirmation to a repair center. The "delete repair center" button may delete a repair center record. In general, deleting a repair center may only be possible when a repair center has no handset repair. The "edit instructions" link may display instructions for editing.

Figure 6U:
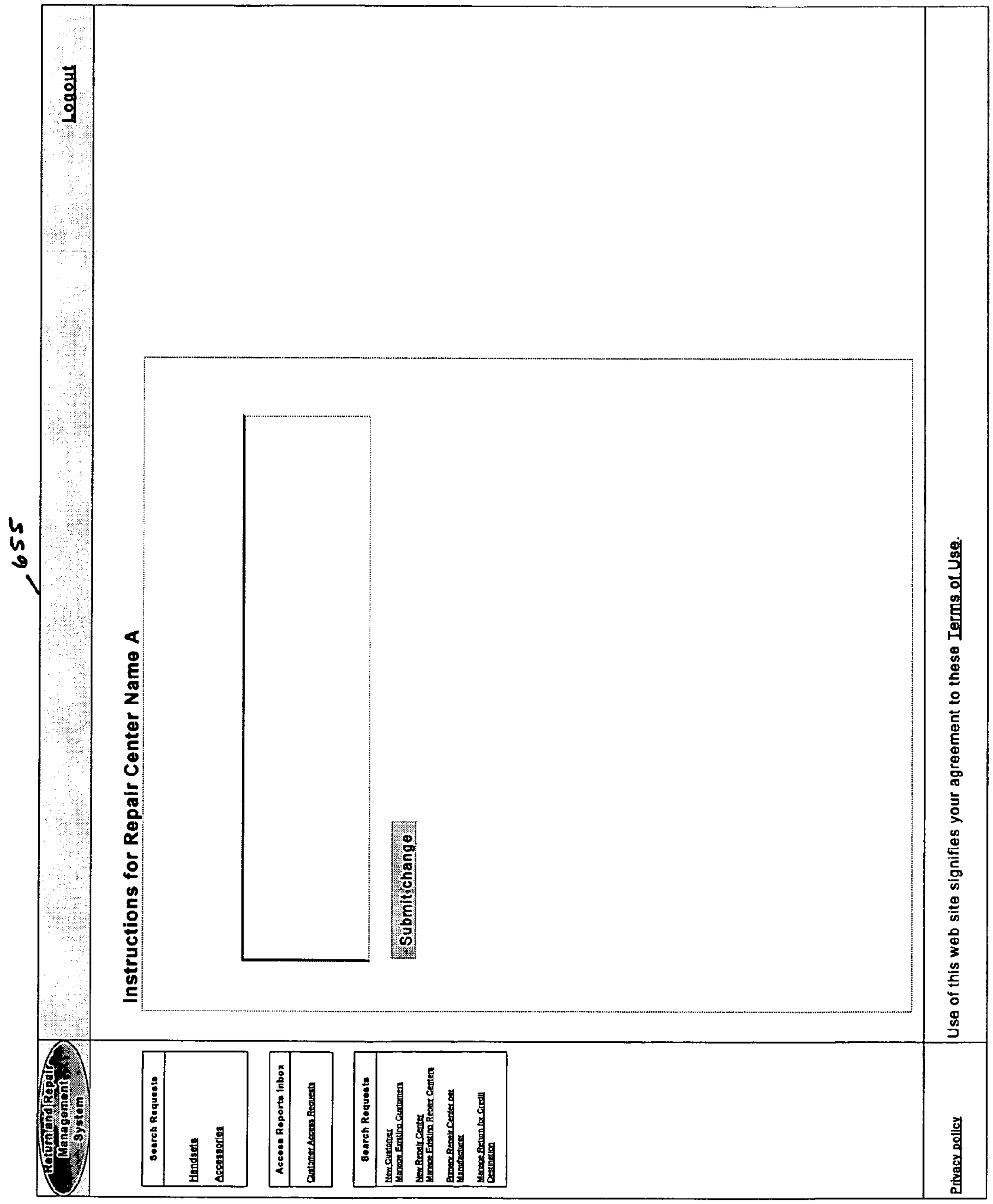

The user interface map 630 includes an instructions for repair center UI 655. FIG. 6U illustrates one embodiment of an instructions for repair center UI 655 that may be presented to a user.

Figure 6V:
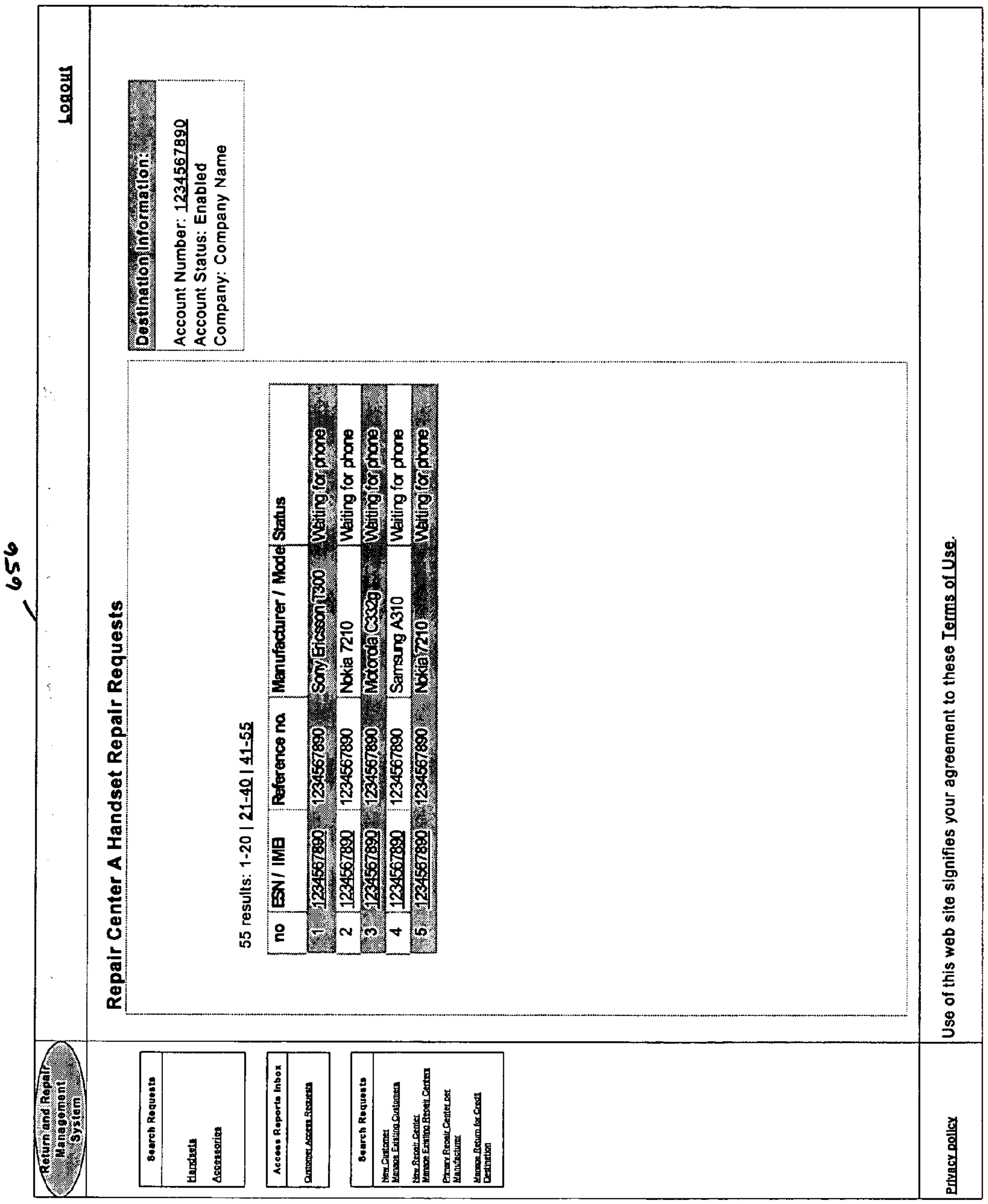

The user interface map 630 includes a repair center handset repair requests UI 656. FIG. 6V illustrates one embodiment of a repair center handset repair requests UI 656 that may be presented to a user. In one implementation, account numbers are hyperlinked to an edit/delete customer screen. ESN/IMEI numbers may be hyperlinked to handset details. The user interface map 630 includes a handset details UI 657 (e.g., FIG. 6F).

Figure 6W:
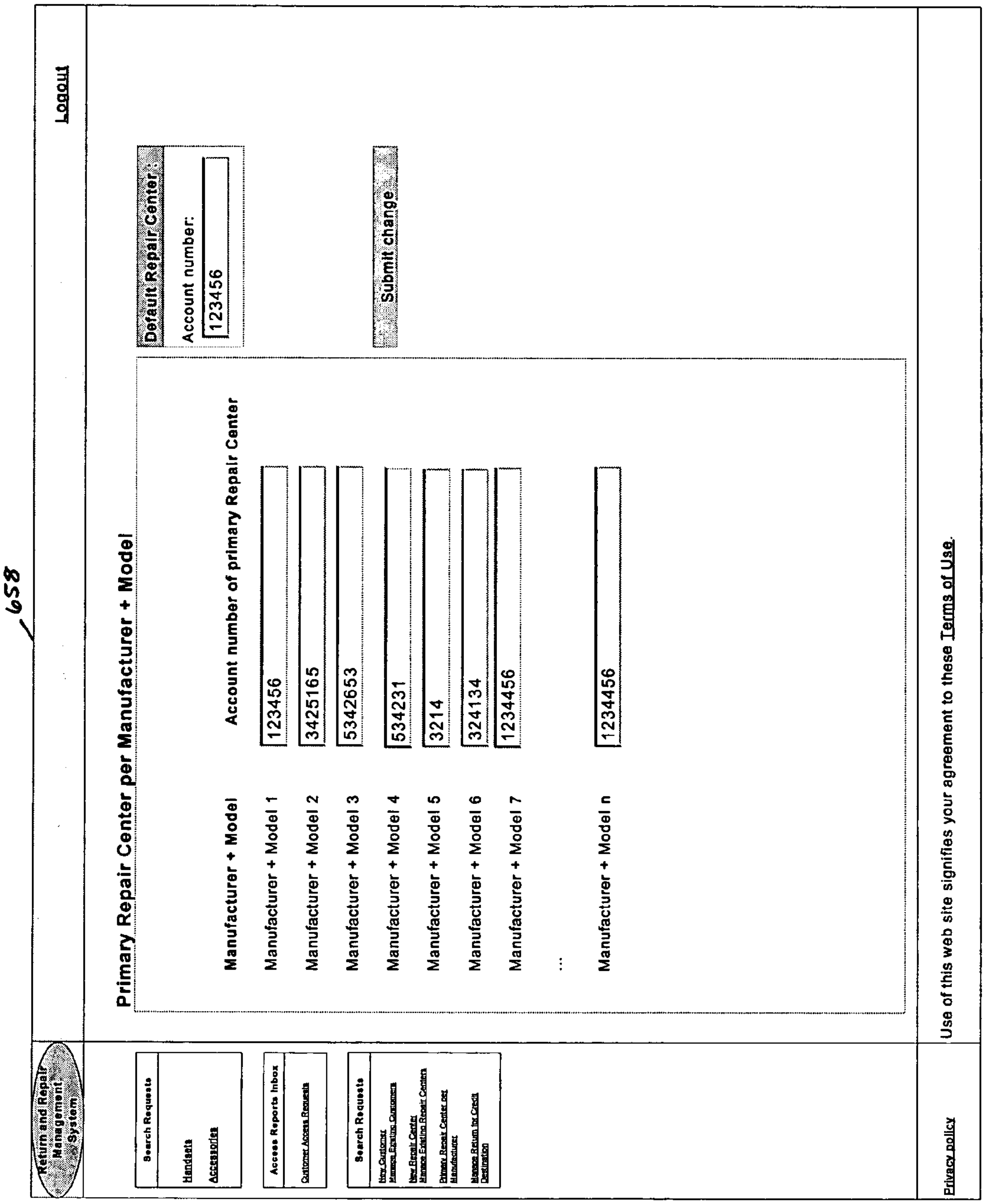

The user interface map 630 includes a manage primary repair center per manufacturer UI 658. FIG. 6W illustrates one embodiment of a manage primary repair center per manufacturer UI 658 that may be presented to a user. In one implementation, all manufacturer+model combinations are listed in alphabetical order. All handsets repair requests for a specific manufacturer+model combination will go to the repair center indicated.

All handset repairs for manufacturer+model combinations that have not been assigned a primary repair center will be sent to a default repair center. When an administrator clicks on the "submit change" button, the system updates the primary repair centers per manufacturer. Changes take place immediately.

Figure 6X:
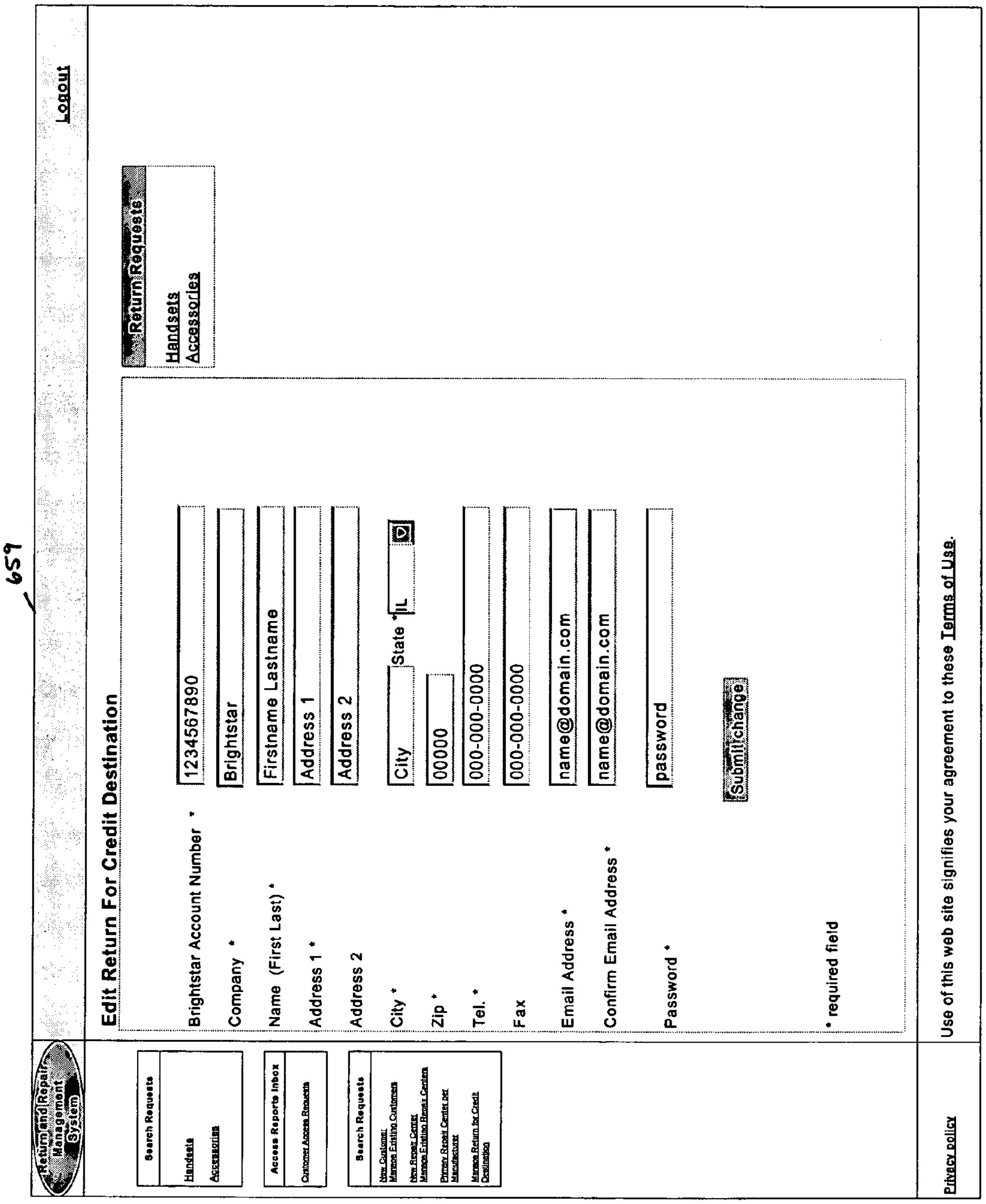

The user interface map 630 includes a managed return for credit destination UI 659. FIG. 6X illustrates one embodiment of a managed return for credit destination UI 659 that may be presented to a user. In one implementation, when an administrator clicks on the "submit change" button, the system updates the destination information of handsets and accessories returned for credit.

Figure 6Y:
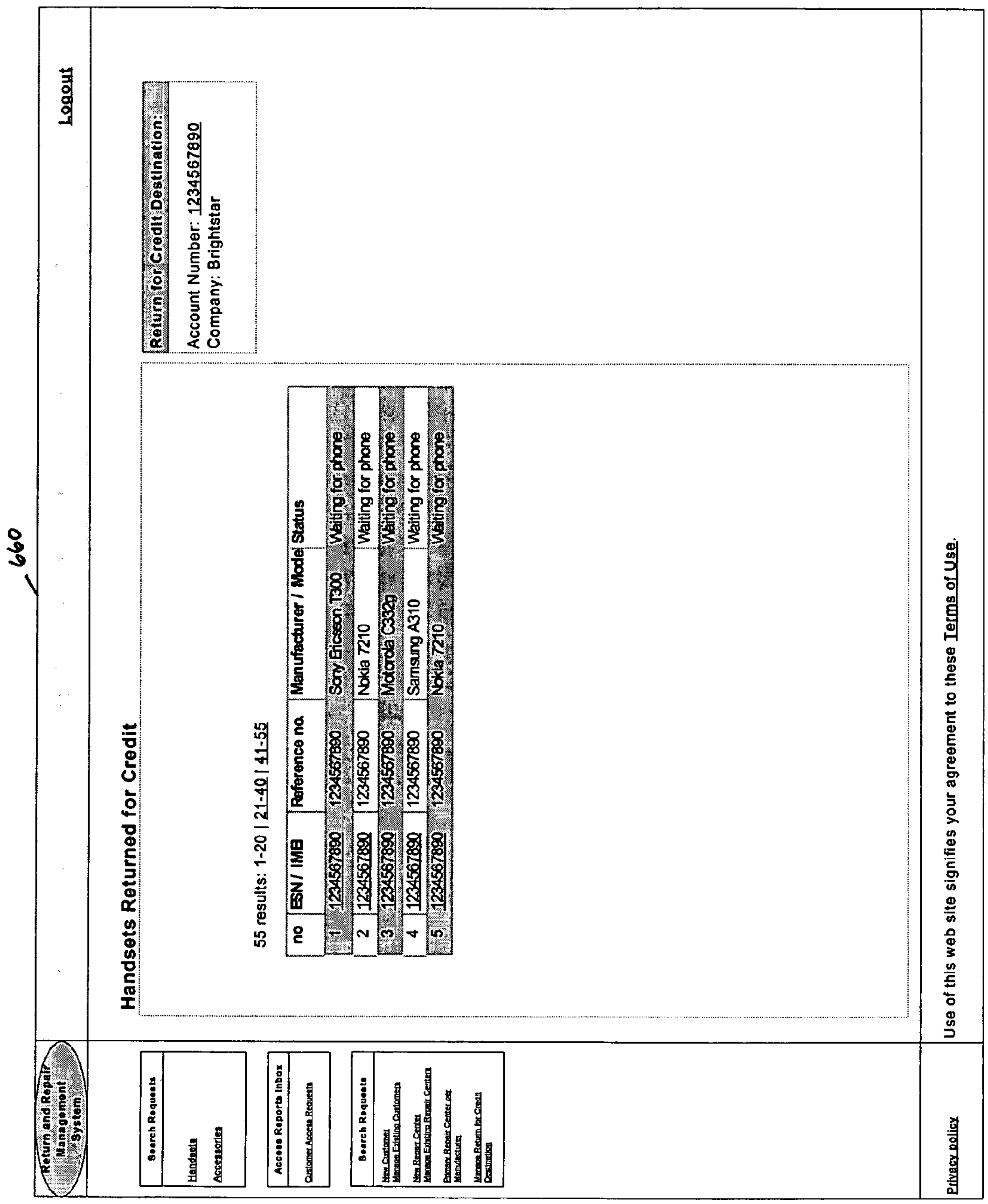

The user interface map 630 includes a handset returns UI 660. FIG. 6Y illustrates one embodiment of a handset returns UI 660 that may be presented to a user. In one implementation, account numbers are hyperlinked to an edit return for credit destination. ESN/IMEI numbers are hyperlinked to a returned handset details screen. The user interface map 630 includes a handset details UI 661 (e.g., FIG. 6F).

Figure 6Z:
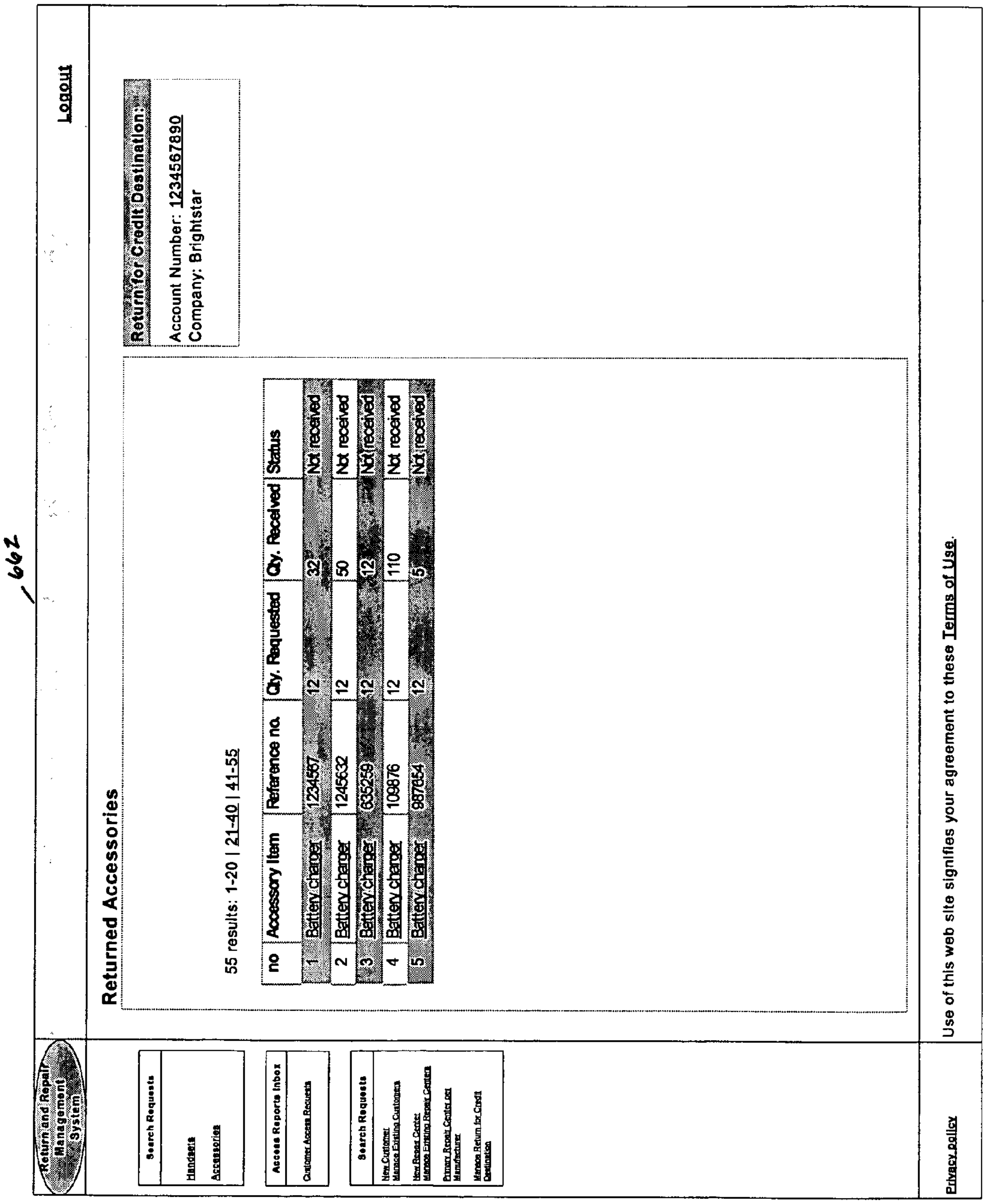

The user interface map 630 includes an accessory returns UI 662. FIG. 6Z illustrates one embodiment of an accessory returns UI 662 that may be presented to a user. In one implementation, accounts numbers are hyperlinked to an edit/return for credit destination. Accessory items are hyperlinked to an accessory details screen. The user interface map 630 includes an accessory details UI 663 (e.g., FIG. 6J).

As described and illustrated, the system 100 automatically routes the product to the proper destination based on a set of predetermined rules. In one implementation, the system 100 provides a customer with a return number. In general, the automation allows for a quicker turn around time for a product return because the system knows the correct destination for the product in advance and does not rely on human intervention for routing decisions. The system also may automatically update the status of the product at the destination and direct the shipment of the product back to the end user or customer.

A number of implementations have been described. Nevertheless, it will be understood that various modifications may be made and that other implementations are within the scope of the following claims.

What is claimed is:

1. A return and repair management system comprising:

a host system communicating with multiple client systems, the multiple client systems including at least a first client system and a plurality of second client systems, the first client system associated with one of an end-user and a customer and the second client systems associated with a plurality of repair centers, the host system comprising logic for:

providing an interactive user interface for the first client system;

receiving a product return request input via the user interface of the first client system, the product return request comprising manufacturing information, warranty information, contact and routing information and serialized information associated with a product;

validating the serialized information;

selecting one of the second client systems based on the manufacturing information included in the product return request;

providing an interactive user interface for the selected second client system; and transmitting the product return request to the user interface of the selected second client system.

2. The system of claim 1, wherein the serialized information comprises an electronic serial number.

3. The system of claim 2, wherein the electronic serial number is associated with a handset.

4. The system of claim 1, wherein the host system comprises logic for providing the first client system with updated status values for the product.

5. The system of claim 1, wherein the host system comprises logic for processing a credit transaction.

6. The system of claim 1, wherein the host system comprises a database structure configured to store serialized information values pertaining to return and repair transactions.

7. The system of claim 1, wherein the host system comprises logic for providing an interactive user interface for an administrator.

8. The system of claim 7, wherein each user interface comprises a Web page.

9. The system of claim 7, wherein each user interface comprises a search feature.

10. The system of claim 9, wherein the search feature returns a search result based on at least one of an electronic serial number and an international mobile equipment manufacturer number.

11. The system of claim 9, wherein the search feature returns a search result based on repair center.

12. A method of managing return and repair transactions, the method performed by a computer system and comprising the steps of:

communicating with multiple client systems, the multiple client systems including at least a first client system and a plurality of second client systems, the first client system associated with one of an end-user and a customer and the second client systems associated with a plurality of repair centers;

providing an interactive user interface for the first client system;

receiving a product return request input via the user interface of the first client system, the product return request comprising manufacturing information and serialized information associated with a product;

validating the serialized information;

selecting one of the second client systems based on the manufacturing information included in the product return request;

providing an interactive user interface for the selected second client system; and transmitting the product return request to the user interface of the selected second client system.

13. The method of claim 12, wherein the serialized information comprises an electronic serial number.

14. The method of claim 13, wherein the electronic serial number is associated with a handset.

15. The method of claim 12, further comprising providing the first client system with updated status values for the product.

16. The method of claim 12, further comprising processing a credit transaction.

17. The method of claim 16, wherein the computer system comprises a host system.

18. A tangible computer-readable medium having stored thereon instructions which, when executed by a processor, cause the processor to:

communicate with multiple client systems, the multiple client systems including at least a first client system and a plurality of second client systems, the first client system associated with one of an end-user and a customer and the second client systems associated with a plurality of repair centers;

provide an interactive user interface for the first client system;

receive a product return request input via the user interface of the first client system, the product return request comprising manufacturing information and serialized information associated with the product;

validate the serialized information;

select one of the second client systems based on the manufacturing information included in the product return request;

provide an interactive user interface for the selected second client system; and transmit the product return request to the user interface of the selected second client system.

19. The tangible computer-readable medium of claim 18, wherein the tangible computer-readable medium comprises at least one of a client device, a network device, a host device, and a disk.

* * * * *